United States Patent
Kunita et al.

(10) Patent No.: US 9,748,593 B2
(45) Date of Patent: Aug. 29, 2017

(54) POLYMER ELECTROLYTE COMPOSITION, AND POLYMER ELECTROLYTE MEMBRANE, MEMBRANE ELECTRODE COMPLEX AND SOLID POLYMER-TYPE FUEL CELL EACH PRODUCED USING SAME

(71) Applicant: TORAY INDUSTRIES, INC., Tokyo (JP)

(72) Inventors: Tomoyuki Kunita, Shiga (JP); Daisuke Izuhara, Shiga (JP); Naoki Shimoyama, Shiga (JP); Yuka Fujieda, Shiga (JP); Hiroaki Umeda, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 252 days.

(21) Appl. No.: 14/647,781

(22) PCT Filed: Nov. 22, 2013

(86) PCT No.: PCT/JP2013/081516
§ 371 (c)(1),
(2) Date: May 27, 2015

(87) PCT Pub. No.: WO2014/084138
PCT Pub. Date: Jun. 5, 2014

(65) Prior Publication Data
US 2015/0295262 A1 Oct. 15, 2015

(30) Foreign Application Priority Data

Nov. 27, 2012 (JP) .................................. 2012-258481

(51) Int. Cl.
*H01M 8/10* (2016.01)
*H01M 8/103* (2016.01)
(Continued)

(52) U.S. Cl.
CPC ........... *H01M 8/103* (2013.01); *C08J 5/2256* (2013.01); *C08K 5/3437* (2013.01); *C08K 5/42* (2013.01); *C08L 71/10* (2013.01); *C08L 101/02* (2013.01); *H01B 1/122* (2013.01); *H01M 8/1004* (2013.01); *H01M 8/1025* (2013.01); *H01M 8/1044* (2013.01); *H01M 8/1051* (2013.01); *C08J 2371/10* (2013.01); *H01M 2008/1095* (2013.01); *H01M 2250/20* (2013.01); *H01M 2250/30* (2013.01); *H01M 2300/0082* (2013.01);
(Continued)

(58) Field of Classification Search
CPC .. H01M 8/103; H01M 8/1004; H01M 8/1025; H01M 8/1044; H01M 8/1051; H01M 2008/1095; H01M 2250/20; H01M 2250/30; H01M 2300/0082; C08J 5/2256; C08J 2371/10; C08K 5/3437; C08K 5/42; C08L 71/10; C08L 101/02; H01B 1/122; Y02B 90/18; Y02E 60/521
See application file for complete search history.

(56) References Cited

U.S. PATENT DOCUMENTS

| | | | |
|---|---|---|---|
| 2010/0196782 A1 | 8/2010 | Izuhara et al. | |
| 2012/0196188 A1* | 8/2012 | Zhang | H01M 8/103 429/309 |
| 2012/0270141 A1* | 10/2012 | Koshino | B01J 31/183 429/492 |

FOREIGN PATENT DOCUMENTS

| | | |
|---|---|---|
| JP | 2012-017314 A | 1/2012 |
| JP | 2012-039097 A | 2/2012 |

(Continued)

OTHER PUBLICATIONS

P. Audebert et al., Electrochemical Behaviour of Nafion Gels loaded with Ferrocene and Copper (I) Diphenylphenanthroline Complexes, J. Chem. Soc., Chem. Sommun., 1989, 14, 939-941.
Paulina Canete et al., Detection of Hydrophobic Microdomains in Anionic Polyelectrolytes with Tris-(4,7-diphenyl-1, 10-phenanthroline) 3Cr(III), Journal of Colloid and Interface Science, 2008, 318, 183-187.

*Primary Examiner* — Raymond Alejandro
(74) *Attorney, Agent, or Firm* — Pillsbury Winthrop Shaw Pittman LLP

(57) ABSTRACT

The present invention provides: a polymer electrolyte composition which can achieve excellent proton conductivity under slightly humidified conditions, excellent mechanical strength and excellent physical durability, has excellent practicality, and can be produced using a nitrogen-containing additive, wherein the nitrogen-containing additive can prevent the elution of the additive under a strongly acidic atmosphere during the operation of a fuel cell, has excellent chemical stability so as to tolerate a strongly acidic atmosphere, can be dissolved in various general-purpose organic solvents, has superior processability, can be mixed with an ionic-group-containing polymer, can prevent the occurrence of phase separation during the formation of a film, and can prevent the formation of an island-in-sea-like phase separation structure or the occurrence of bleeding out during the formation of a film; and a polymer electrolyte membrane, a membrane electrode assembly and a polymer electrolyte fuel cell, each of which is produced using the polymer electrolyte composition. The polymer electrolyte composition according to the present invention comprises at least an ionic-group-containing polymer (A) and a nitrogen-containing additive (B), said polymer electrolyte composition being characterized in that the nitrogen-containing additive (B) is represented by a specific structural formula.

13 Claims, No Drawings

(51) Int. Cl.
  *C08L 71/10* (2006.01)
  *C08L 101/02* (2006.01)
  *H01B 1/12* (2006.01)
  *H01M 8/1025* (2016.01)
  *H01M 8/1044* (2016.01)
  *H01M 8/1051* (2016.01)
  *C08J 5/22* (2006.01)
  *C08K 5/3437* (2006.01)
  *C08K 5/42* (2006.01)
  *H01M 8/1004* (2016.01)
  *H01M 8/1018* (2016.01)

(52) U.S. Cl.
  CPC .............. *Y02B 90/18* (2013.01); *Y02E 60/521* (2013.01); *Y02T 90/32* (2013.01)

(56) References Cited

FOREIGN PATENT DOCUMENTS

| | | |
|---|---|---|
| JP | 2013-203778 A | 10/2013 |
| WO | 2008/018487 A1 | 2/2008 |
| WO | 2013/027724 A1 | 2/2013 |

\* cited by examiner

POLYMER ELECTROLYTE COMPOSITION, AND POLYMER ELECTROLYTE MEMBRANE, MEMBRANE ELECTRODE COMPLEX AND SOLID POLYMER-TYPE FUEL CELL EACH PRODUCED USING SAME

CROSS REFERENCE TO RELATED APPLICATIONS

This application is a national phase of International Application No. PCT/JP2013/081516 which was filed on Nov. 22, 2013, which claims priority to Japanese Application No. 2012-258481 filed on Nov. 27, 2012, all of which are incorporated herein by reference in their entirety.

TECHNICAL FIELD

This application is a national phase of International Application No. PCT/JP2013/073543 which was filed on Nov. 22, 2013, which claims priority to Japanese Application No. 2012-258481 filed on Nov. 27, 2012, all of which are incorporated herein by reference in their entirety.

BACKGROUND ART

A fuel cell is one kind of electrical generators which take out electric energy by electrochemically oxidizing a fuel such as hydrogen or methanol, and has received attention as a clean energy supply source, in recent years. Particularly, since a polymer electrolyte fuel cell has a low standard working temperature of around 100° C., and has high energy density, wide application as an electrical generator for a distributed electric power generation facility of a relatively small scale or a mobile object such as an automobile or a marine vessel is expected. Further, the fuel cell also receives attention as an electric supply for small movable equipment or portable equipment, and installation into a mobile phone, a personal computer or the like, in place of secondary cells such as a nickel-metal hydride cell and a lithium ion cell, is expected.

In the fuel cell, usually, anode and cathode electrodes in which a reaction for electric power generation occurs, and a polymer electrolyte membrane which is to be a proton conductor between the anode and the cathode constitute a membrane electrode assembly (hereinafter, abbreviated as MEA in some cases), and the fuel cell is composed of a cell as a unit comprising separators and the MEA interposed between the separators. The polymer electrolyte membrane is mainly composed of an ionic-group-containing polymer (polymer electrolyte material), and a polymer electrolyte composition in which an additive or the like is mixed in order to enhance durability can also used.

The polymer electrolyte composition is also suitable for a binder of an electrode catalyst layer or the like which is used in a particularly hostile oxidizing atmosphere. Examples of the required property of the polymer electrolyte membrane and the polymer electrolyte composition include firstly high proton conductivity, and it is necessary that the polymer electrolyte membrane has high proton conductivity particularly even under high temperature and slightly humidified conditions. Further, since the polymer electrolyte membrane and the polymer electrolyte composition bears a function as a barrier which prevents a direct reaction between a fuel and oxygen, the membrane is required to have low permeability of the fuel. In addition, examples of the required properties include chemical stability for enduring a strong oxidizing atmosphere during fuel cell operation, mechanical strength and physical durability which can endure membrane thinning and repeating of swelling and drying, and the like.

Previously, in the polymer electrolyte membrane, Nafion (registered trademark) (manufactured by E. I. du Pont de Nemours & Company) which is a perfluorosulfonic acid polymer has been widely used. There are problems that Nafion is very expensive since Nafion (registered trademark) is produced via multistage synthesis, and that Nafion causes great fuel crossover. In addition, there have been pointed out a problem that mechanical strength and physical durability of a membrane are lost due to swelling and drying, a problem that a softening point is low and use at a high temperature is not possible and, further, a problem of disposal after use, and a problem that recycle of the material is difficult. Further, development of a hydrocarbon electrolyte membrane has been activated in recent years as a polymer electrolyte material, which can replace Nafion (registered trademark), is inexpensive and is excellent in membrane properties.

However, all of these polymer electrolyte membranes have a problem that chemical stability is deficient in the case of being used for the polymer electrolyte fuel cell. While a mechanism of chemical degradation is not adequately clarified, a polymer chain or a side chain is cut due to hydrogen peroxide mainly generated at an electrode during power generation and hydroxy radicals generated when the above-mentioned hydrogen peroxide reacts with an iron ion or copper ion in a membrane, and therefore the polymer electrolyte membrane causes membrane thinning and becomes brittle. In addition to this, there is a problem that while swelling and shrinkage are repeated according to changes in humidity, the polymer electrolyte membrane becoming brittle is damaged leading to difficulty with power generation.

In such a situation, investigations are made for improving chemical stability and durability by use of a polymer electrolyte composition in which an antioxidant is compounded in a perfluoro-type electrolyte membrane or a hydrocarbon-type electrolyte membrane.

For example, Patent Document 1 proposes a polymer electrolyte composition in which cerium ions or manganese ions are compounded in a perfluorosulfonic acid-type polymer or a sulfonic acid group-containing polyether ketone-type polymer.

Further, Patent Document 2 proposes a peroxide decomposition catalyst formed by coordinating a nitrogen atom of imidazole, pyridine or the like to a base metal atom such as manganese or iron.

Moreover, Patent Documents 3 and 4 propose a polymer electrolyte composition in which phenanthroline derivatives or a complex of phenanthroline and a cerium ion or a manganese ion is compounded in a perfluoro-type electrolyte membrane.

PRIOR ART DOCUMENTS

Patent Documents

Patent Document 1: Japanese Patent Laid-open Publication No. 2006-99999
Patent Document 2: Japanese Patent Laid-open Publication No. 2007-38213
Patent Document 3: WO 2011/57768 A
Patent Document 4: WO 2011/57769 A

SUMMARY OF THE INVENTION

Problems to be Solved by the Invention

However, in Patent Document 1, since a metal ion itself is compounded and the polymer electrolyte composition is extremely high in hydrophilicity, metal ions are eluted out of the membrane during the operation of a fuel cell, and therefore the effect cannot be maintained and adequate chemical stability and durability cannot be achieved.

Further, in Patent Documents 2 and 4, since a hydrophilic ionic complex is compounded, adequate chemical stability and durability cannot be achieved as with Patent Document 1.

Further, 2,2'-bipyridyl or 1,10-phenanthroline described in Patent Document 3 causes a neutralization reaction with an acid produced during power generation to be ionized, becomes a hydrophilic compound, and is eluted out of the membrane, and therefore adequate chemical stability and durability cannot be achieved.

Here, it is thought that in the case of a compound, described separately, in which 1,10-phenanthroline is bonded at third position and eighth position with an aromatic ring interposed therebetween, its molecular weight is increased more than 1,10-phenanthroline, and the elution during power generation is prevented, but since 1,10-phenanthroline is bonded at third position and eighth position and has a rigid structure, it is thought to be hardly dissolved in various general-purpose organic solvents, and extremely low processability. Further, it is thought problems that since the compound has a rigid structure, it has high crystallinity and easily aggregates in the polymer electrolyte membrane, namely, the ionic-group-containing polymer, is hardly mixed with the ionic-group-containing polymer, island-in-sea-like phase separation structure or bleeding out occurs during the formation of a film, and power generation performance and durability are significantly deteriorated.

The present invention solves such problems and provides: a polymer electrolyte composition which can achieve excellent proton conductivity under slightly humidified conditions, excellent mechanical strength and excellent physical durability, has excellent practicality, and can be produced using a nitrogen-containing additive, wherein the nitrogen-containing additive can prevent the elution of the additive under a strongly acidic atmosphere during the operation of a fuel cell, has excellent chemical stability so as to tolerate a strong oxidizing atmosphere, can be dissolved in various general-purpose organic solvents, has superior processability, can be mixed with an ionic-group-containing polymer, can prevent the occurrence of phase separation during the formation of a film, and can prevent the formation of an island-in-sea-like phase separation structure or the occurrence of bleeding out during the formation of a film; and a polymer electrolyte membrane, a membrane electrode assembly and a polymer electrolyte fuel cell, each of which is produced using the polymer electrolyte composition.

Solutions to the Problems

In order to solve such problems, the present invention employs the following means. That is, the polymer electrolyte composition of the present invention is a polymer electrolyte composition containing at least an ionic-group-containing polymer (A) and a nitrogen-containing additive (B), wherein the nitrogen-containing additive (B) is represented by at least one selected among the following general formula (C1) and the following general formula (C2). Further, the polymer electrolyte membrane, the membrane electrode assembly and the polymer electrolyte fuel cell of the present invention are configured by using such a polymer electrolyte composition.

[Chemical Formula 1]

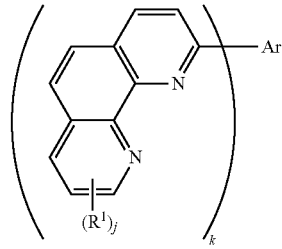

(C1)

In the general formula (C1), Ar represents an arylene group, and $R^1$ represents at least one group selected from among a halogen, an alkyl group having 1 to 20 carbon atoms, an alkoxy group having 1 to 20 carbon atoms, an aryl group having 6 to 20 carbon atoms, an aryloxy group having 6 to 20 carbon atoms, a carboxyl group, a carboxylate ester group, a phosphino group, a phosphine oxide group, a phosphonic acid group, a phosphoester group, a sulfonic acid group, a sulfate ester group, a hydroxyl group, an amino group, a cyano group and a nitro group, j represents an integer of 0 to 7, k represents an integer of 2 or more, and all R's may be the same or different from one another.

[Chemical Formula 2]

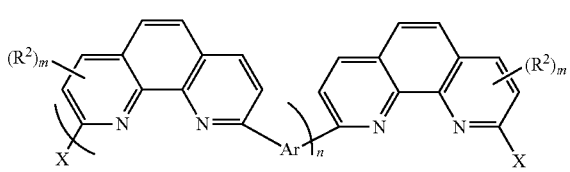

(C2)

In the general formula (C2), Ar represents an arylene group, and $R^2$ represents at least one group selected from among a halogen, an alkyl group having 1 to 20 carbon atoms, an alkoxy group having 1 to 20 carbon atoms, an aryl group having 6 to 20 carbon atoms, an aryloxy group having 6 to 20 carbon atoms, a carboxyl group, a carboxylate ester group, a phosphino group, a phosphine oxide group, a phosphonic acid group, a phosphoester group, a sulfonic acid group, a sulfate ester group, a hydroxyl group, an amino group, a cyano group and a nitro group, x represents at least one group selected from among a hydrogen atom, a halogen, an alkyl group having 1 to 20 carbon atoms, an alkoxy group having 1 to 20 carbon atoms, an aryl group having 6 to 20 carbon atoms, an aryloxy group having 6 to 20 carbon atoms, a carboxyl group, a carboxylate ester group, a phosphino group, a phosphine oxide group, a phosphonic acid group, a phosphoester group, a sulfonic acid group, a sulfate ester group, a hydroxyl group, an amino group, a cyano group and a nitro group, m represents an integer of 0 to 6, n represents an integer of 2 to 4, and all $R^2$s and Xs may be the same or different from one another.

Effects of the Invention

In accordance with the present invention, it is possible to provide: a polymer electrolyte composition which can achieve excellent proton conductivity under slightly humidified conditions, excellent mechanical strength and excellent physical durability, has excellent practicality, and can be produced using a nitrogen-containing additive, wherein the nitrogen-containing additive can prevent the elution of the additive even under a strongly acidic atmosphere during the operation of a fuel cell, has excellent chemical stability so as to tolerate a strong oxidizing atmosphere, can be dissolved in various general-purpose organic solvents, has superior processability, is a compound that has low crystallinity and hardly aggregates in an ionic-group-containing polymer, can be mixed with an ionic-group-containing polymer, can prevent the occurrence of phase separation during the formation of a film, and can prevent the formation of an island-in-sea-like phase separation structure or the occurrence of bleeding out during the formation of a film; and a polymer electrolyte membrane, a membrane electrode assembly and a polymer electrolyte fuel cell, each of which is produced using the polymer electrolyte composition.

EMBODIMENTS OF THE INVENTION

Hereinafter, the present invention will be described in detail.

In order to overcome the above-mentioned problems, the present inventors made earnest investigations concerning an polymer electrolyte membrane of a fuel cell, and consequently, they found that such problems can be solved once for all by compounding a specific nitrogen-containing additive (B) in a ionic-group-containing polymer (A), and they made further various investigations, and these have lead to completion of the present invention.

That is, the polymer electrolyte composition of the present invention is a polymer electrolyte composition containing at least an ionic-group-containing polymer (A) and a nitrogen-containing additive (B), wherein the nitrogen-containing additive (B) is represented by at least one selected among the following general formula (C1) and the following general formula (C2).

Here, the nitrogen-containing compound (B) to be used in the present invention will be described. The nitrogen-containing compound of the present invention contains at least two 1,10-phenanthroline sites shown in the following formula (D1) in a molecule. These 1,10-phenanthroline sites are oxidized to an N-oxide structure shown in the following formulas (D2) and (D3) during the operation of a fuel cell in some cases.

[Chemical Formula 3]

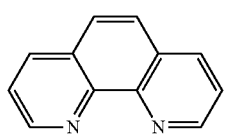

(D1)

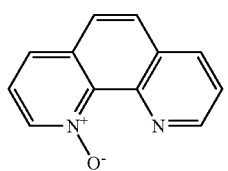

(D2)

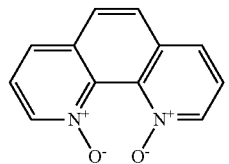

(D3)

In the nitrogen-containing additive (B) to be used for the polymer electrolyte composition of the present invention, it is important that the elution of the additive is prevented under a strongly acidic atmosphere during the operation of a fuel cell, and it is important that the additive is hardly dissolved in a strongly acidic aqueous solution such as a sulfonic acid. The solubility in water and sulfuric acid at 60° C. is preferably 100 mg/L or less, more preferably 20 mg/L or less, and particularly preferably 4 mg/L or less. When the solubility falls within this range, the nitrogen-type additive (B) is hardly eluted out of the membrane even if the nitrogen-type additive (B) causes a neutralization reaction with an acid produced during the operation of a fuel cell, and therefore the effect can be maintained and excellent chemical stability and excellent durability can be achieved.

Furthermore, it is important that the nitrogen-containing additive of the present invention can be dissolved in various general-purpose organic solvents and has excellent processability, and it is important that the additive can be mixed with an ionic-group-containing polymer and can prevent the occurrence of phase separation during the formation of a film, and can prevent the formation of an island-in-sea-like phase separation structure or the occurrence of bleeding out during the formation of a film.

Further, a molecular weight of the nitrogen-containing additive of the present invention is preferably 200 or more, and more preferably 400 or more from the viewpoint of the solubility in water and an acid. When the molecular weight falls within this range, the nitrogen-type additive (B) is hardly eluted out of the membrane even if the nitrogen-type additive (B) causes a neutralization reaction with an acid produced during the operation of a fuel cell, and therefore the effect can be maintained and excellent chemical stability and excellent durability can be achieved.

The nitrogen-containing additive (B) of the present invention is a compound in which 1,10-phenanthroline is bonded to an arylene group at second position and/or ninth position. This compound has a bending structure compared with a compound having a rigid structure, in which the 1,10-phenanthroline is bonded at third position and eighth position with an aromatic ring interposed therebetween. Therefore, the nitrogen-containing additive (B) has relatively high solubility in various general-purpose organic solvents and has excellent processability. Moreover, it is thought that the nitrogen-containing additive of the present invention is a compound which has low crystallinity because of its bending structure, and hardly aggregates in an ionic-group-containing polymer, and can be mixed with an ionic-group-containing polymer, can prevent the occurrence of phase separation during the formation of a film, and can prevent the formation of an island-in-sea-like phase separation structure or the occurrence of bleeding out during the formation of a film, and thereby, it becomes possible to achieve excellent proton conductivity under slightly humidified conditions, excellent mechanical strength and excellent physical durability.

A mechanism of improving durability in the present invention is not adequately clarified; however, the present inventors guess that not only 1,10-phenanthroline functions as a peroxide-decomposition agent with a trivalent nitrogen atom contained in the 1,10-phenanthroline site oxidized to a pentavalent N-oxide, but also 1,10-phenanthroline functions as a metal-deactivation agent which deactivates metal by forming a robust complex since the 1,10-phenanthroline compound acts as an extremely strong ligand on metal ions ($Fe^{2+}$, $Cu^{2+}$, etc.).

Specific examples of the nitrogen-containing additive (B) represented by the above general formula (C1) include compounds represented by the following formulas (E1) to (E255); however it is not particularly limited.

[Chemical Formula 4]

(E1)
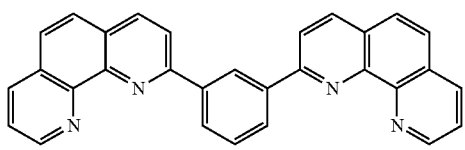

(E2)
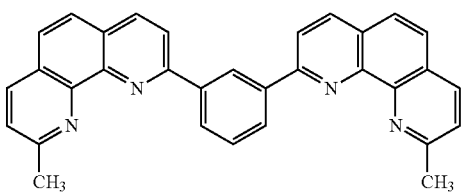

(E3)
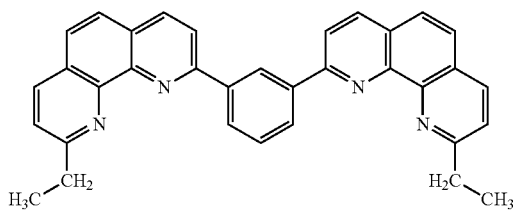

(E4)
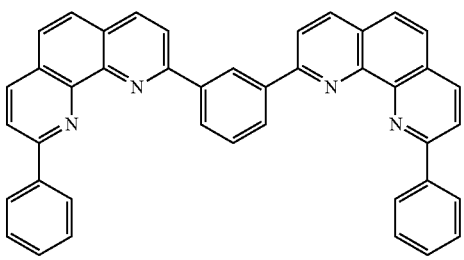

(E5)
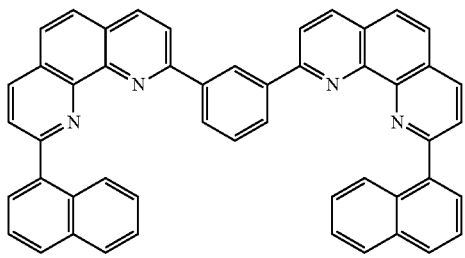

(E6)
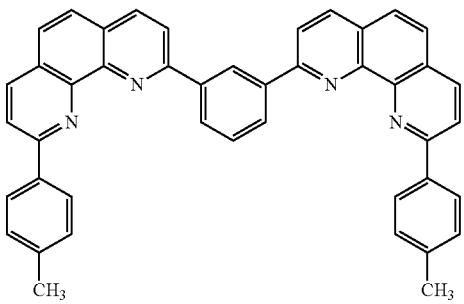

(E7)
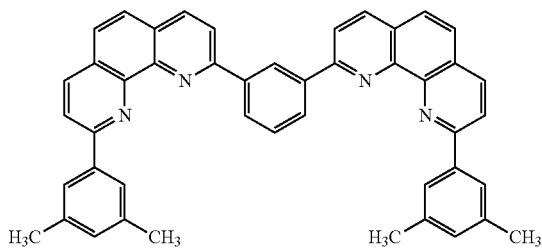

(E8)
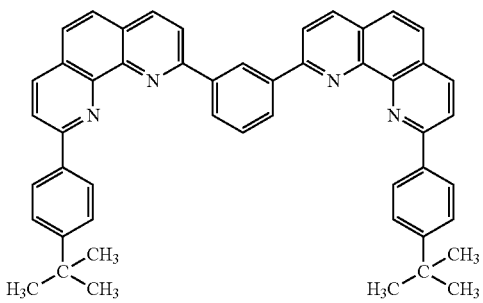

-continued
(E9)
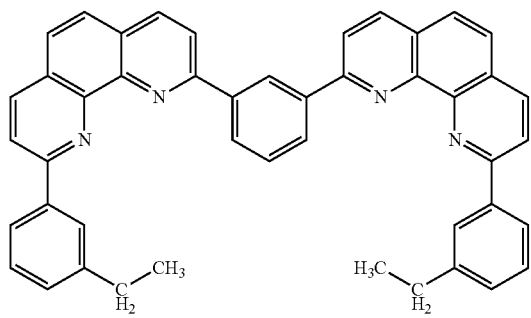
(E10)
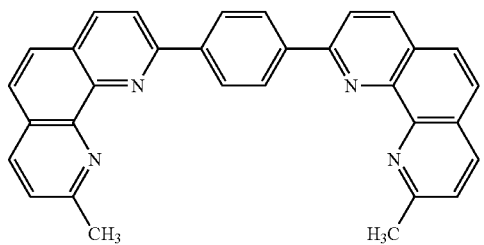
(E11)
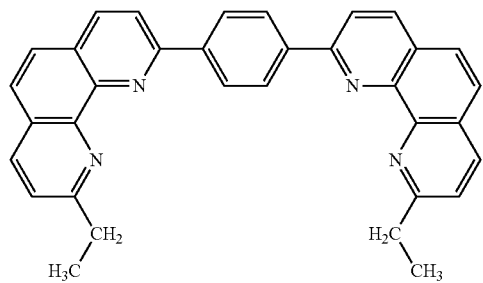
(E12)
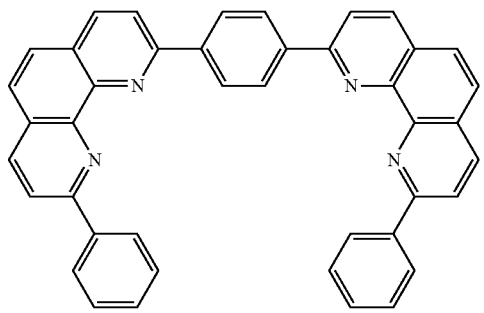
(E13)
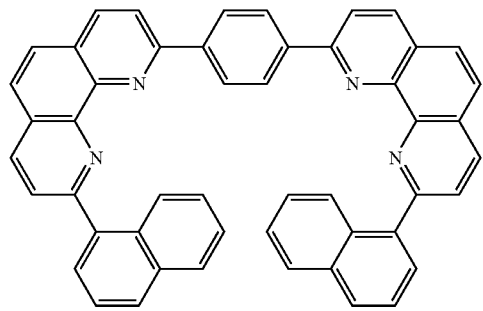
[Chemical Formula 5]
(E14)
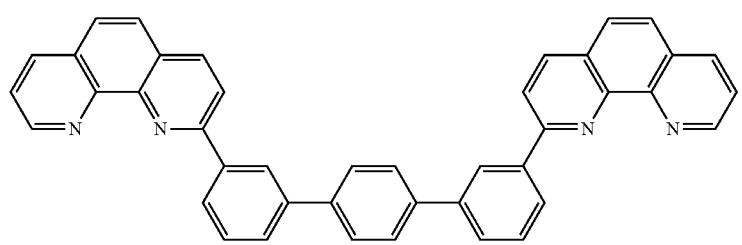
(E15)
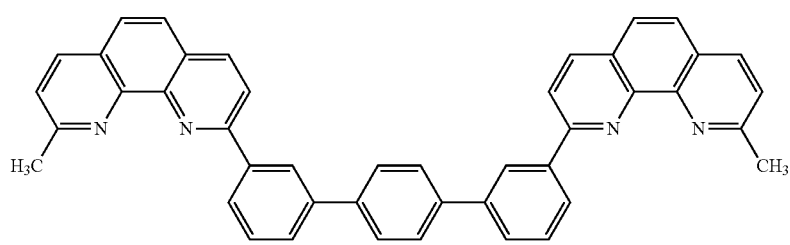

-continued
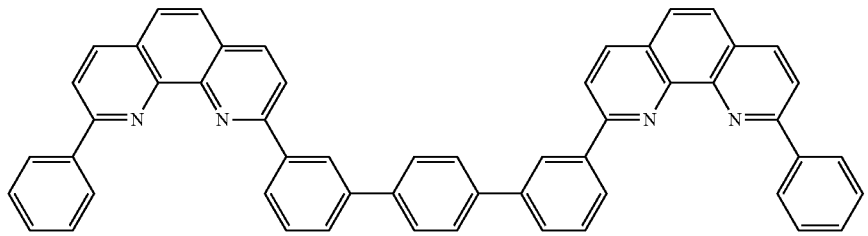
(E16)
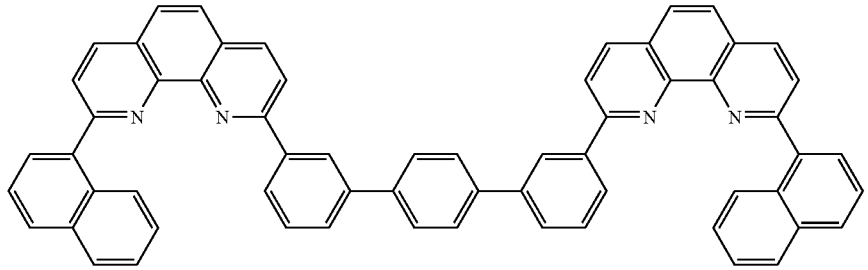
(E17)
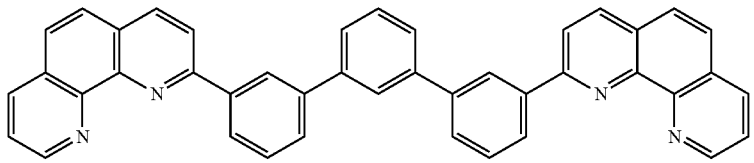
(E18)
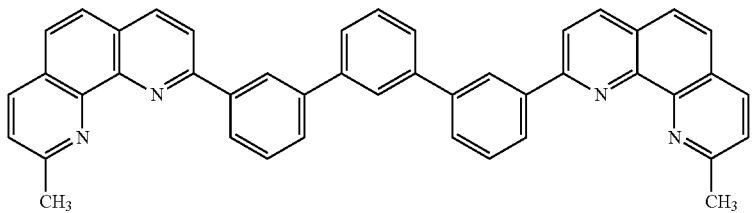
(E19)
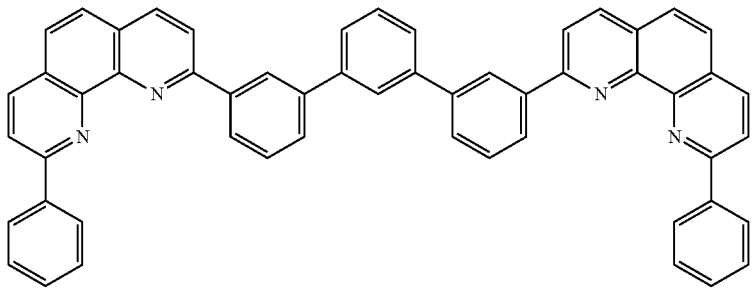
(E20)
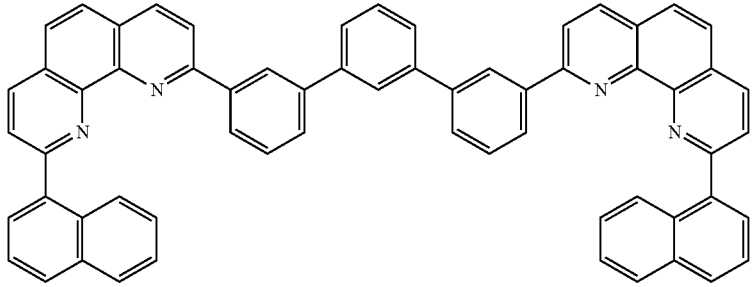
(E21)

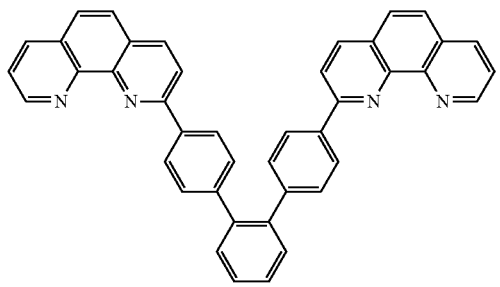 (E22)
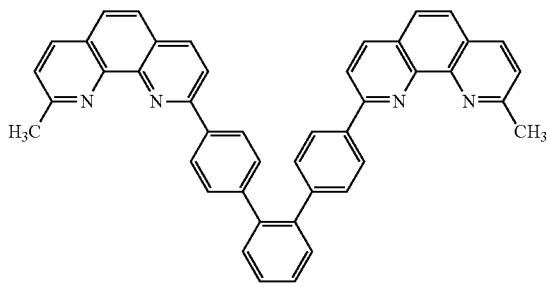 (E23)
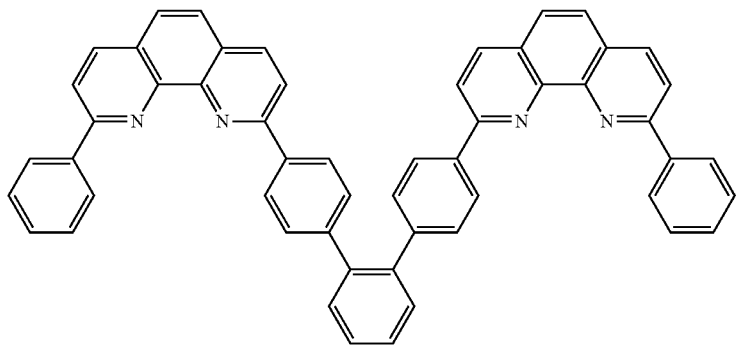 (E24)
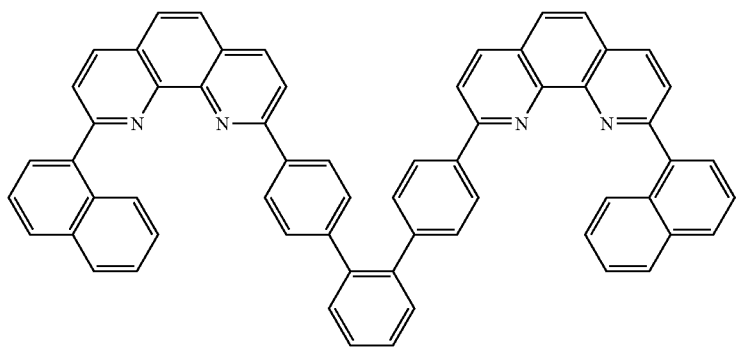 (E25)
[Chemical Formula 6]
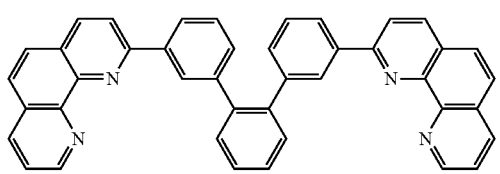 (E26)
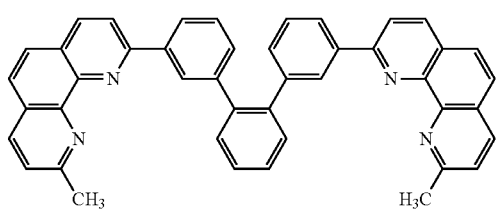 (E27)
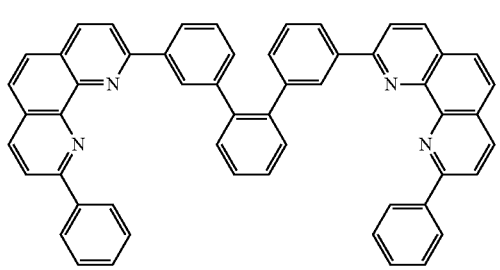 (E28)
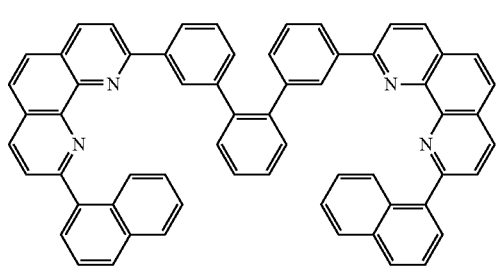 (E29)

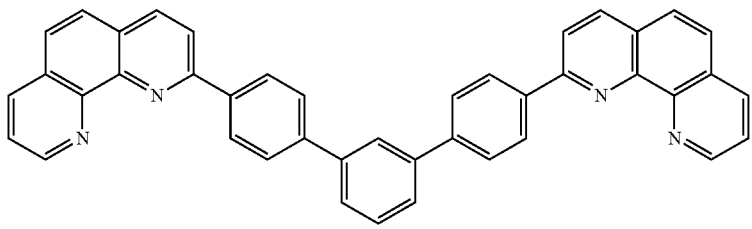
(E30)
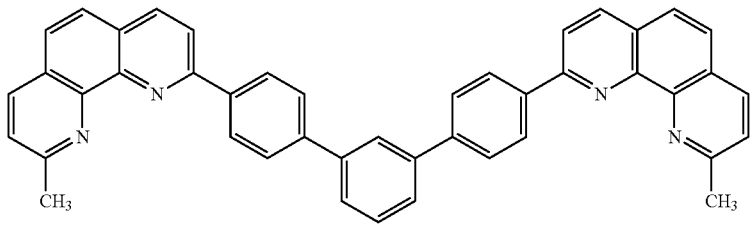
(E31)
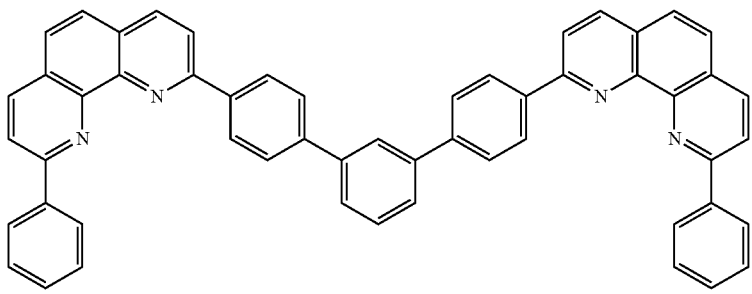
(E32)
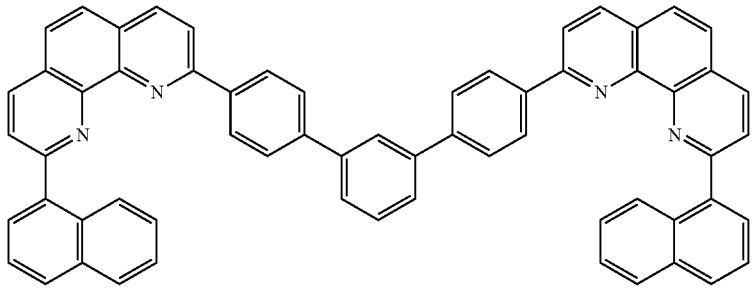
(E33)
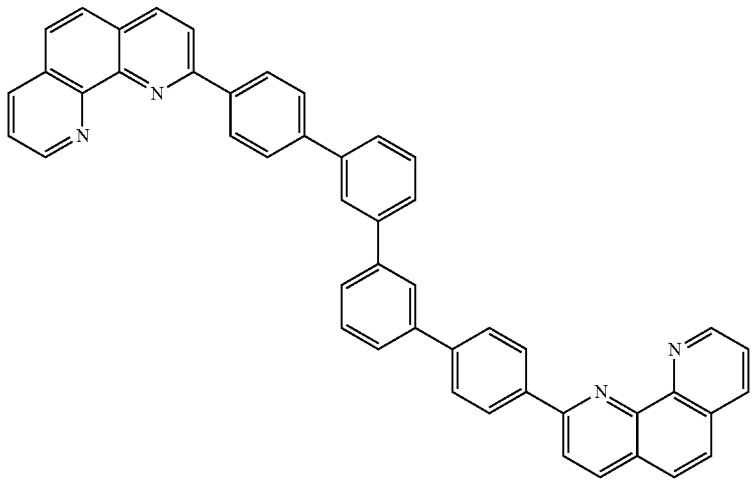
(E34)

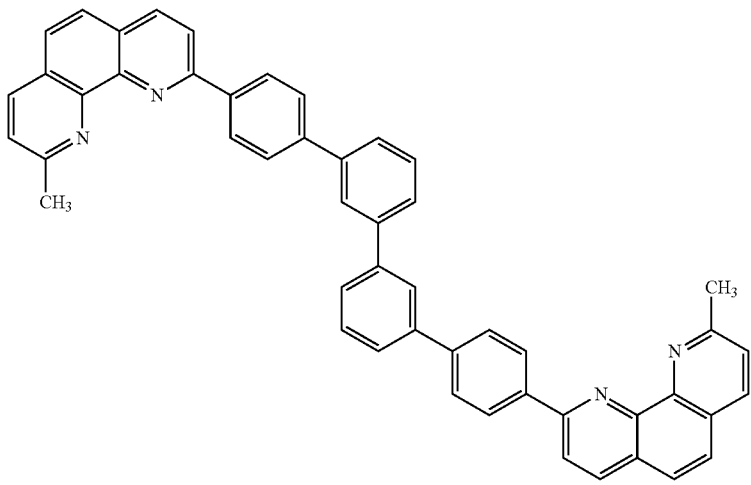
(E35)
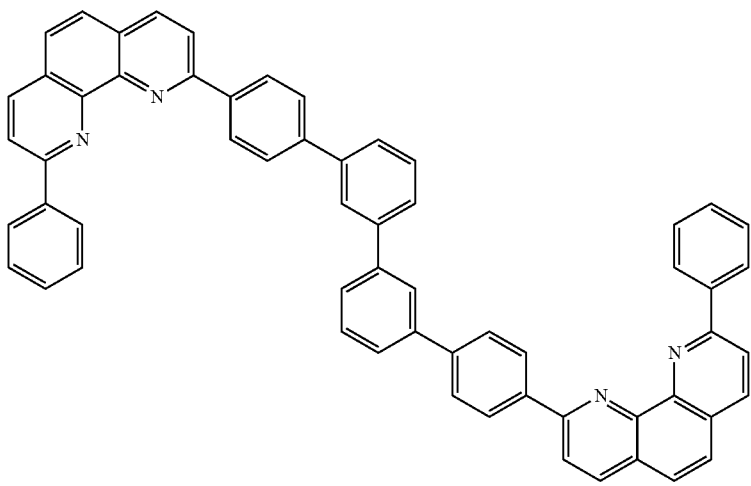
(E36)
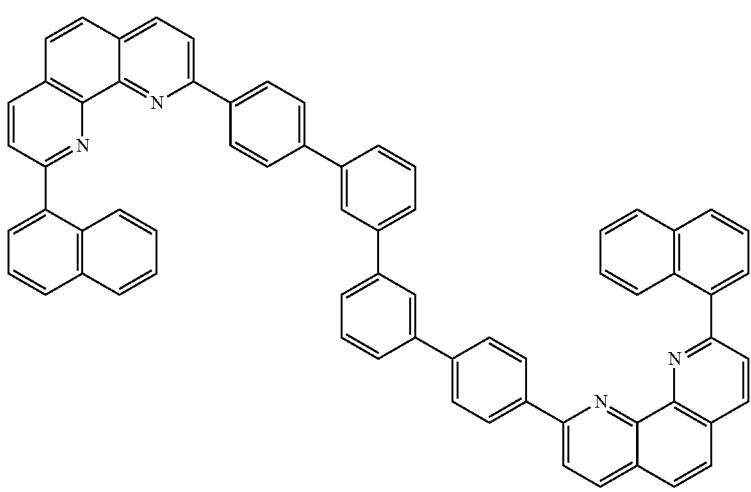
(E37)

[Chemical Formula 7]
(E38)
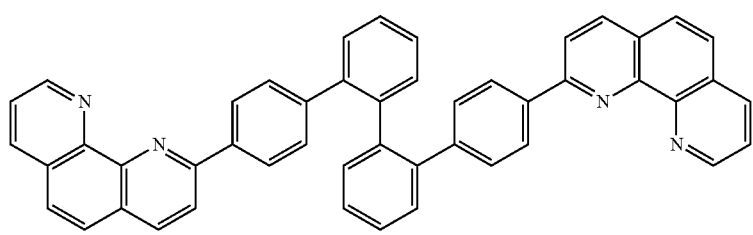
(E39)
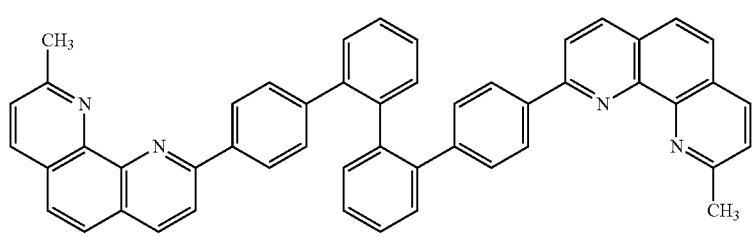
(E40)
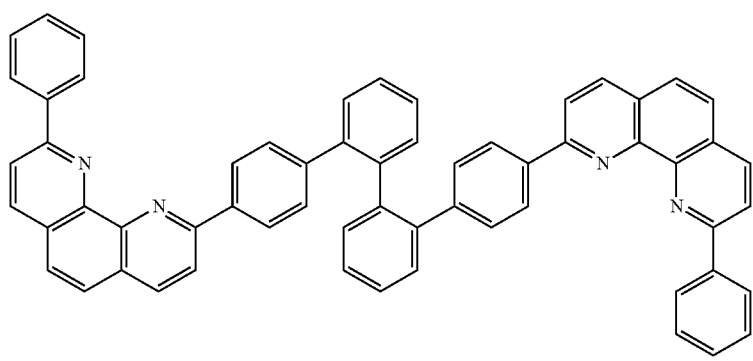
(E41)
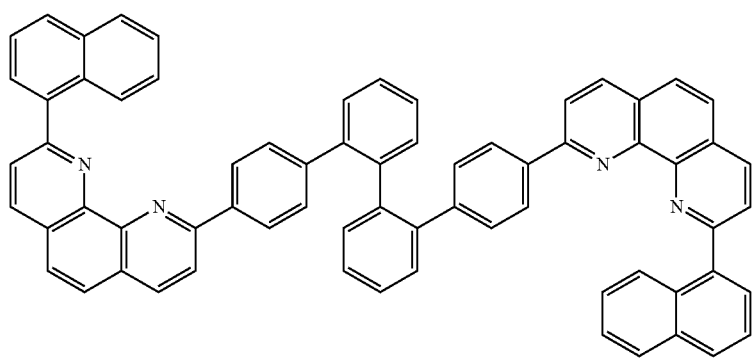
(E42)
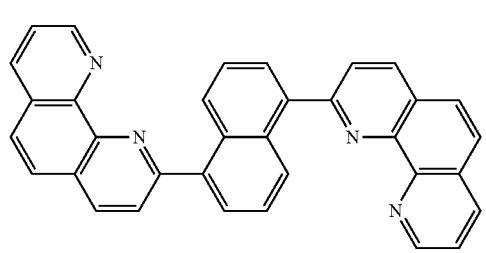
(E43)
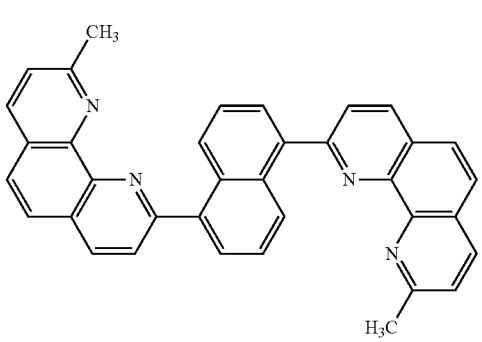

-continued
(E44)
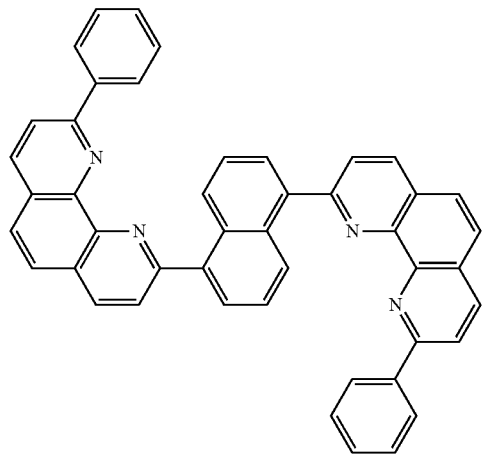
(E45)
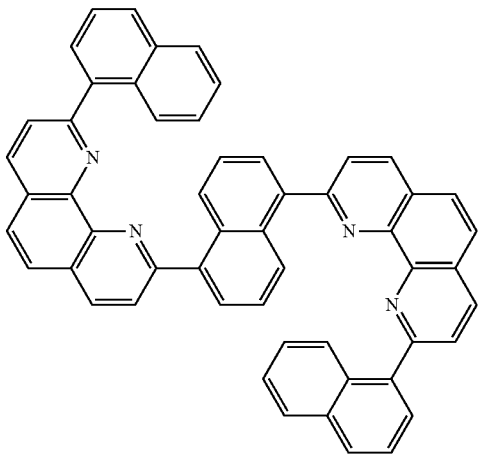
(E46)
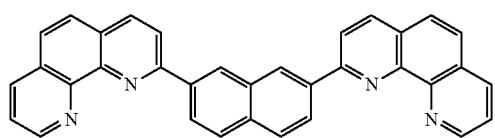
(E47)
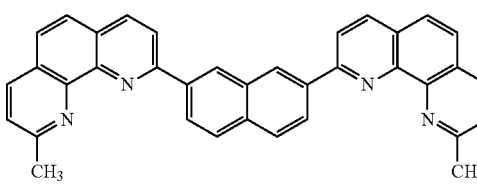
(E48)
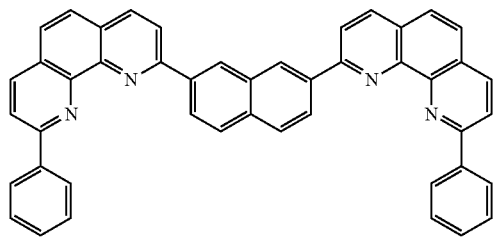
(E49)
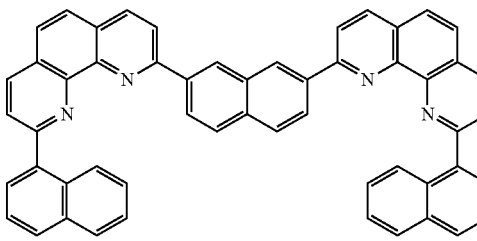
[Chemical Formula 8]
(E50)
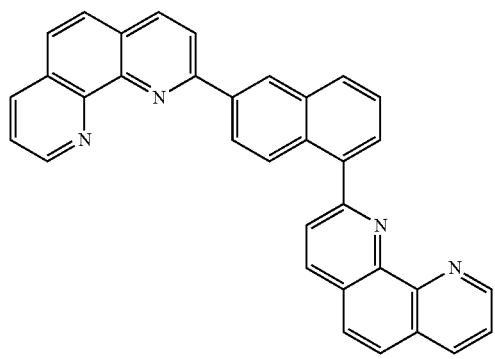
(E51)
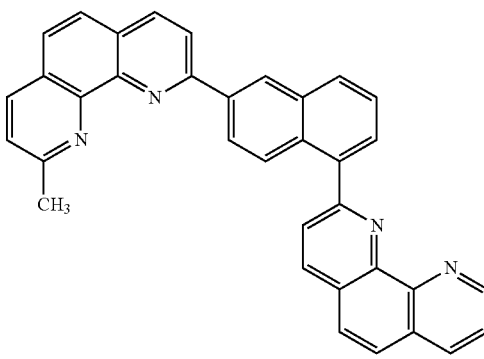
(E52)
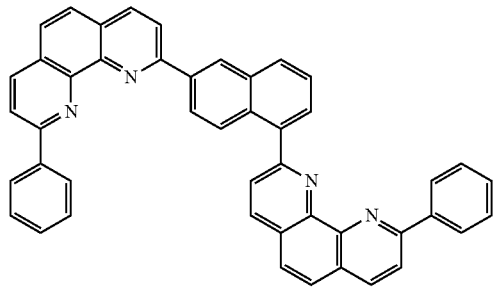
(E53)
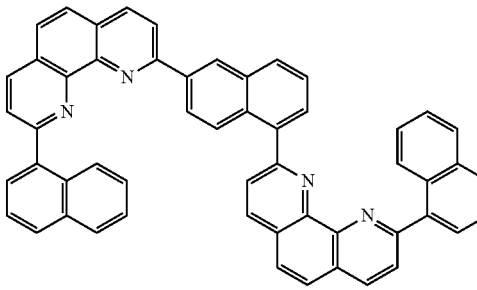

-continued
(E54)
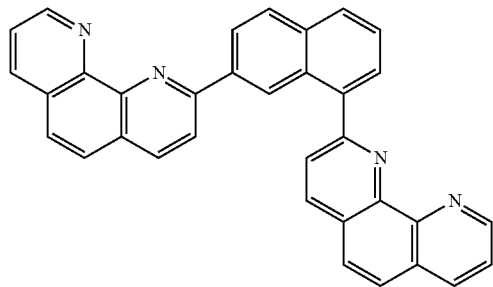
(E55)
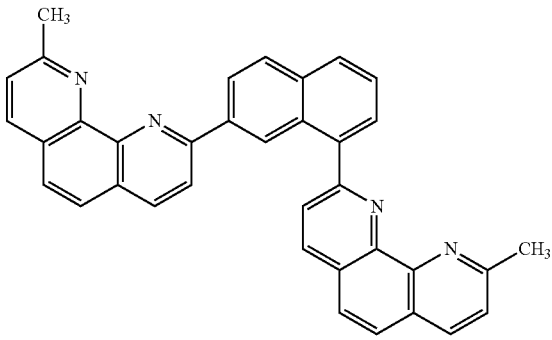
(E56)
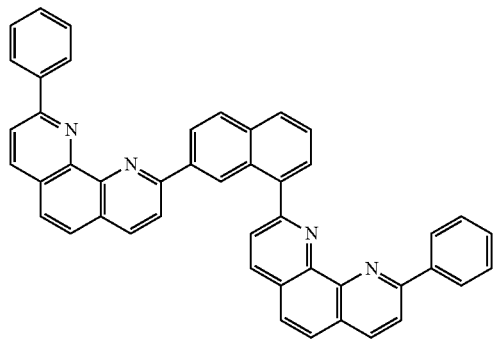
(E57)
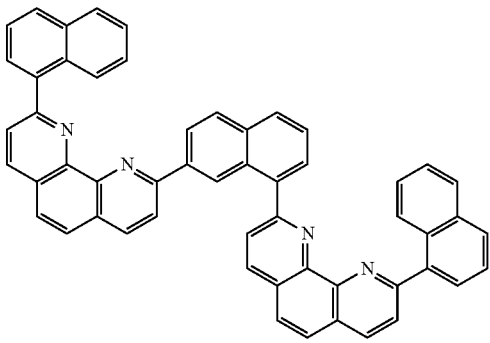
(E58)
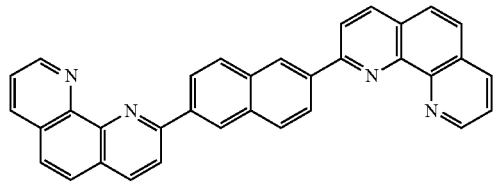
(E59)
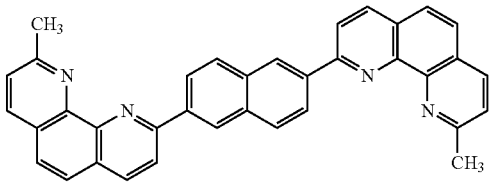
(E60)
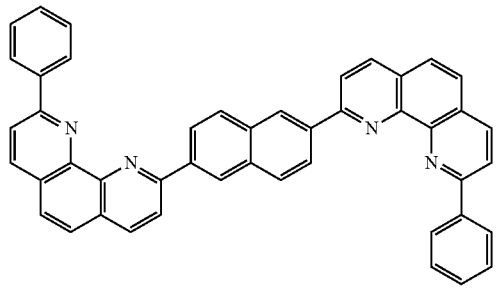
(E61)
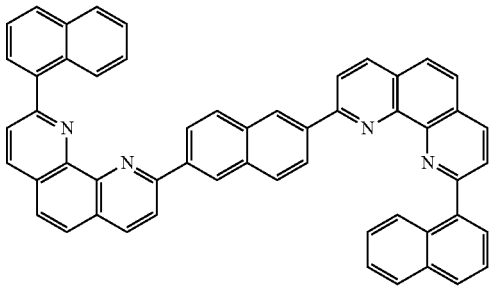
[Chemical Formula 9]
(E62)
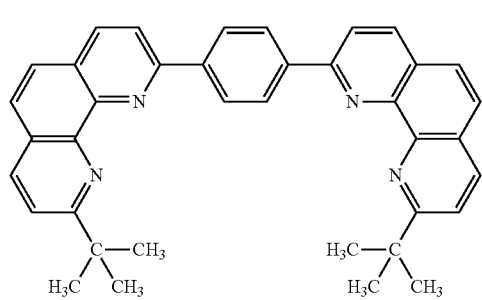
(E63)
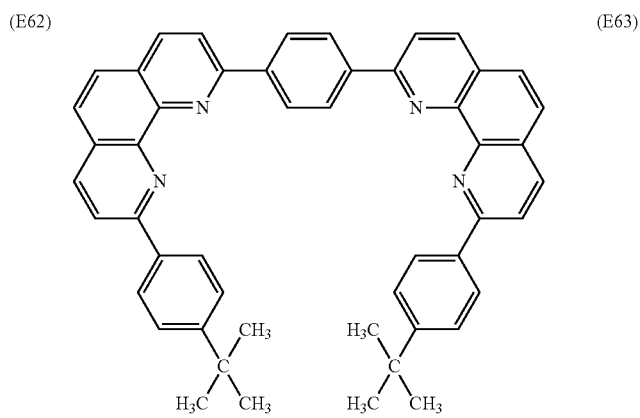

(E64)
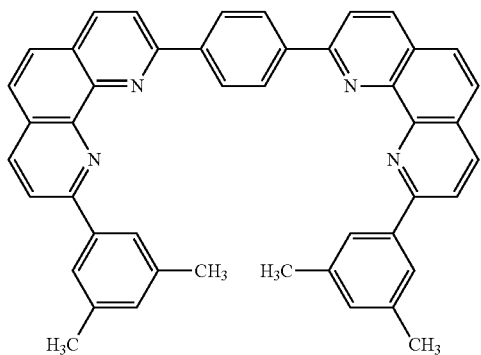
(E65)
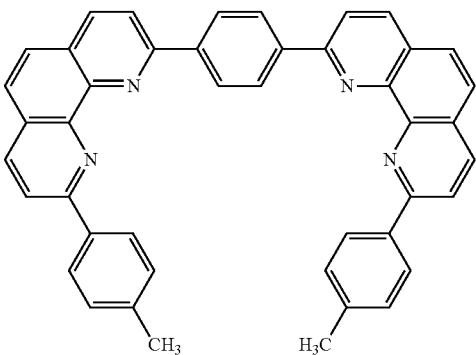
(E66)
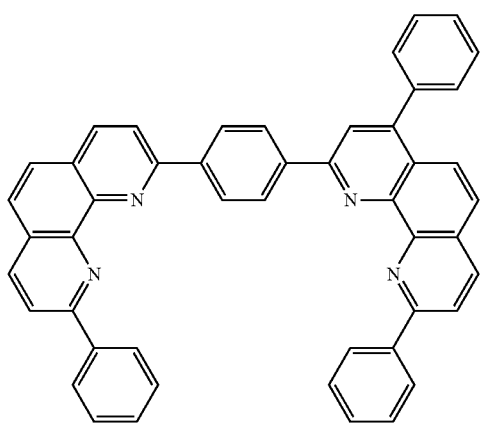
(E67)
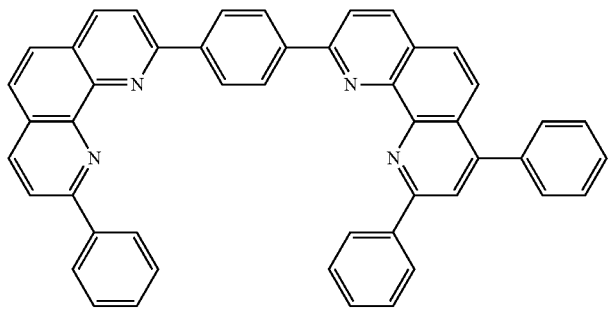
(E68)
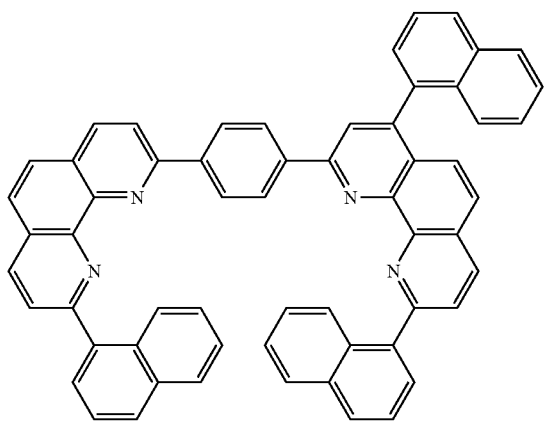

-continued
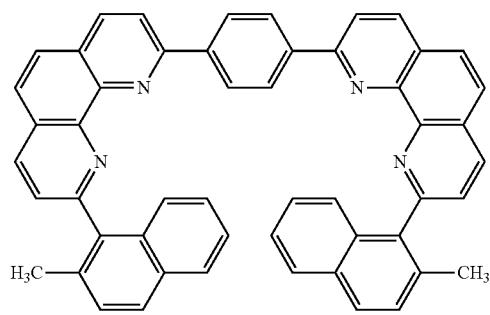
(E69)
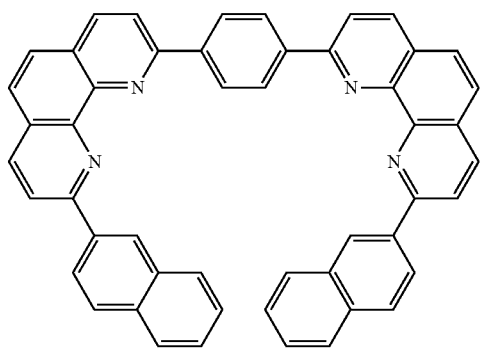
(E70)
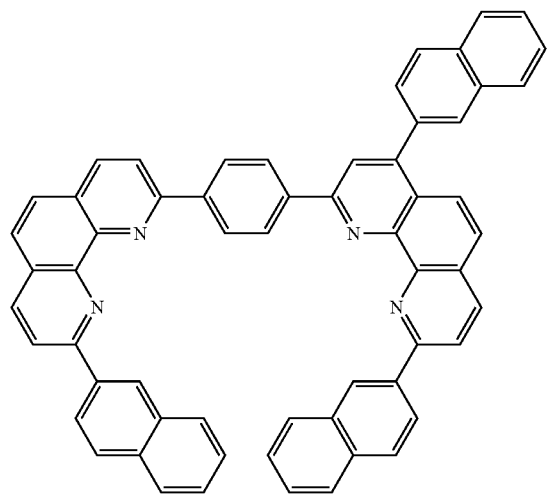
(E71)
[Chemical Formula 10]
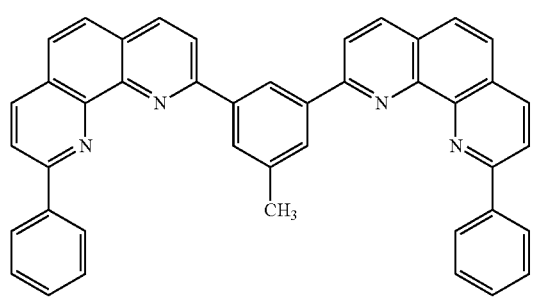
(E72)
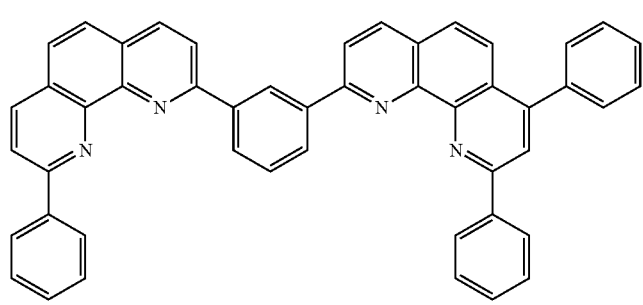
(E73)

(E74)
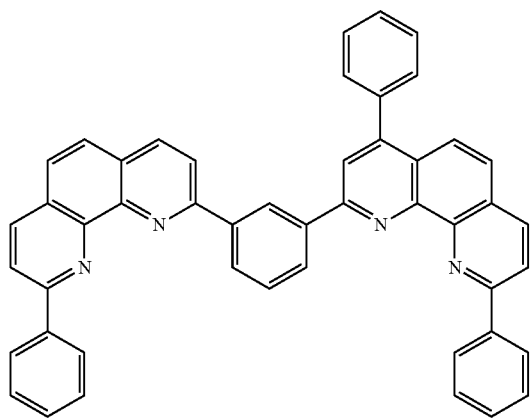
(E75)
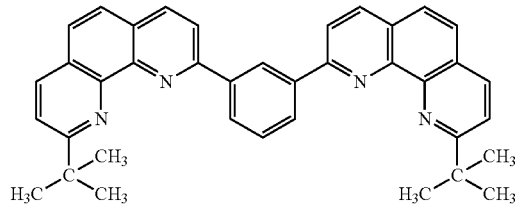
(E76)
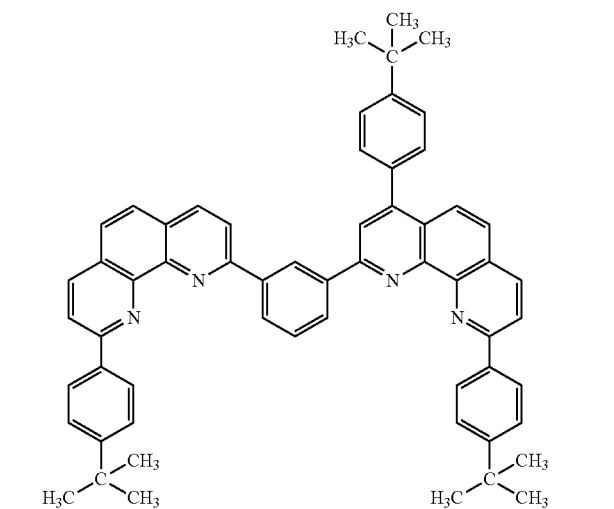
(E77)
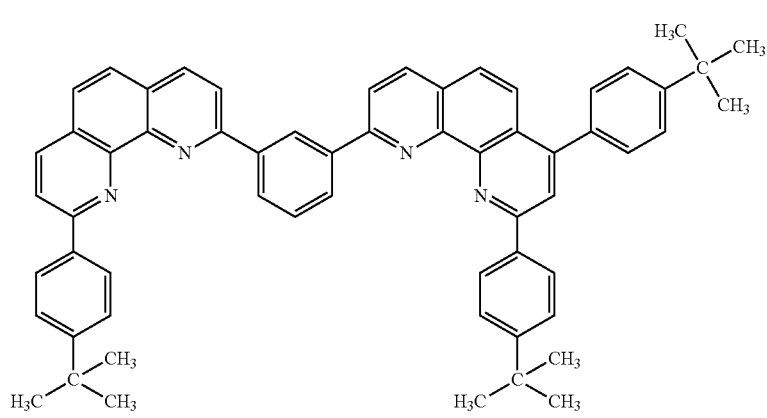

-continued
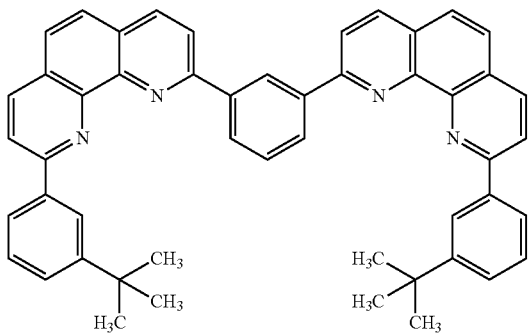
(E78)
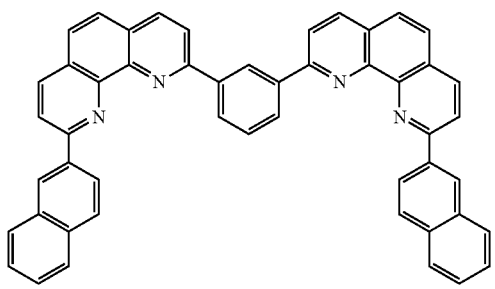
(E79)
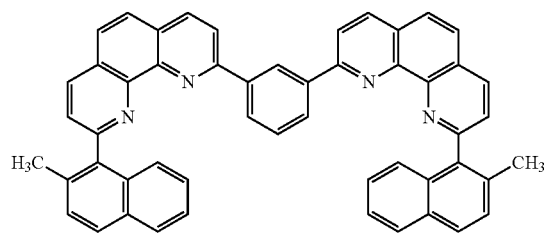
(E80)
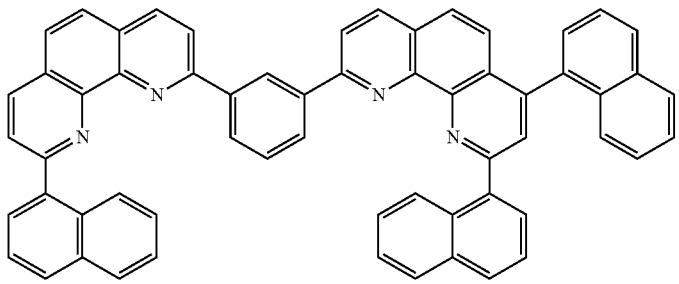
(E81)
[Chemical Formula 11]
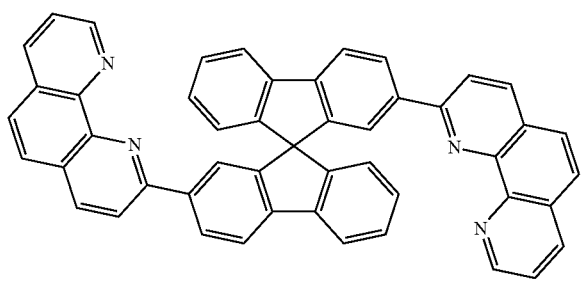
(E82)
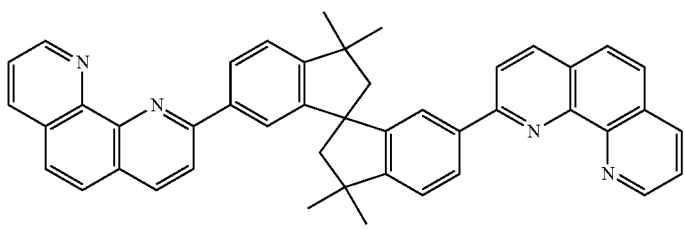
(E83)

-continued
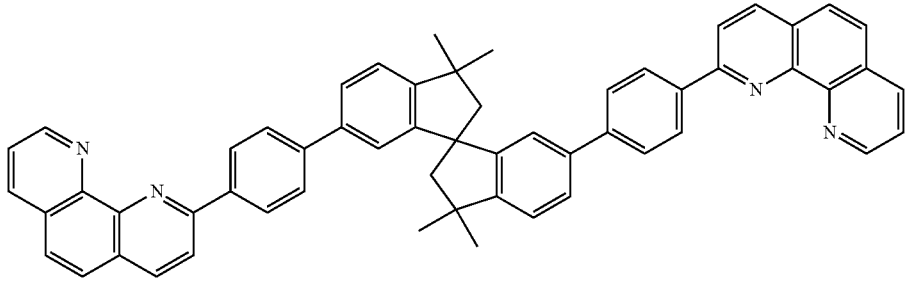
(E84)
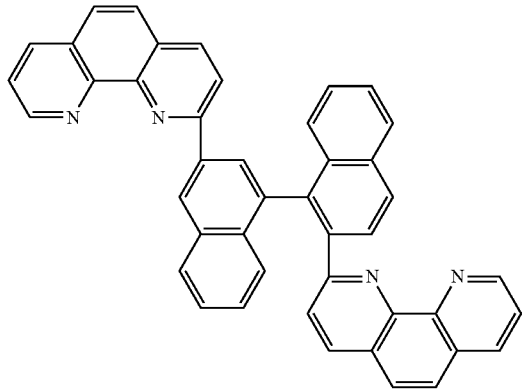
(E85)
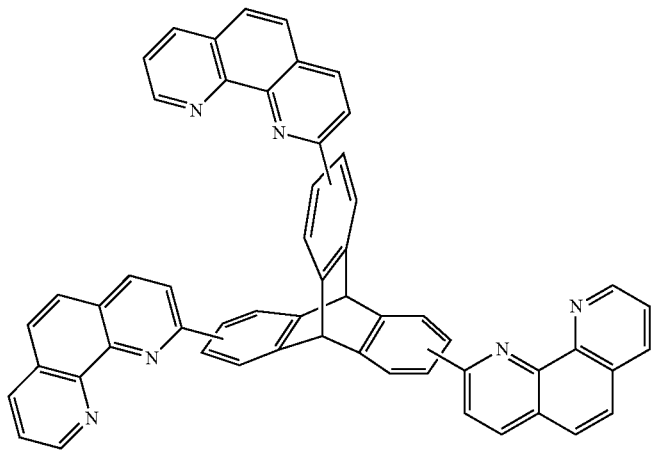
(E86)
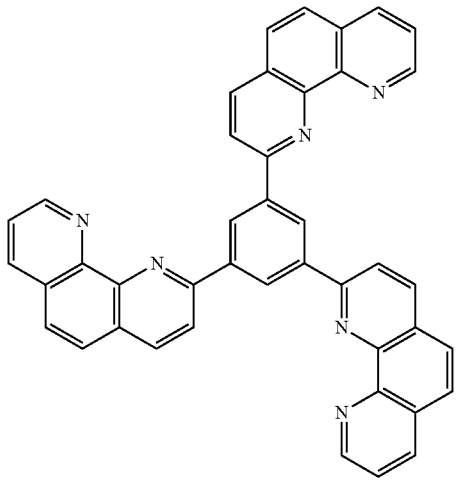
(E86)

-continued
(E87)
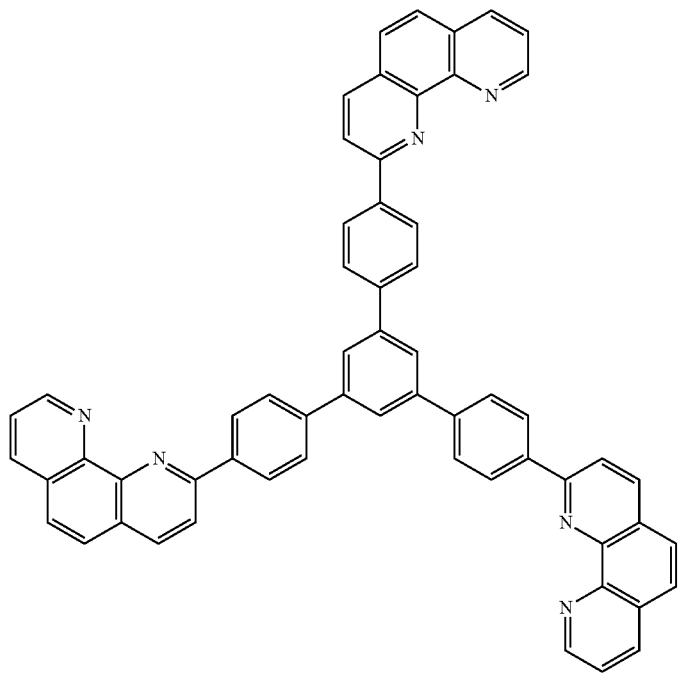
[Chemical Formula 12]
(E88)
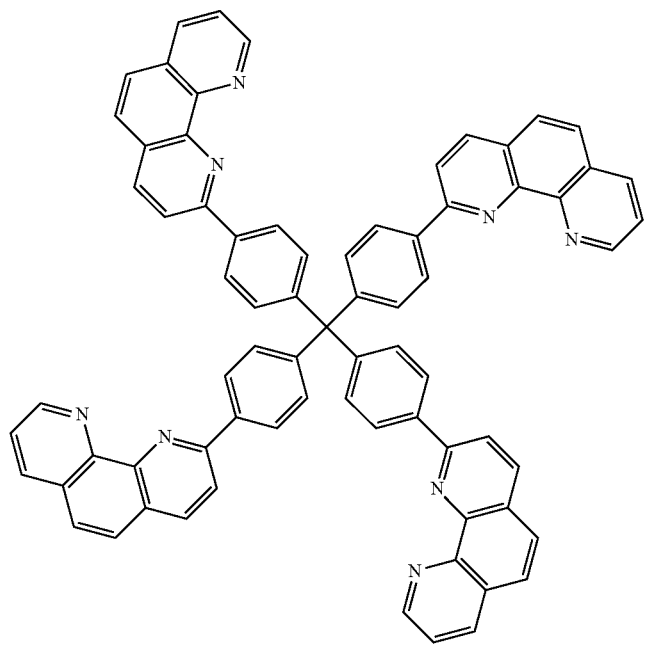
(E89)
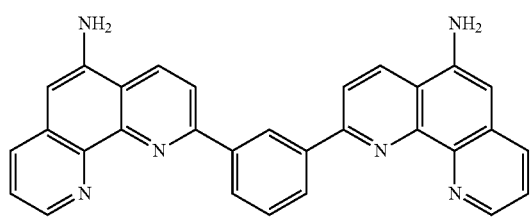
(E90)
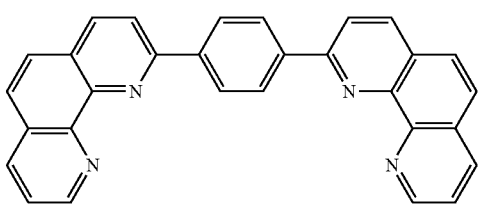

-continued
(E91)
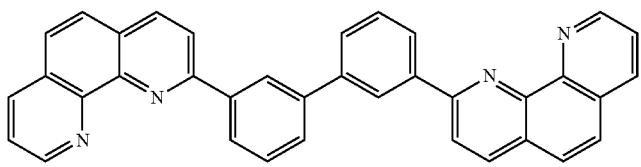
(E92)
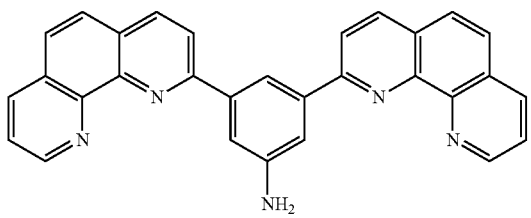
(E93)
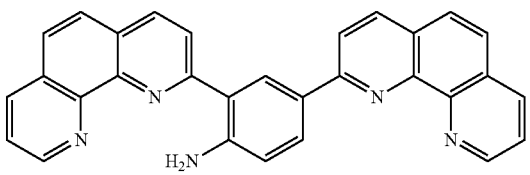
(E94)
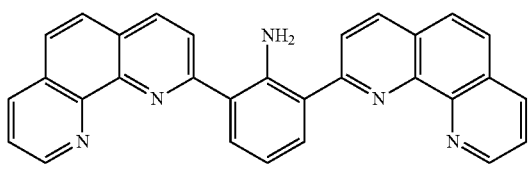
(E95)
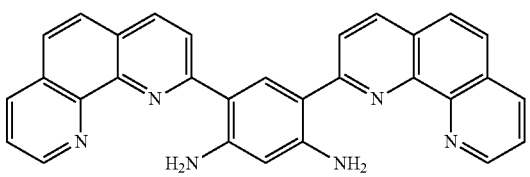
(E96)
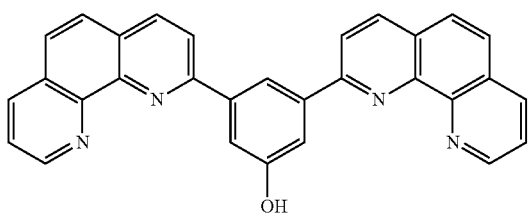
(E97)
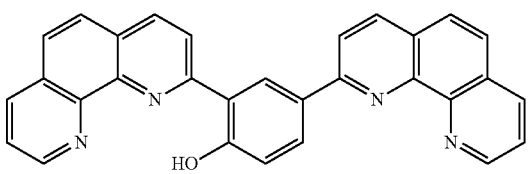
(E98)
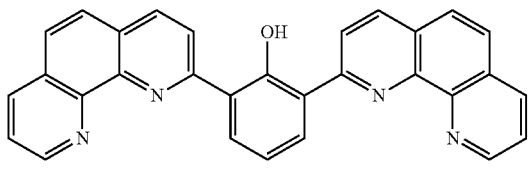
(E99)
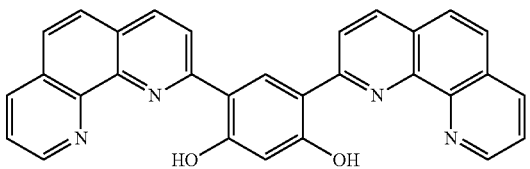
(E100)
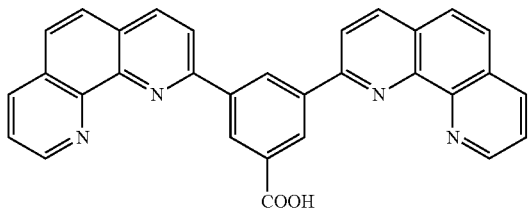
(E101)
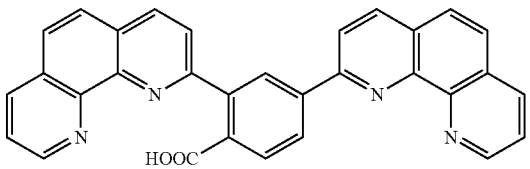
[Chemical Formula 13]
(E102)
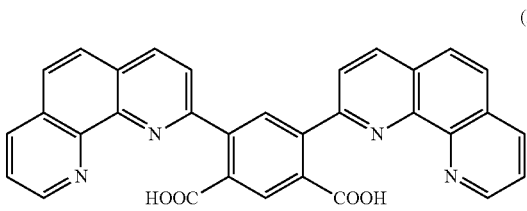
(E103)
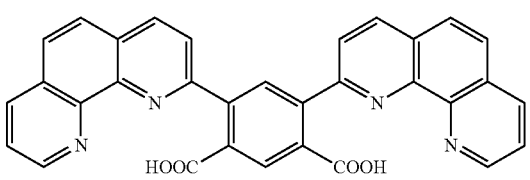

-continued
(E104)
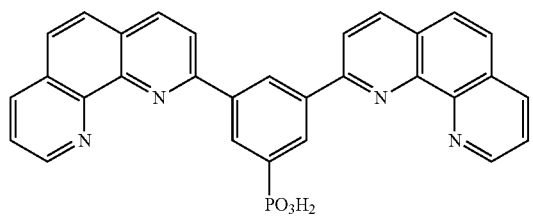
(E105)
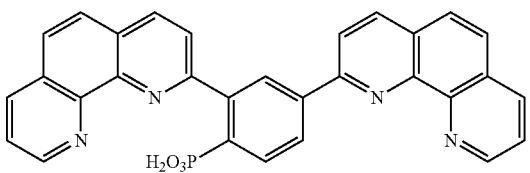
(E106)
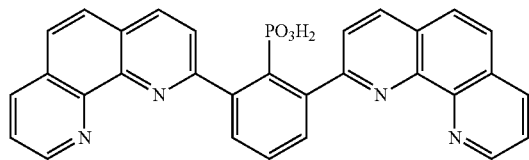
(E107)
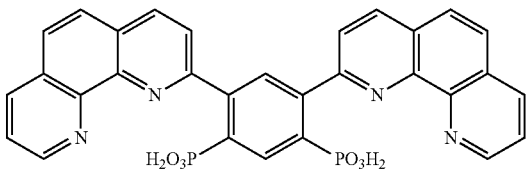
(E108)
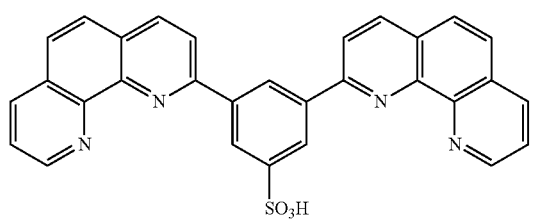
(E109)
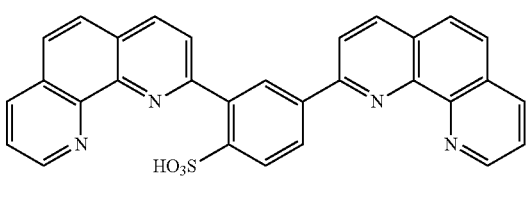
(E110)
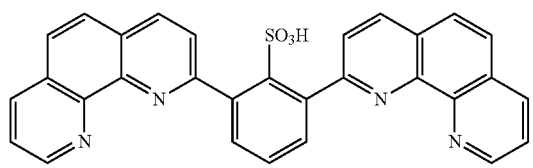
(E111)
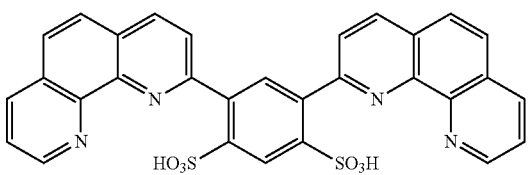
(E112)
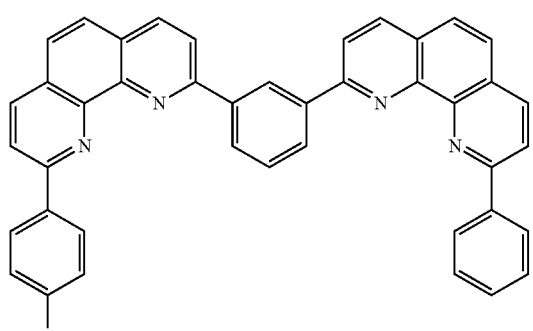
(E113)
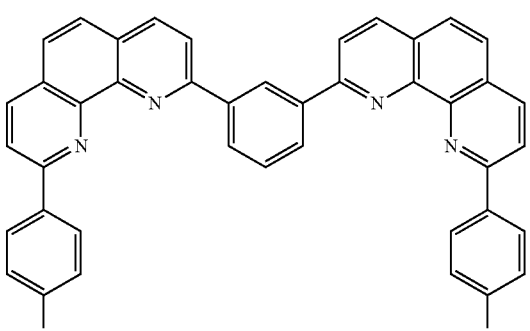
(E114)
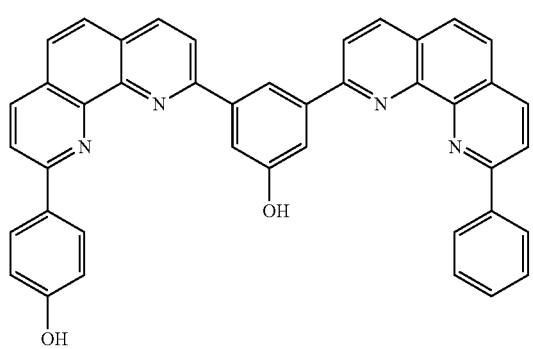
(E115)
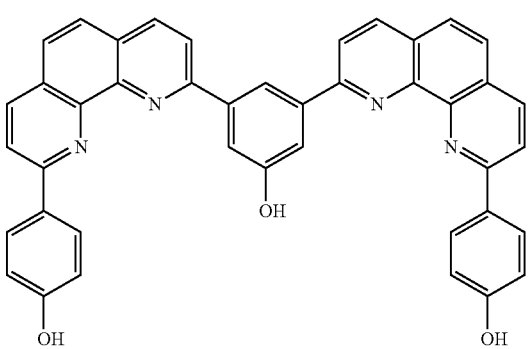

(E116)
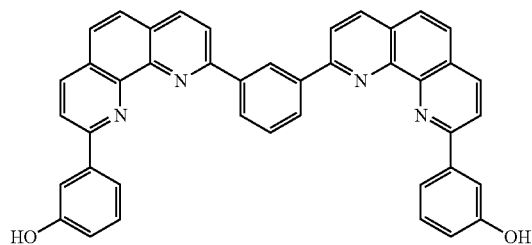
(E117)
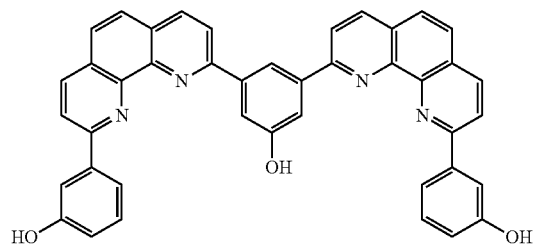
[Chemical Formula 14]
(E118)
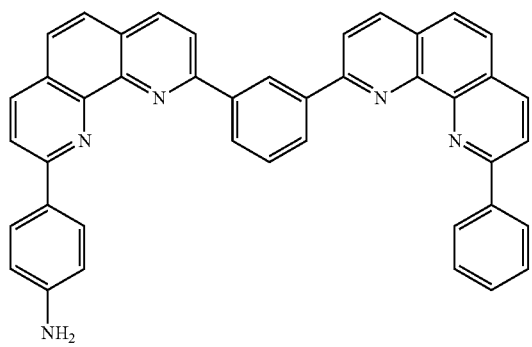
(E119)
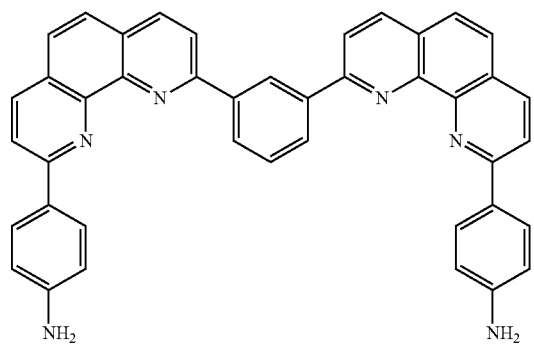
(E120)
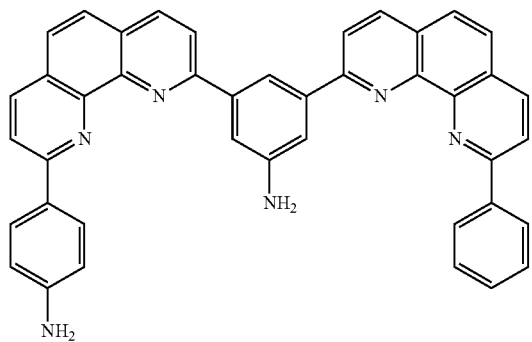
(E121)
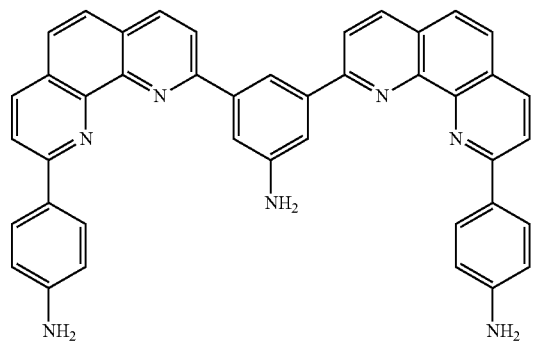
(E122)
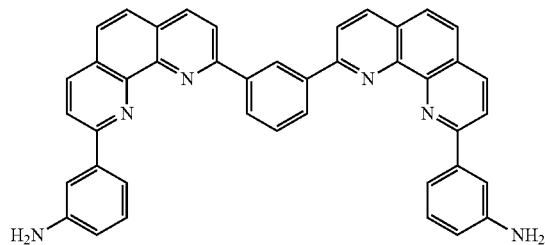
(E123)
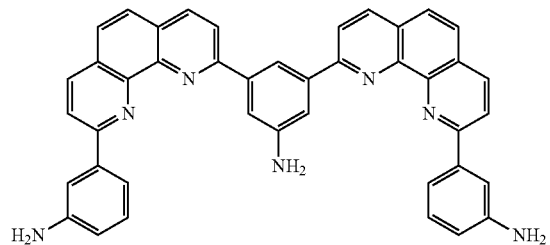

-continued
(E124)
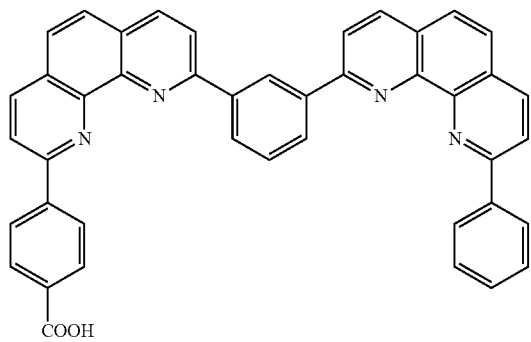
(E125)
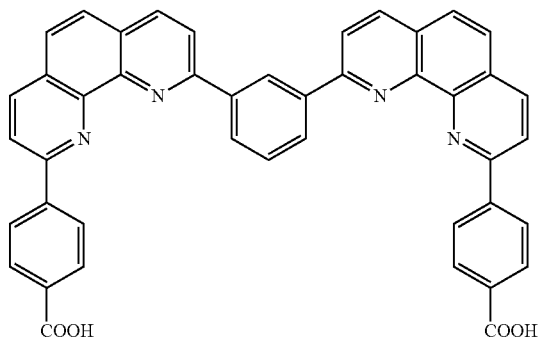
(E126)
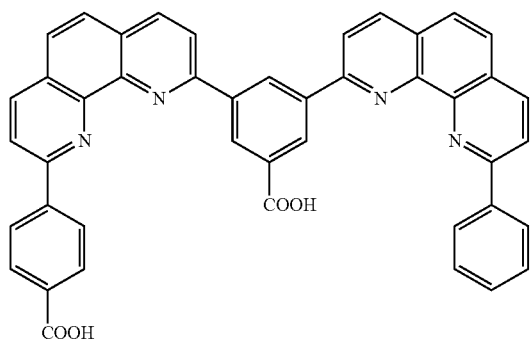
(E127)
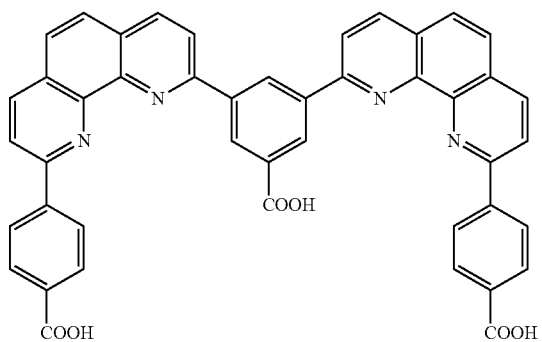
(E128)
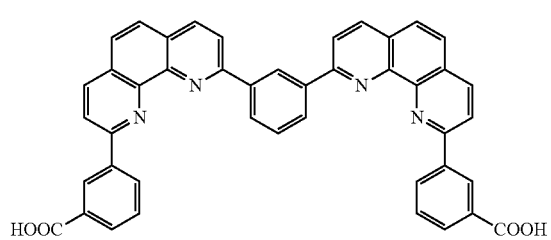
(E129)
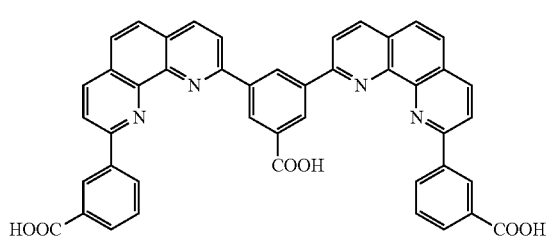
[Chemical Formula 15]
(E130)
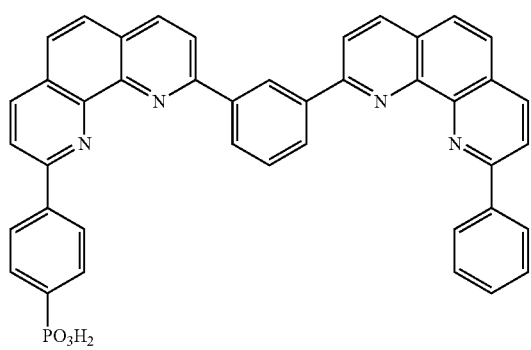
(E131)
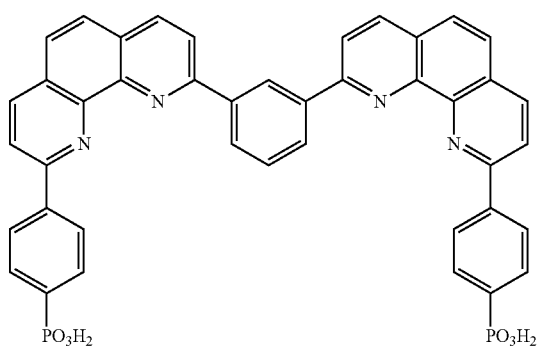

(E132)
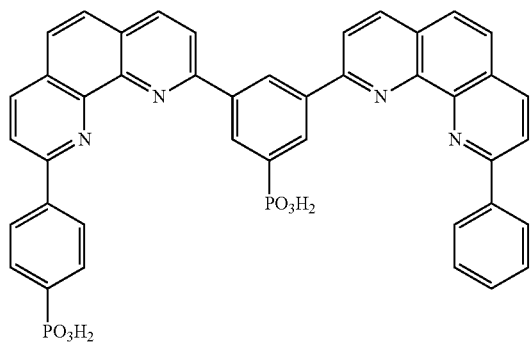
(E133)
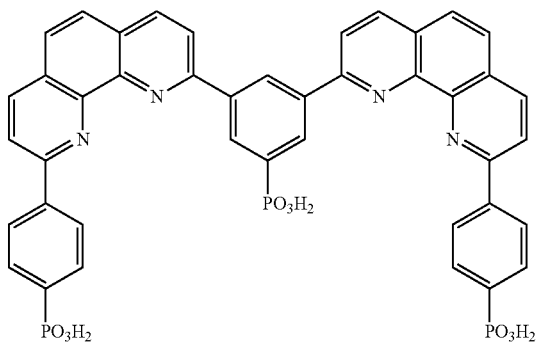
(E134)
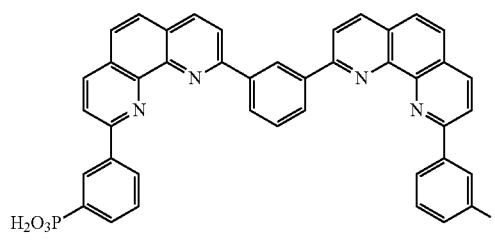
(E135)
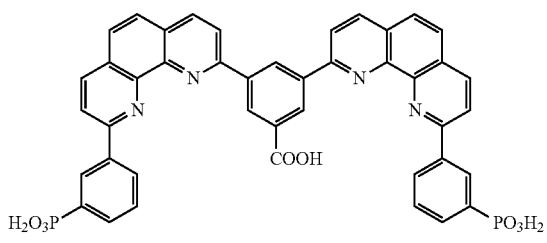
(E136)
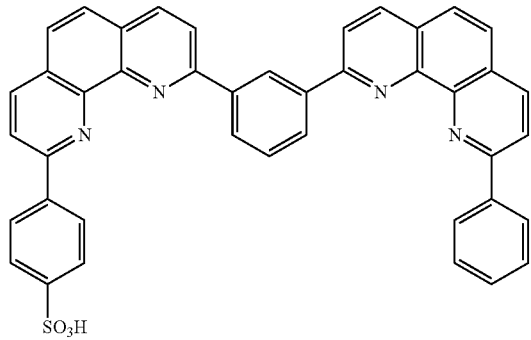
(E137)
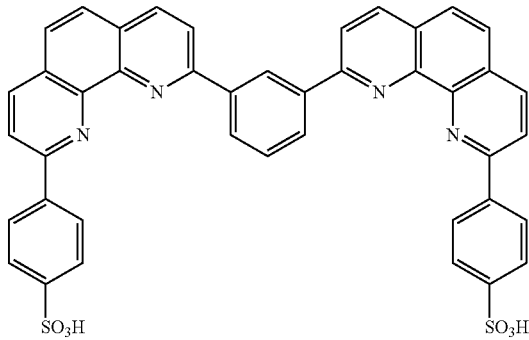
(E138)
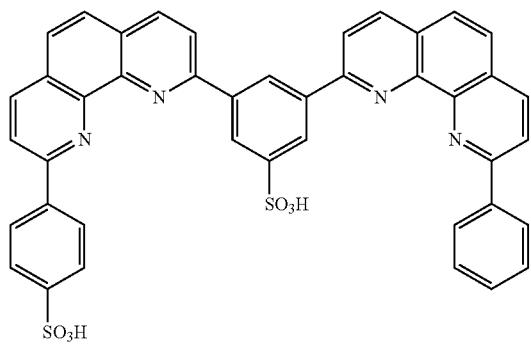
(E139)
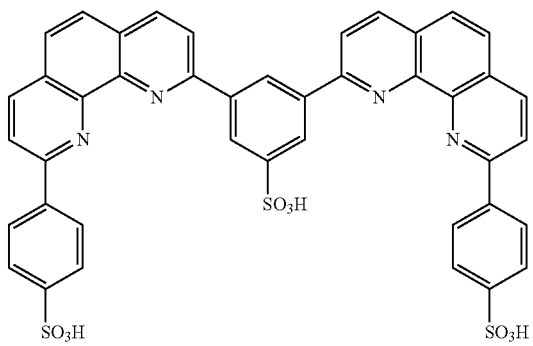
(E140)
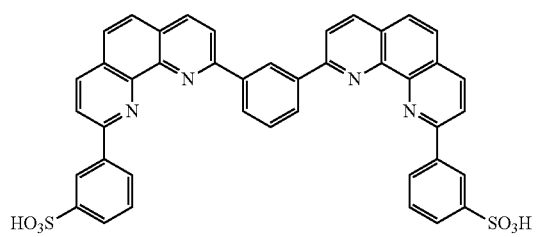
(E141)
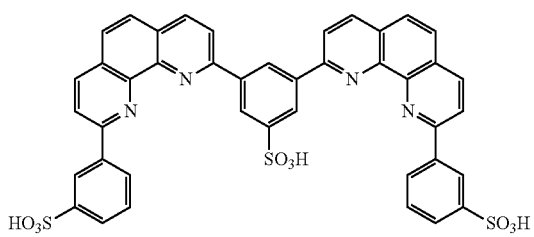

[Chemical Formula 16]
(E142)
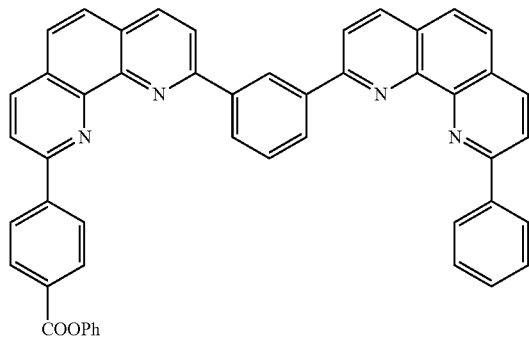
(E143)
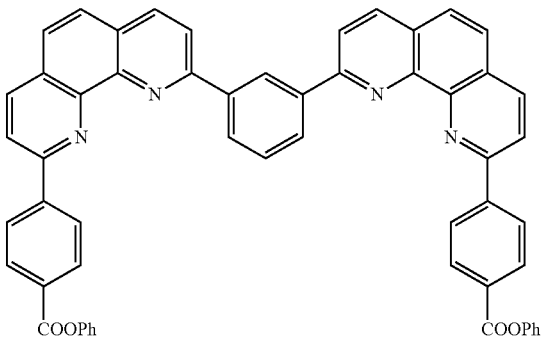
(E144)
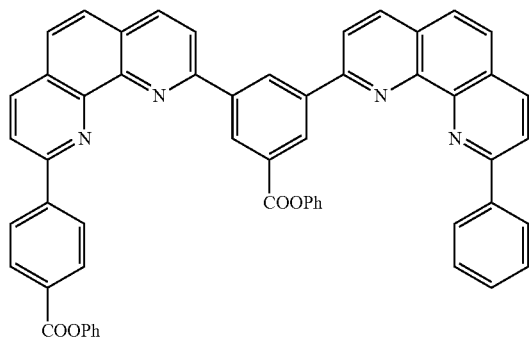
(E145)
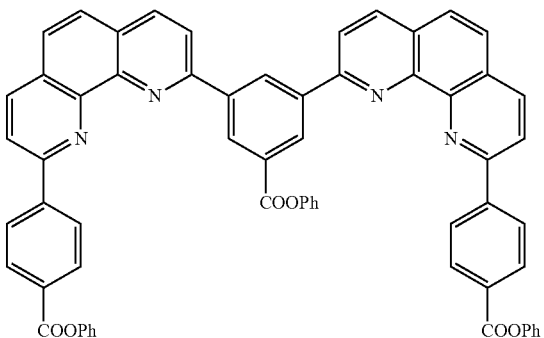
(E146)
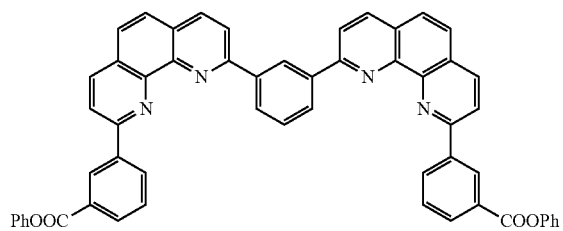
(E147)
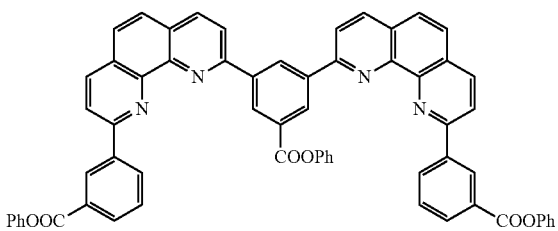
(E148)
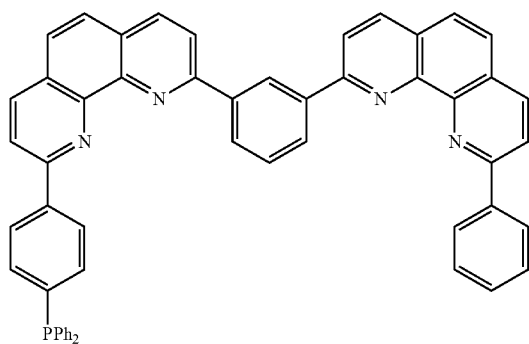
(E149)
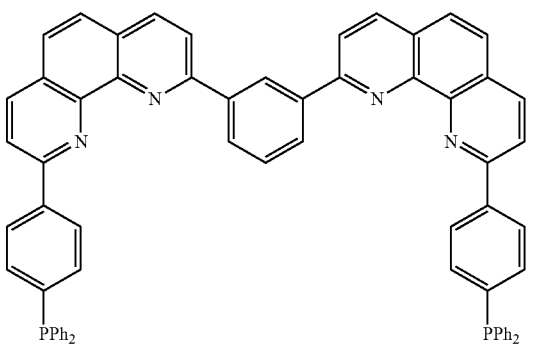

[Chemical Formula 17]
-continued
(E150) 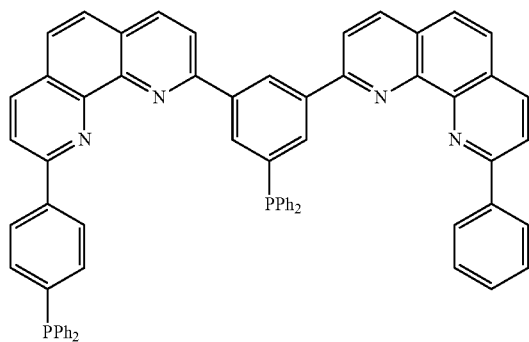
(E151) 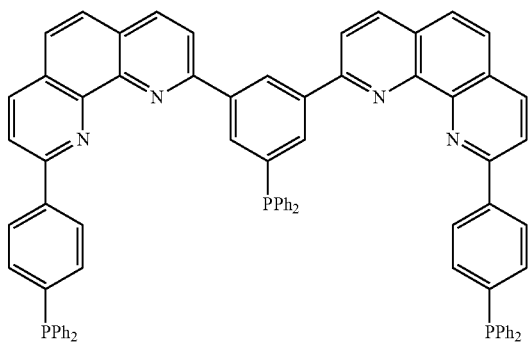
(E152) 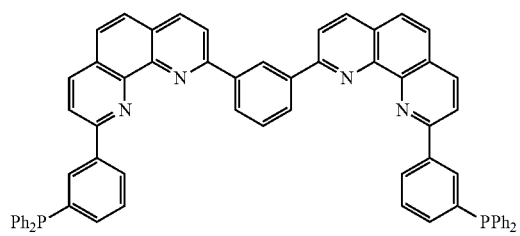
(E153) 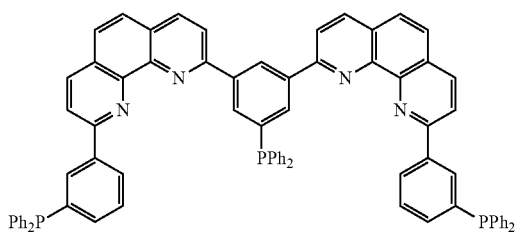
(E154) 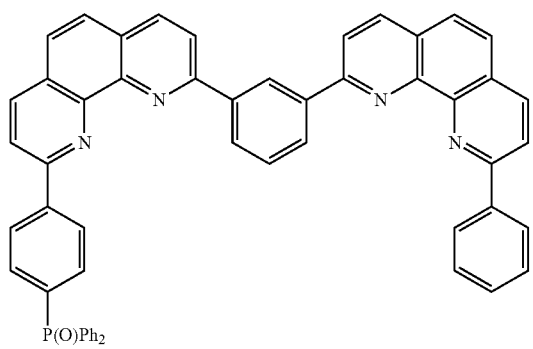
(E155) 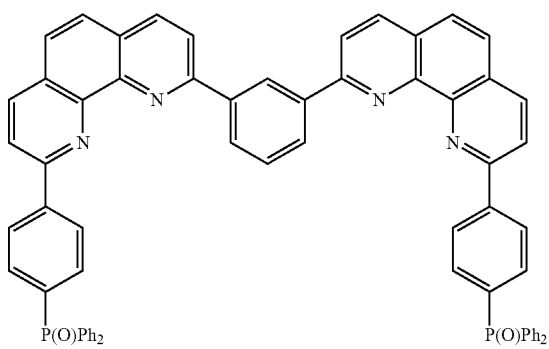
(E156) 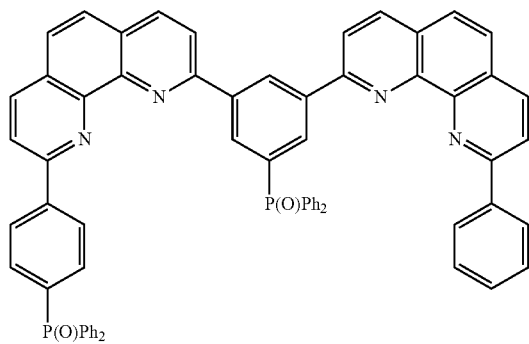
(E157) 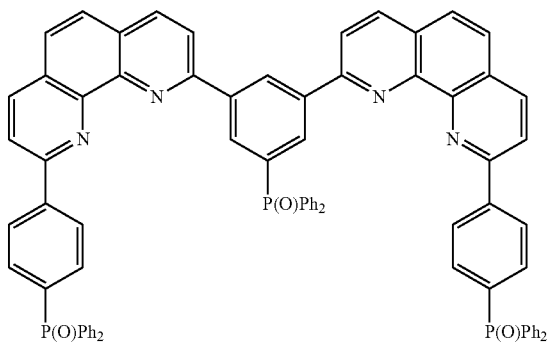

[Chemical Formula 18]
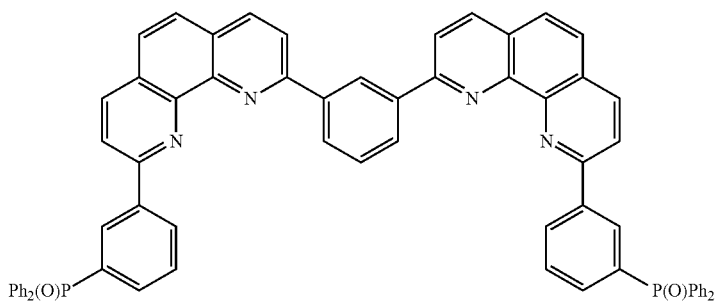
(E158)
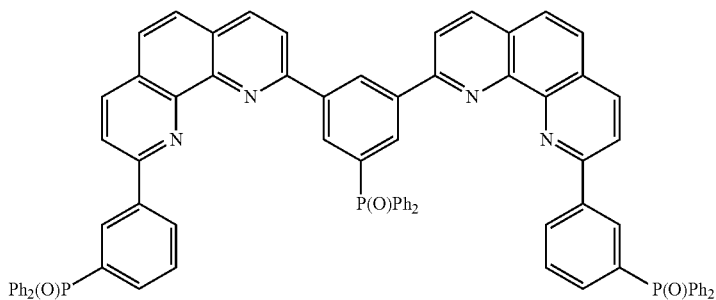
(E159)
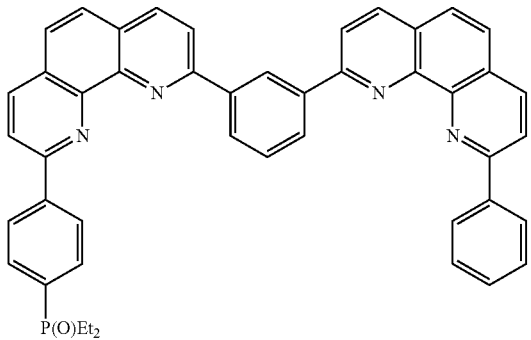
(E160)
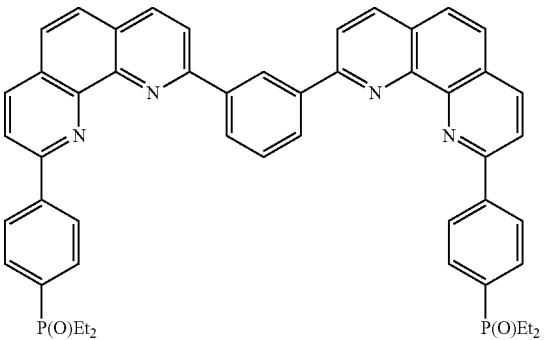
(E161)
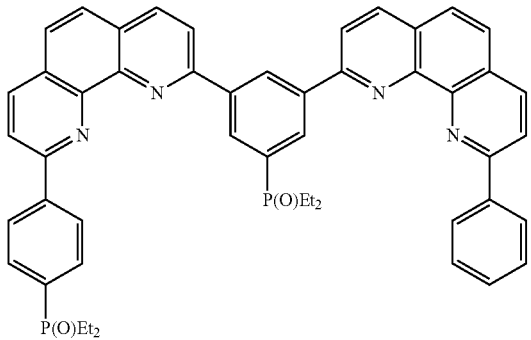
(E162)
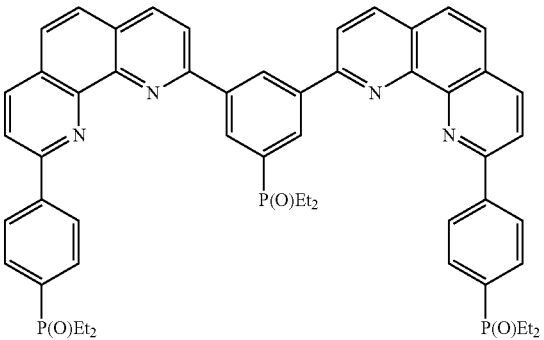
(E163)

-continued
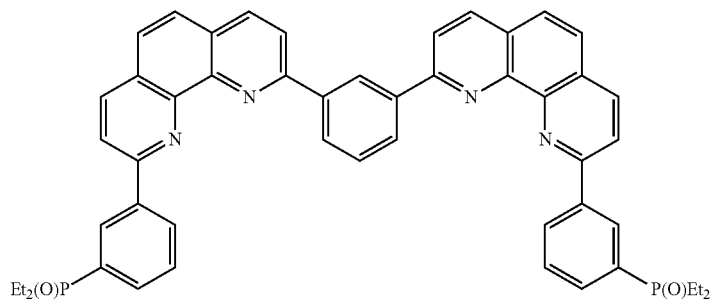
(E164)
[Chemical Formula 19]
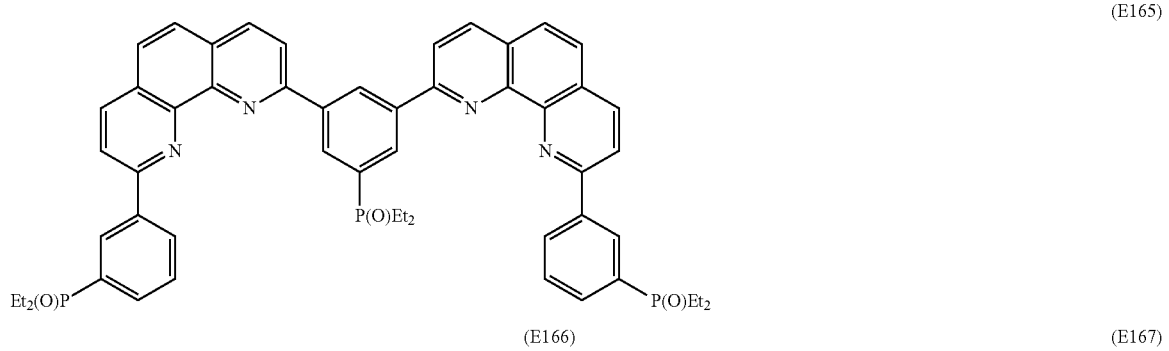
(E165)
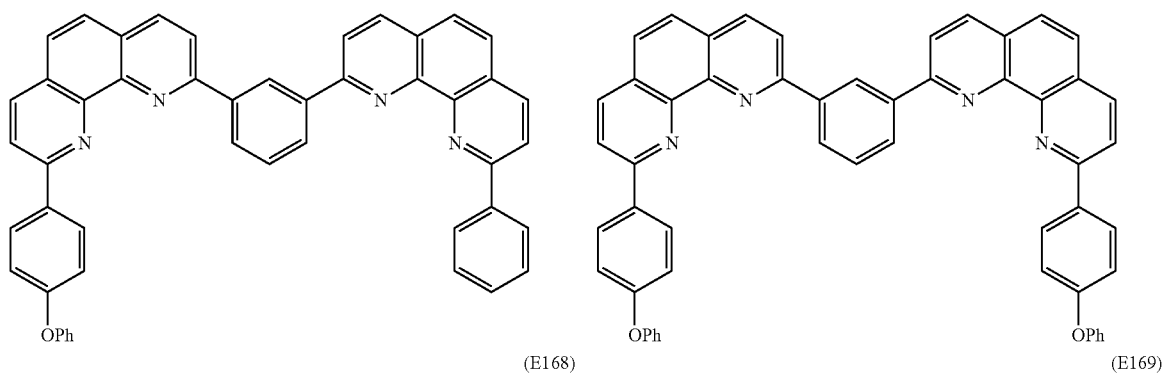
(E166) (E167)
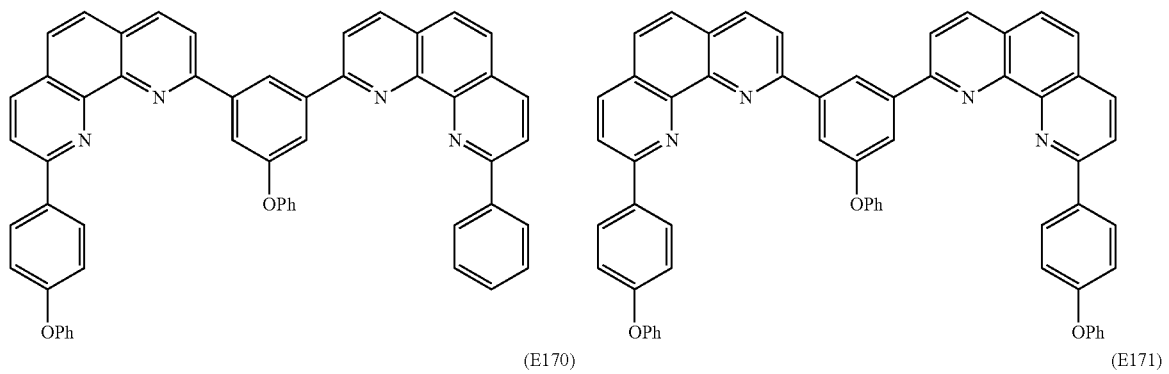
(E168) (E169)
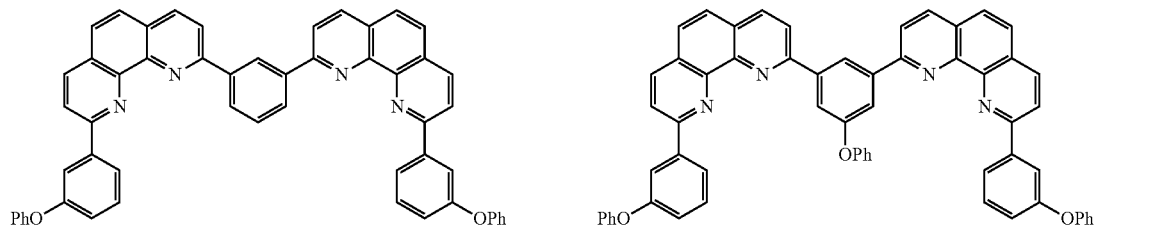
(E170) (E171)

[Chemical Formula 20]
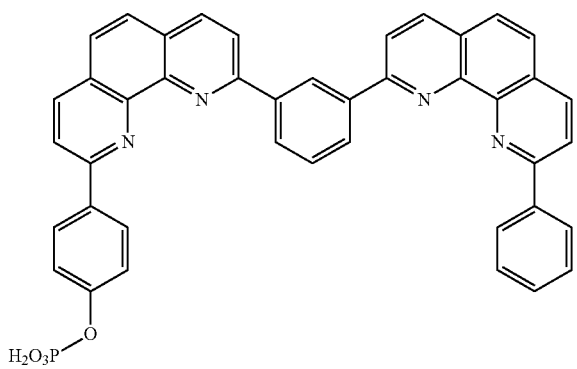
(E172)
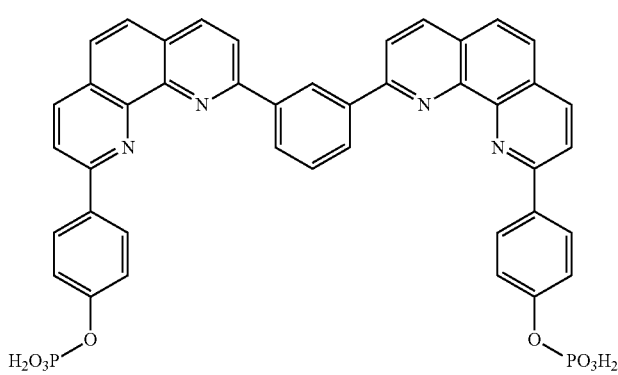
(E173)
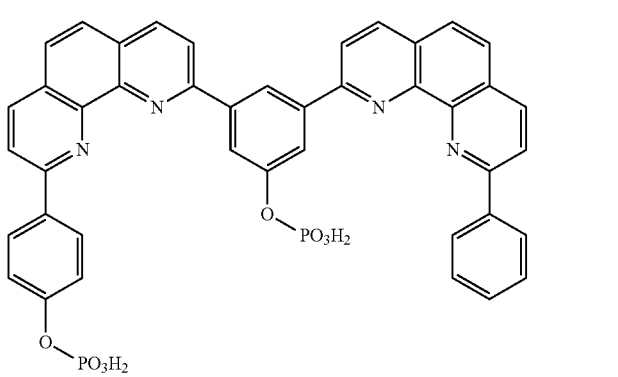
(E174)
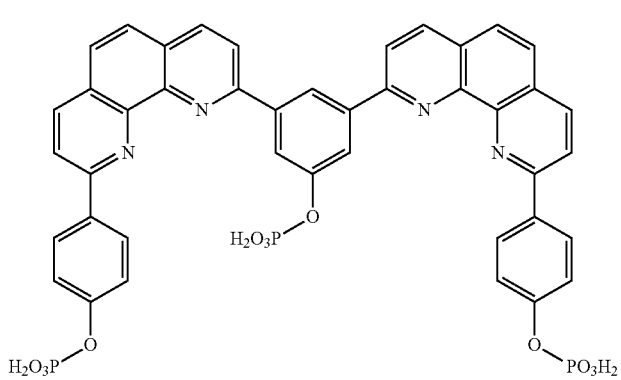
(E175)

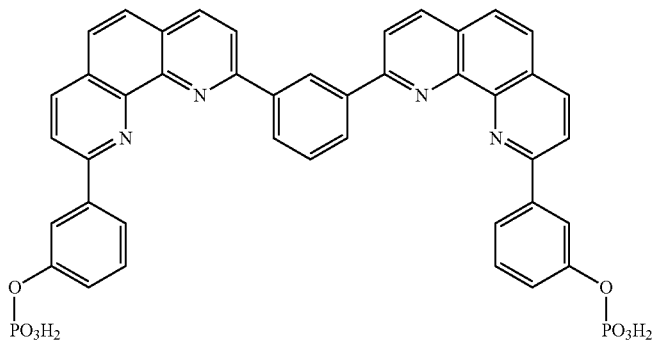
(E176)
[Chemical Formula 21]
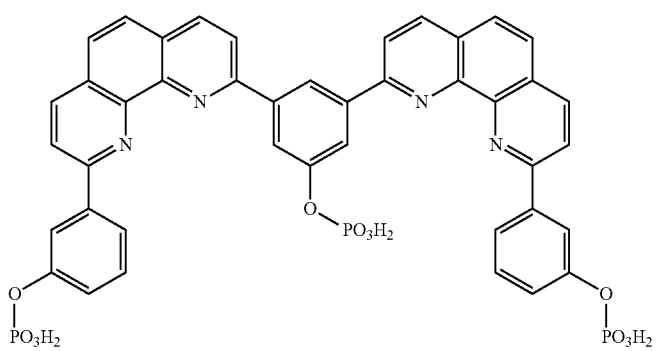
(E177)
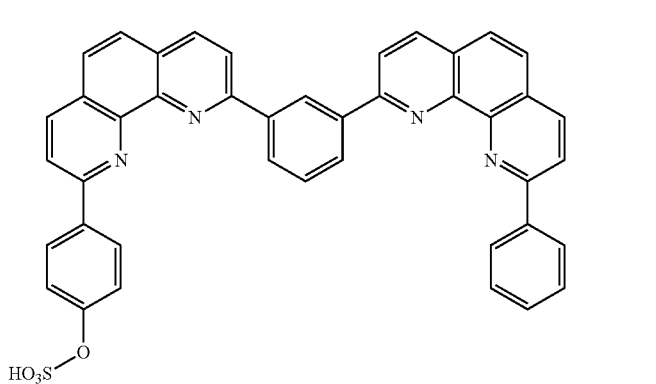
(E178)
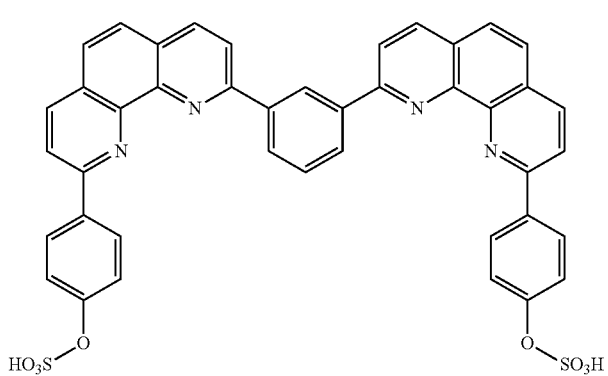
(E179)

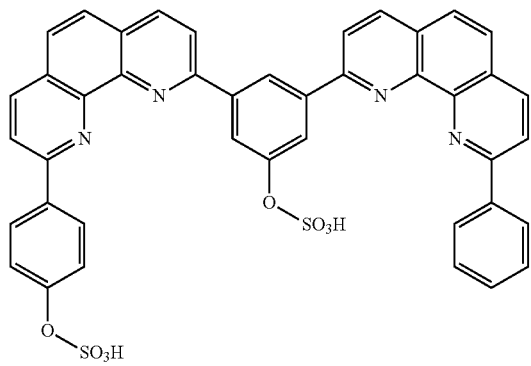
(E180)
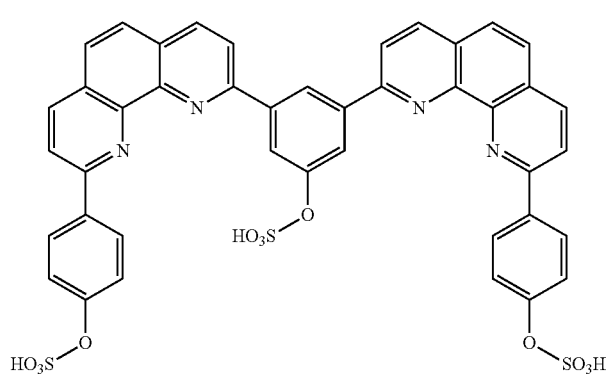
(E181)
[Chemical Formula 22]
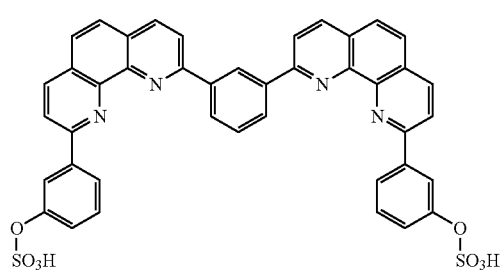
(E182)
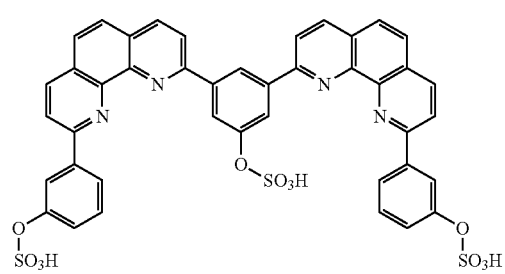
(E183)
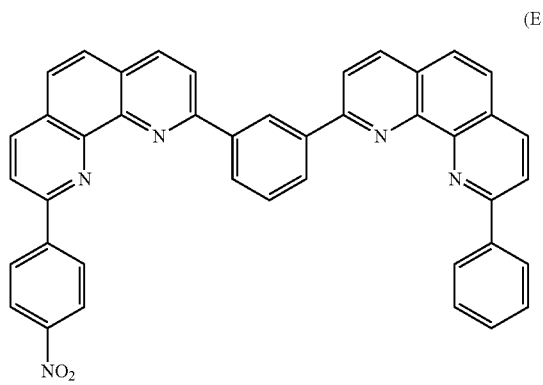
(E184)
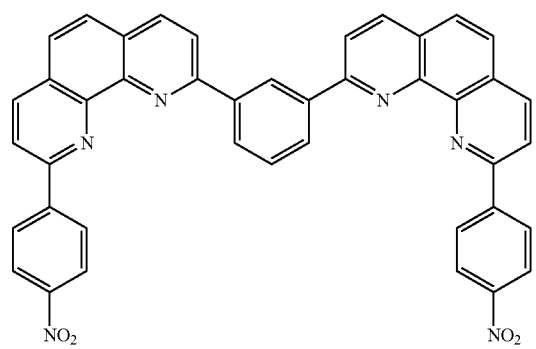
(E185)

-continued
(E186)
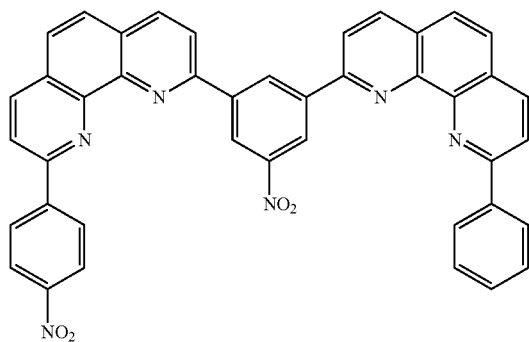
(E187)
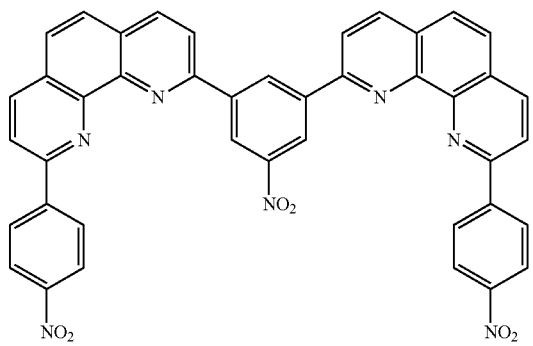
(E188)
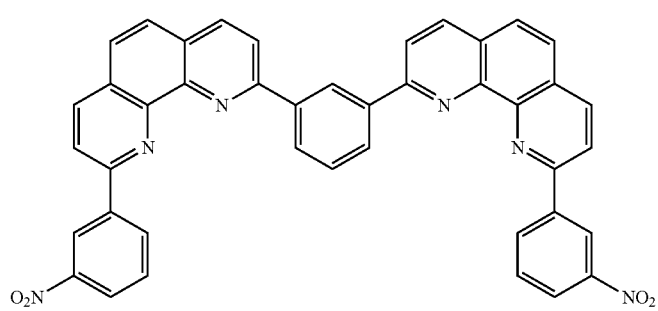
[Chemical Formula 23]
(E189)
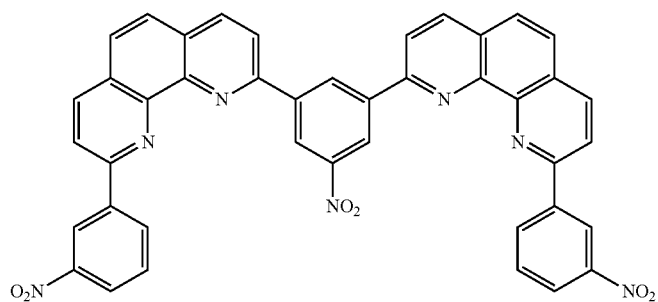
(E190)
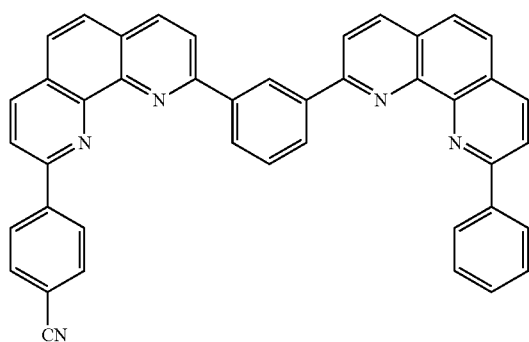
(E191)
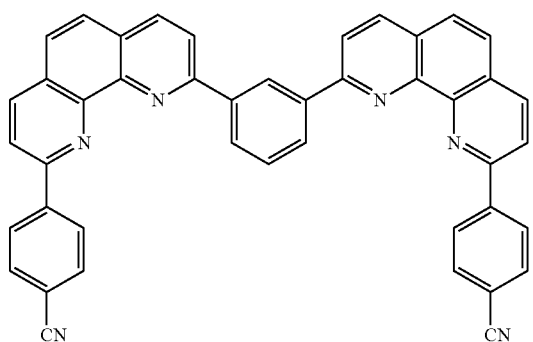

(E192)
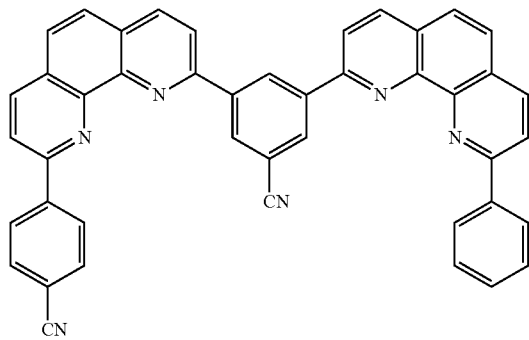
(E193)
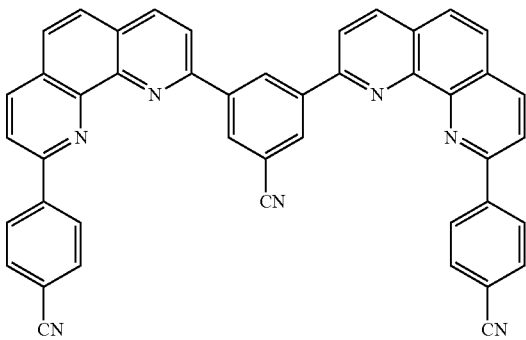
(E194)
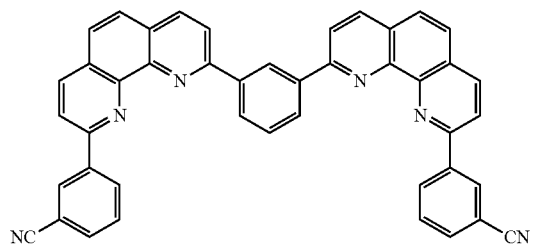
(E195)
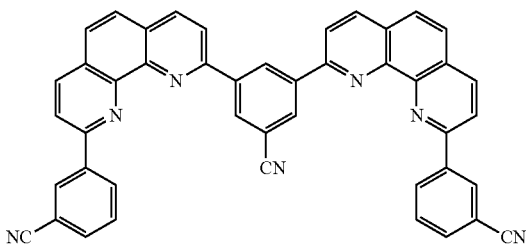
[Chemical Formula 24]
(E196)
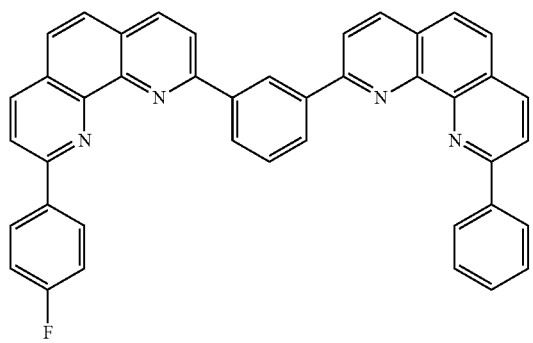
(E197)
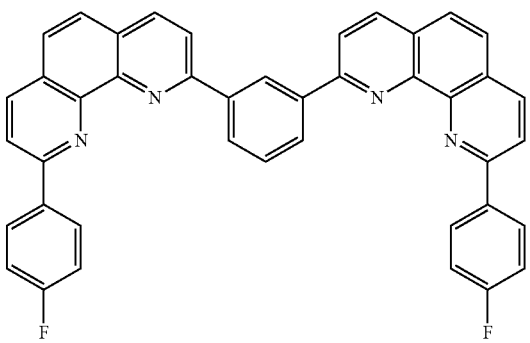
(E198)
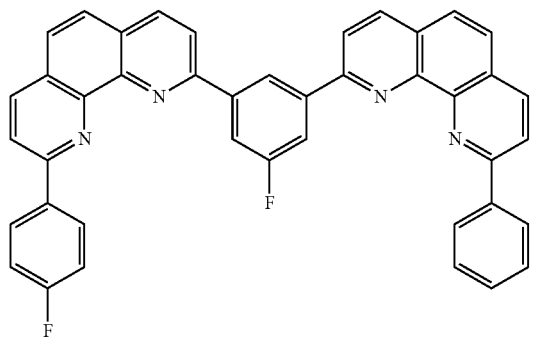
(E199)
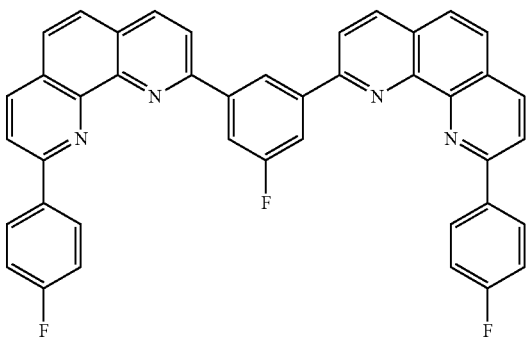
(E200)
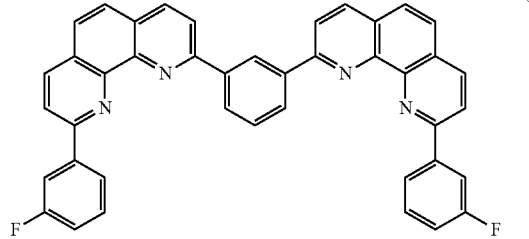
(E201)
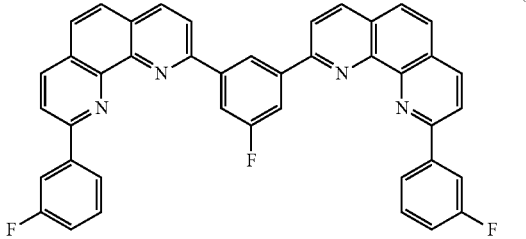

-continued
(E202)
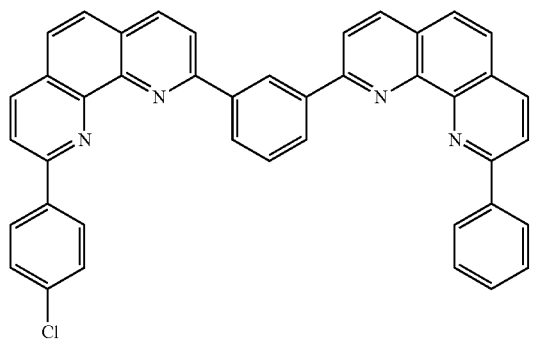
(E203)
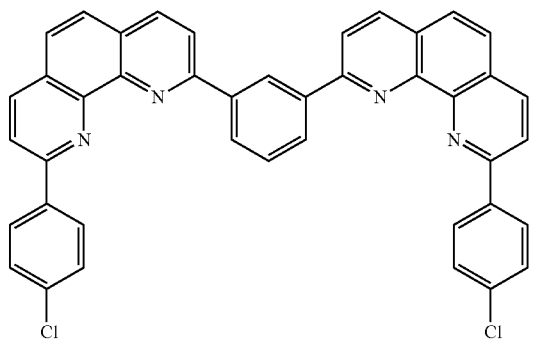
[Chemical Formula 25]
(E204)
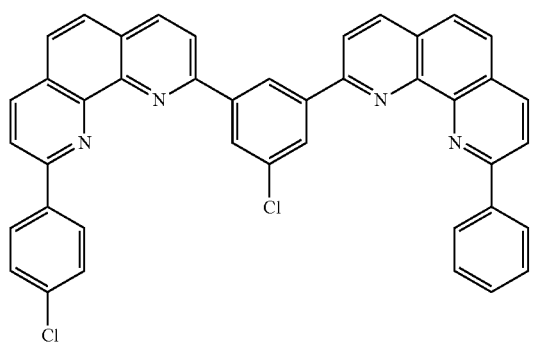
(E205)
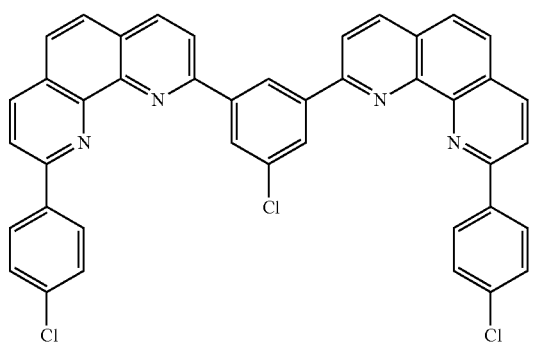
(E206)
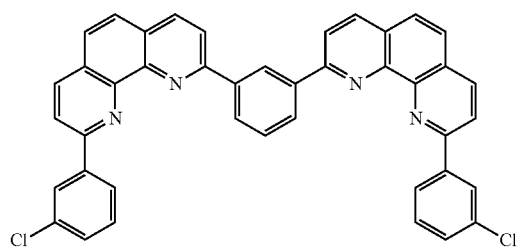
(E207)
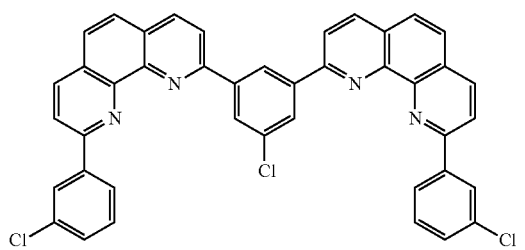
(E208)
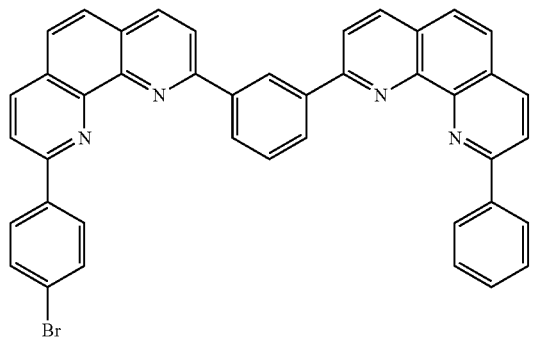
(E209)
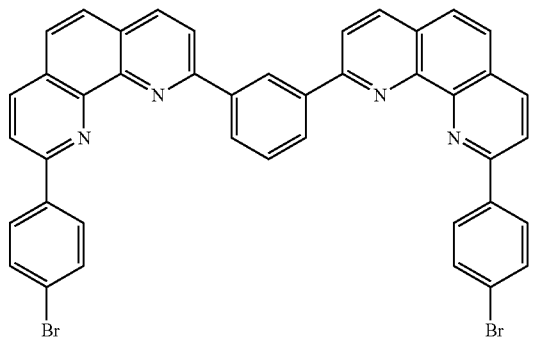

-continued
(E210)
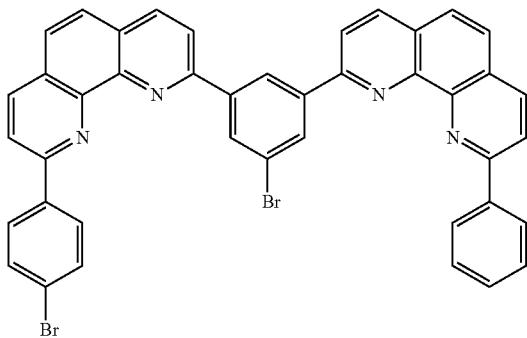
(E211)
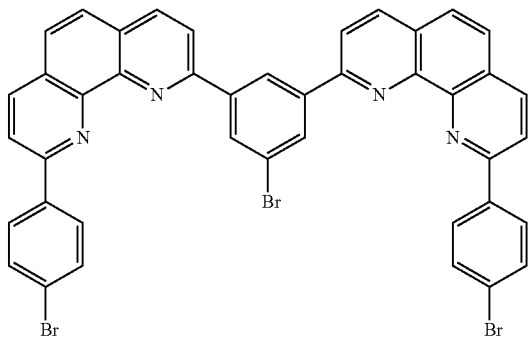
[Chemical Formula 26]
(E212)
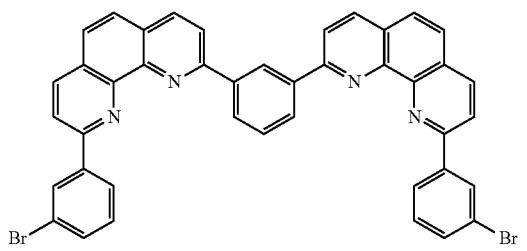
(E213)
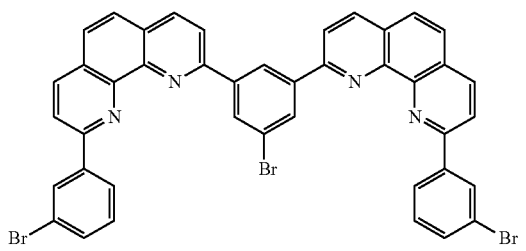
(E214)
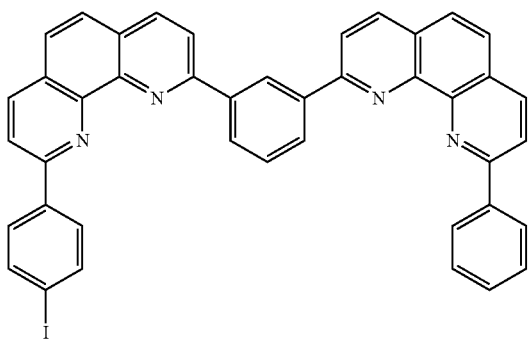
(E215)
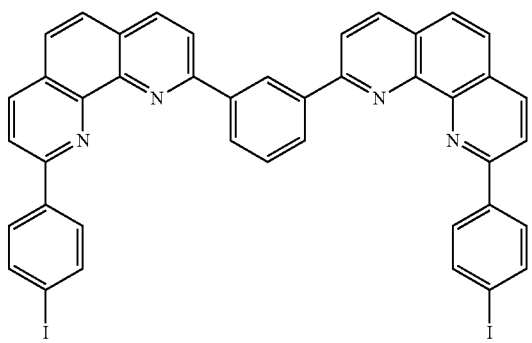
(E216)
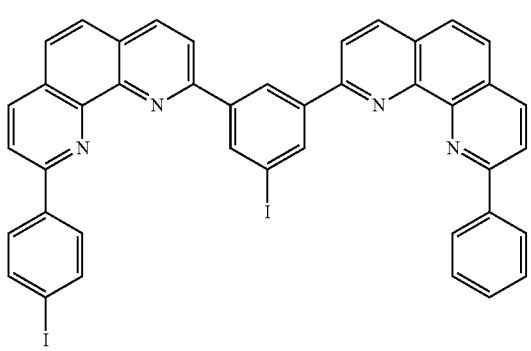
(E217)
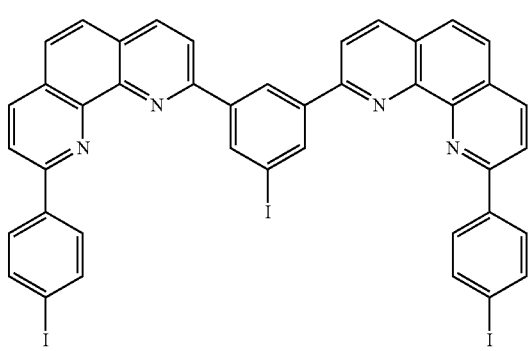
(E218)
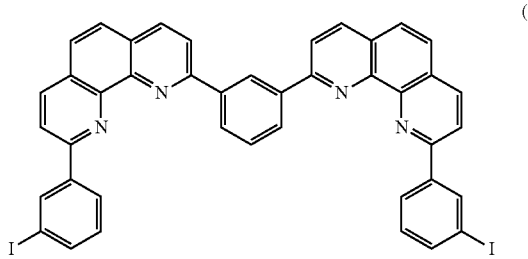
(E219)
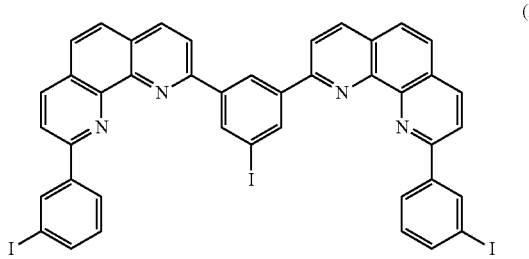

[Chemical Formula 27]
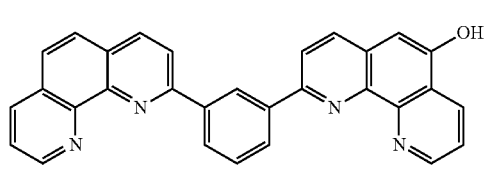 (E220)
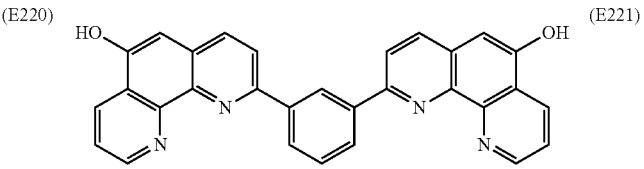 (E221)
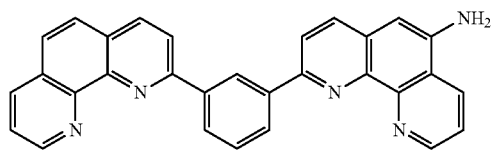 (E222)
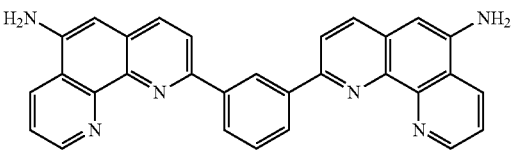 (E223)
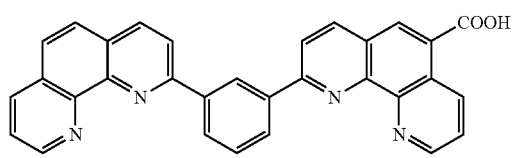 (E224)
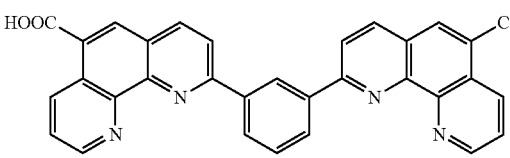 (E225)
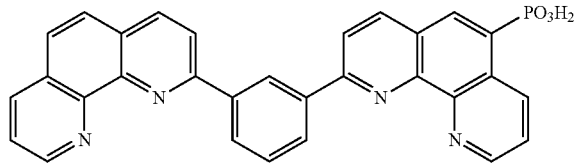 (E226)
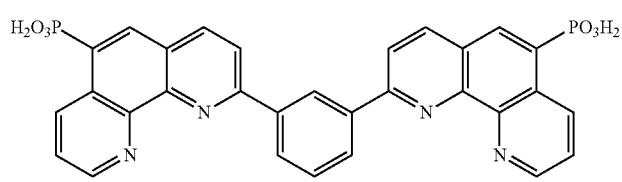 (E227)
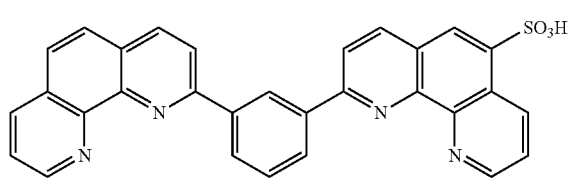 (E228)
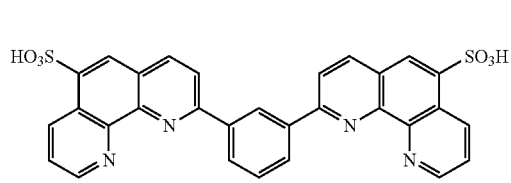 (E229)
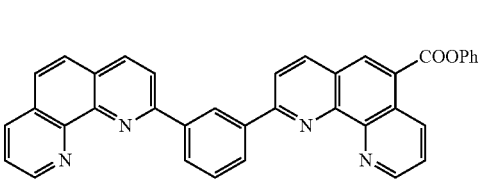 (E230)
[Chemical Formula 28]
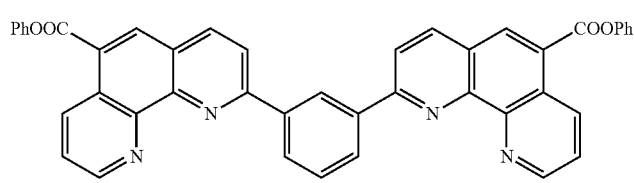 (E231)

-continued
(E232)
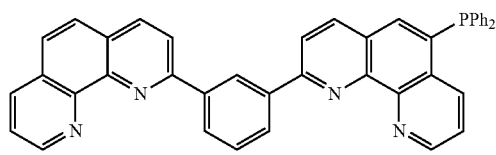
(E233)
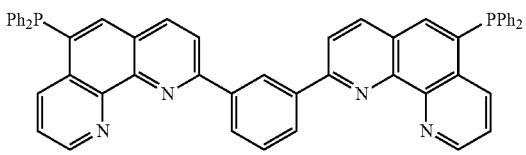
(E234)
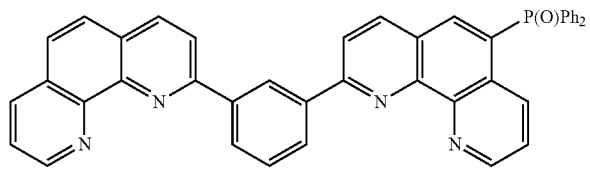
(E235)
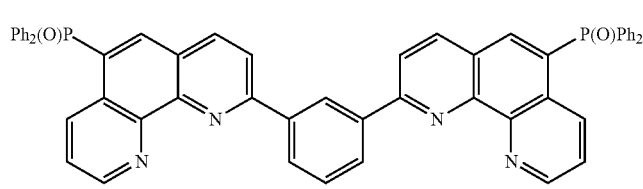
(E236)
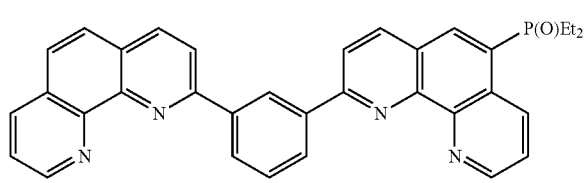
(E237)
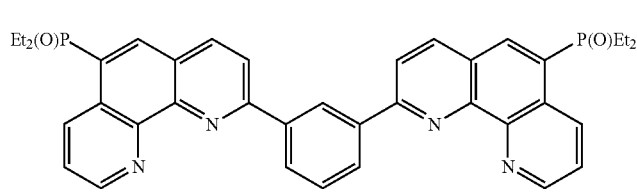
(E238)
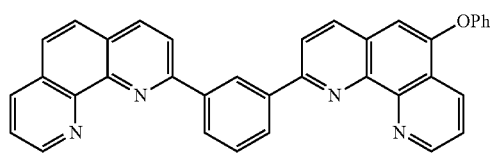
(E239)
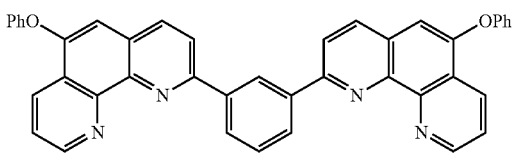
(E240)
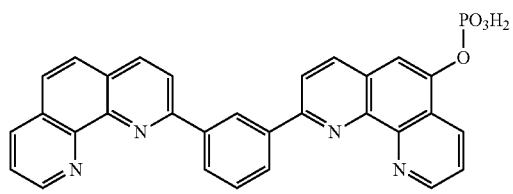
(E241)
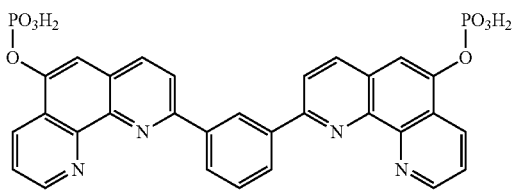
(E242)
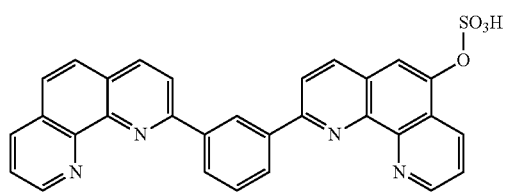
(E243)
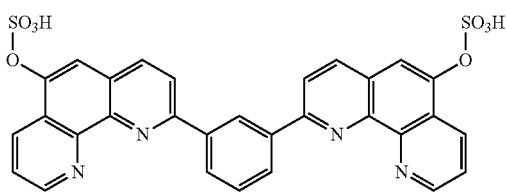

[Chemical Formula 29]
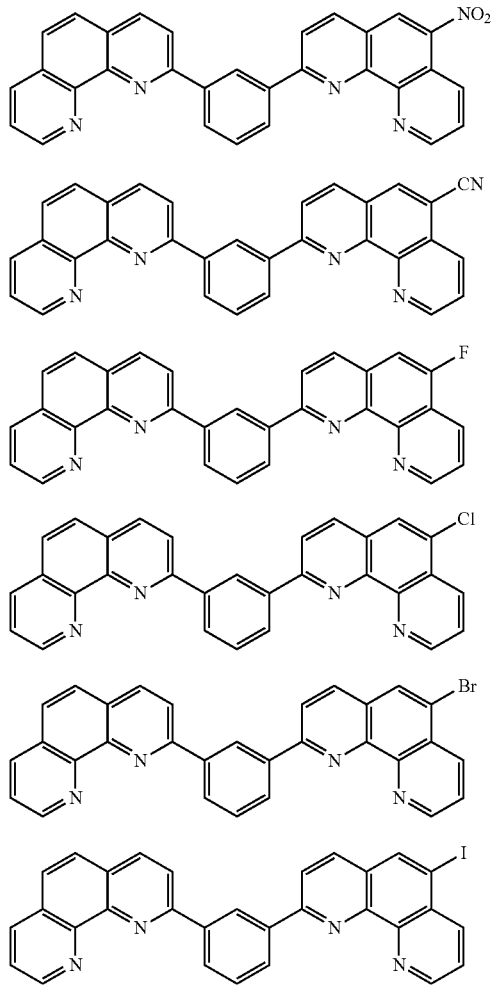
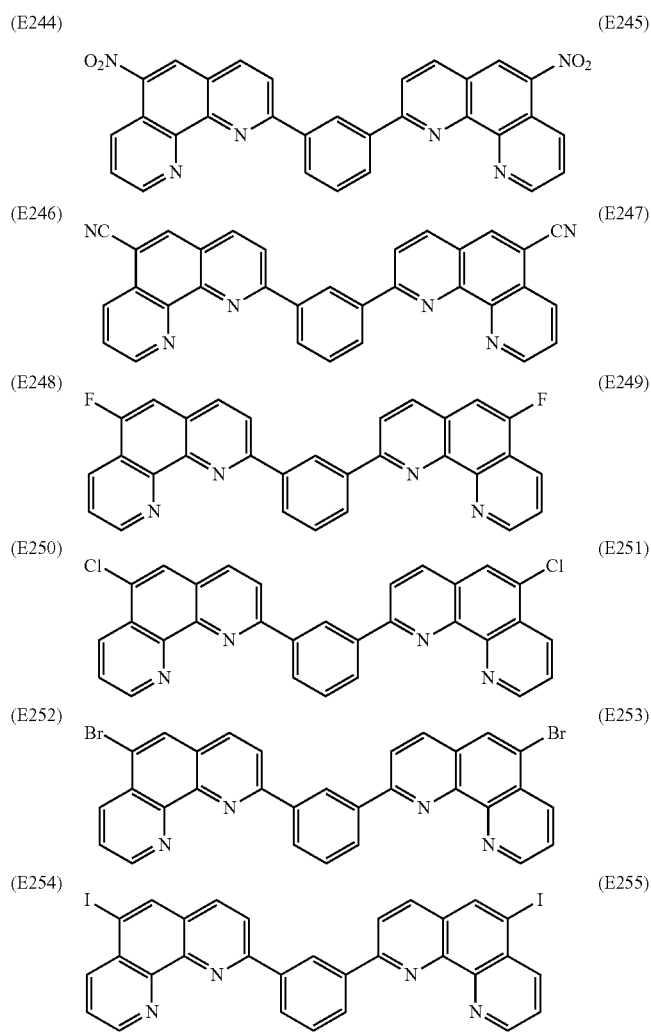
Specific examples of the nitrogen-containing additive (B) represented by the above general formula (C2) include compounds represented by the following formulas (E256) to (E298); however it is not particularly limited.
[Chemical Formula 30]
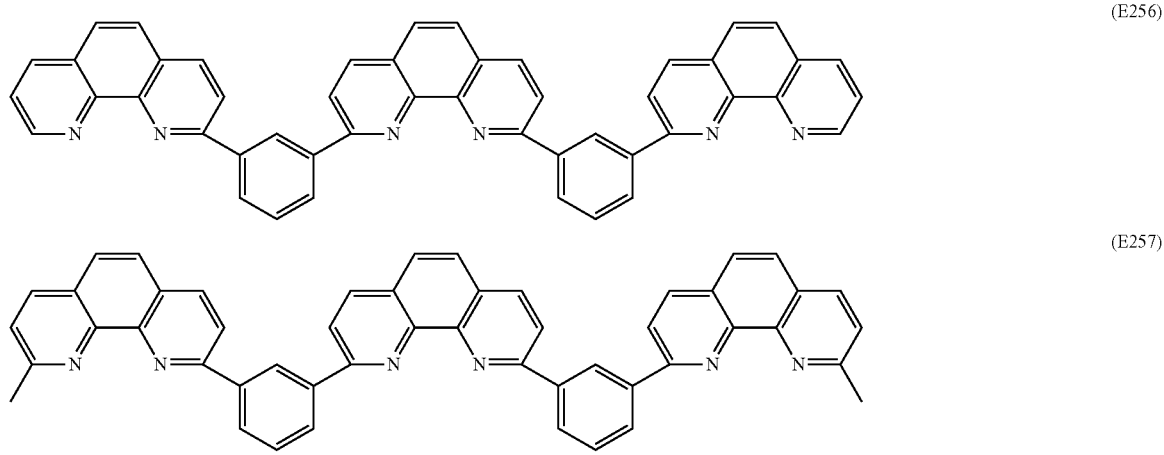

-continued
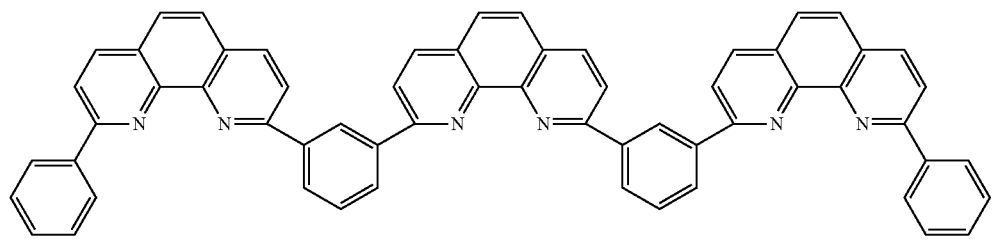
(E258)
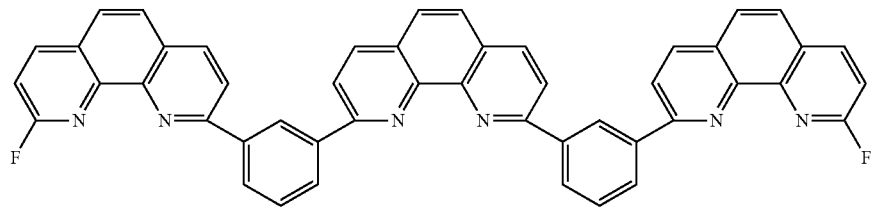
(E259)
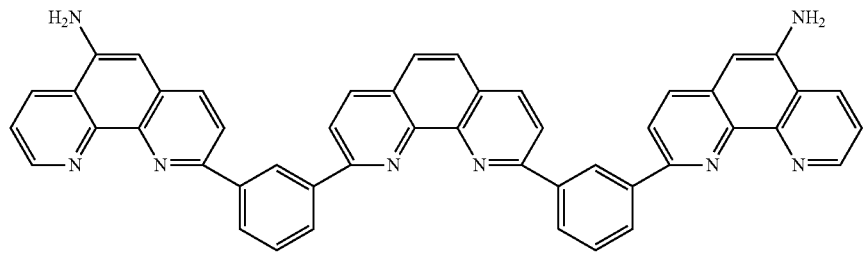
(E260)
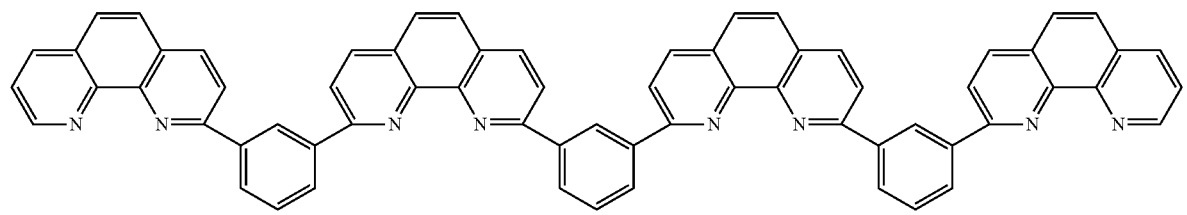
(E261)
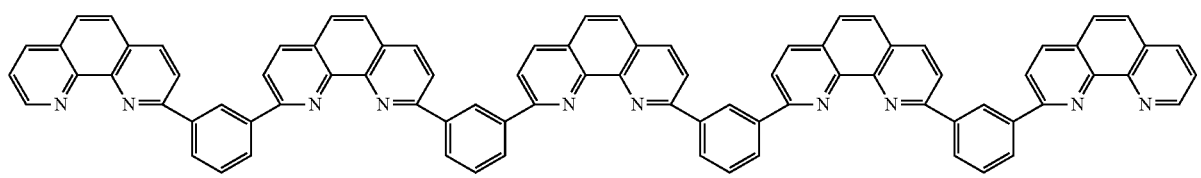
(E262)
[Chemical Formula 31]
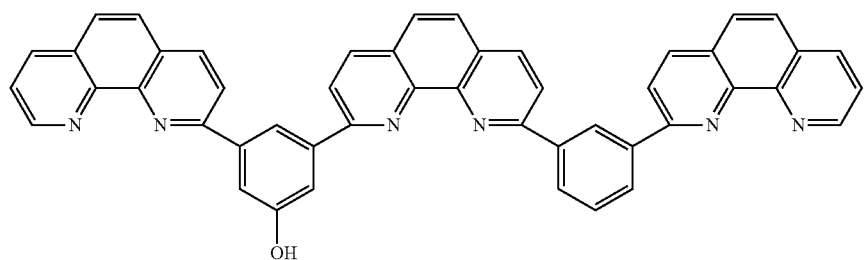
(E263)

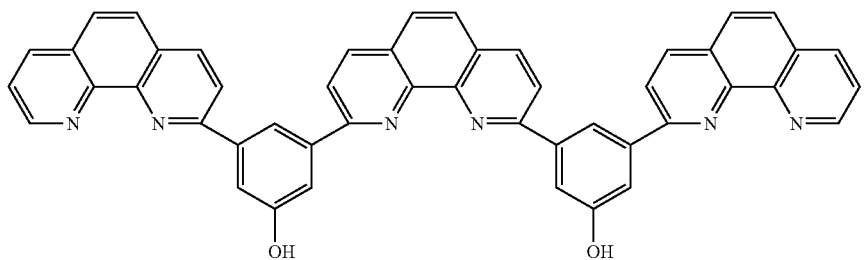
(E264)
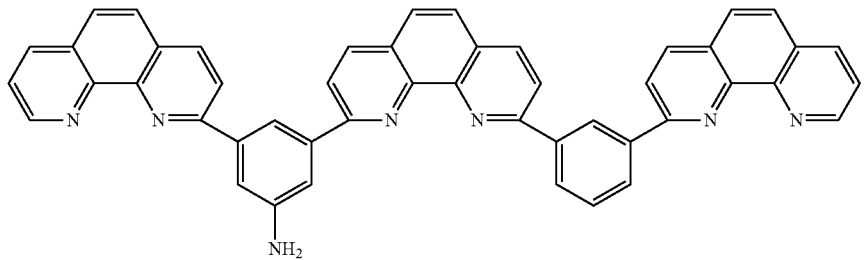
(E265)
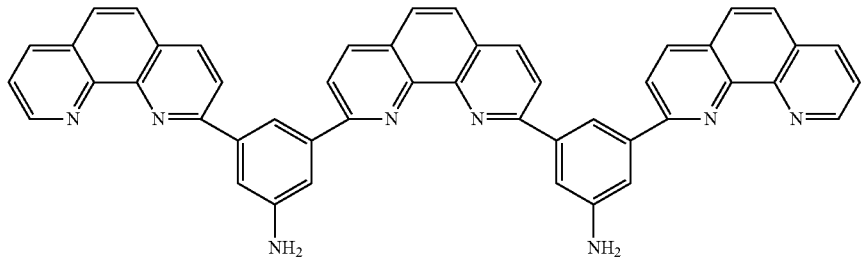
(E266)
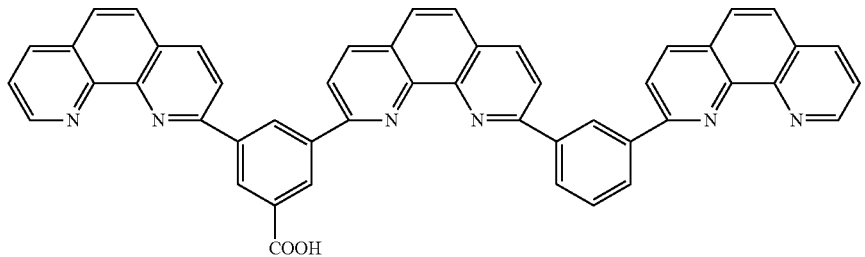
(E267)
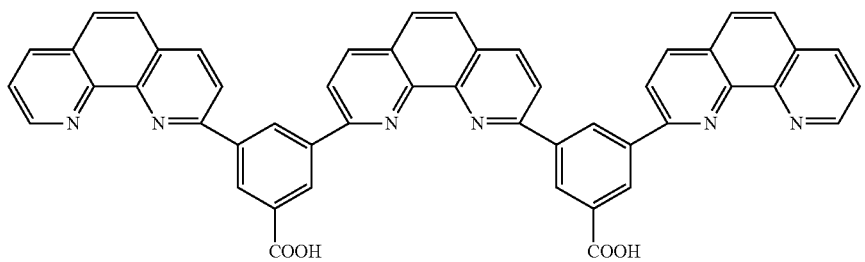
(E268)
[Chemical Formula 32]
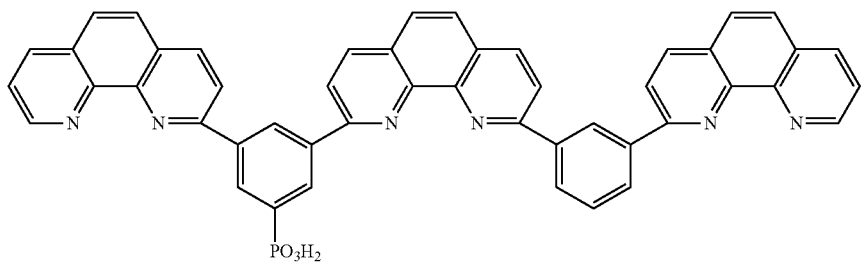
(E269)

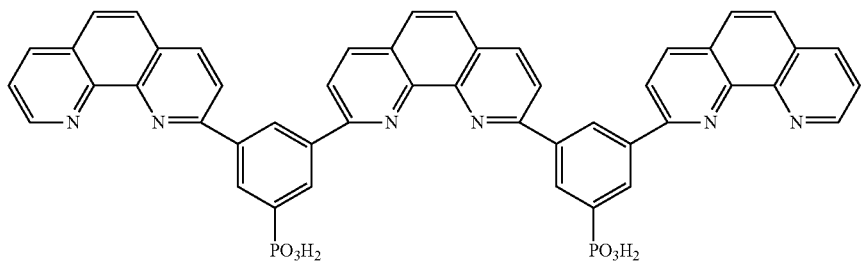
(E270)
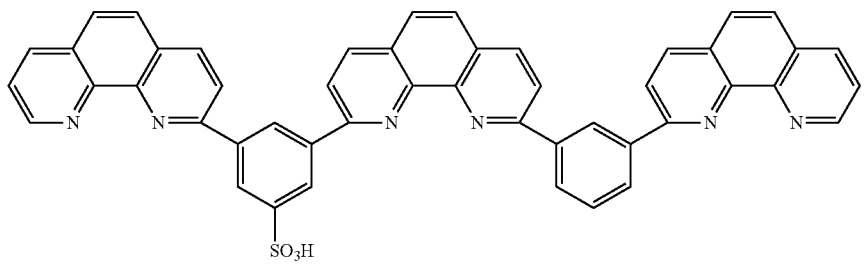
(E271)
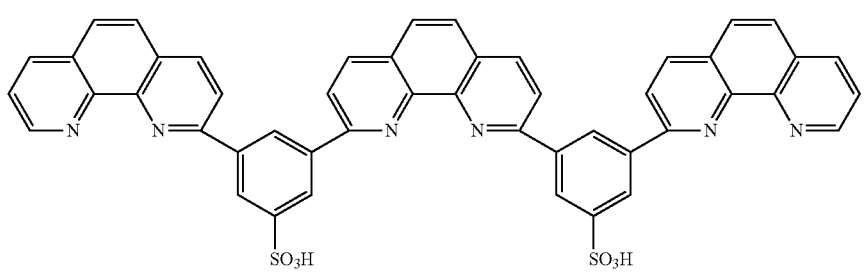
(E272)
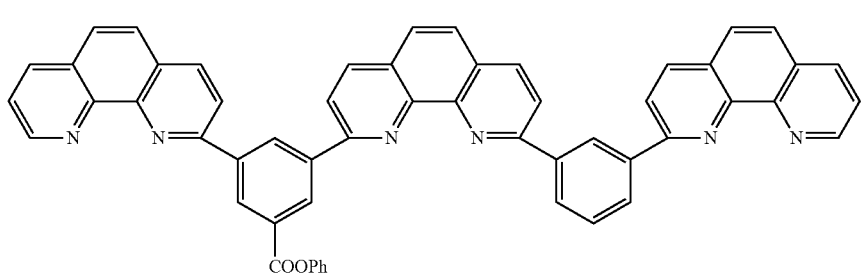
(E273)
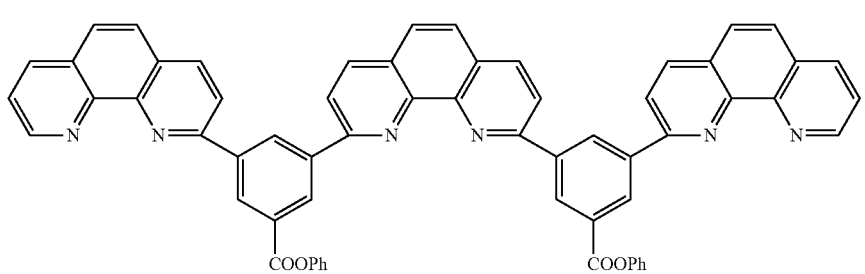
(E274)

-continued
[Chemical Formula 33]
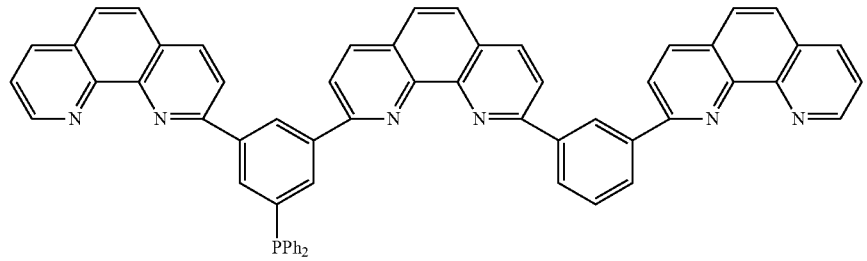
(E275)
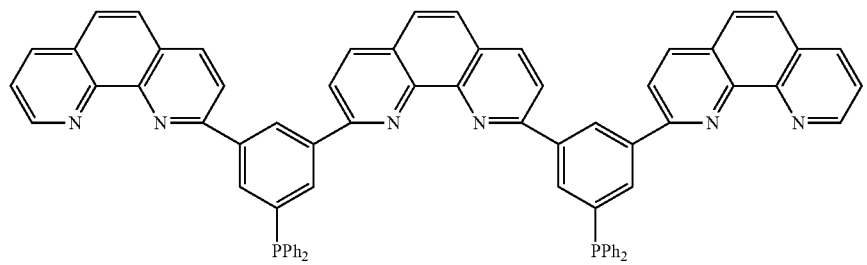
(E276)
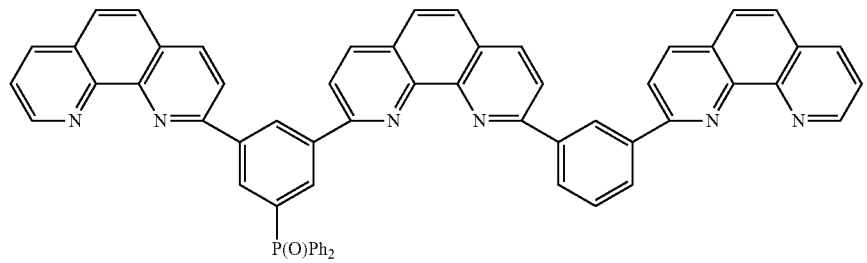
(E277)
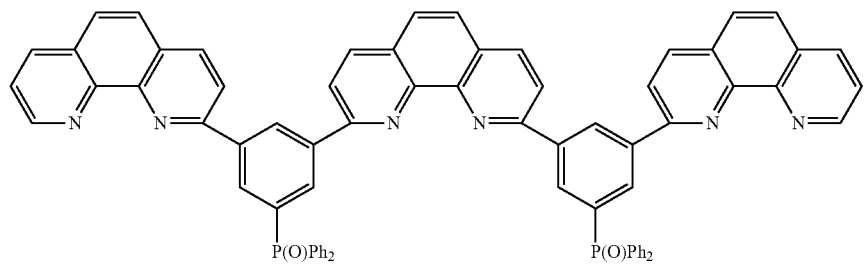
(E278)
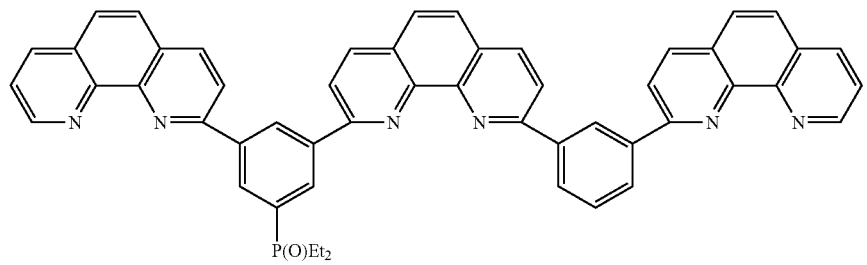
(E279)

(E280)
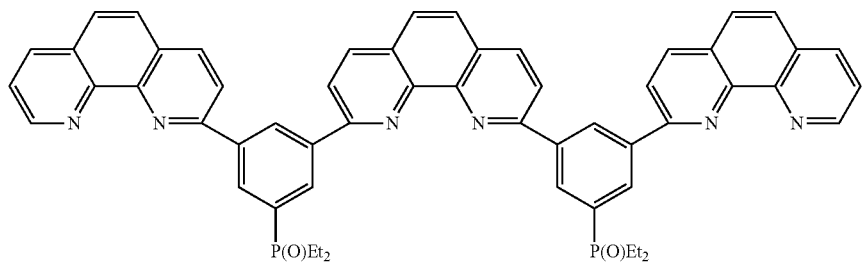
[Chemical Formula 34]
(E281)
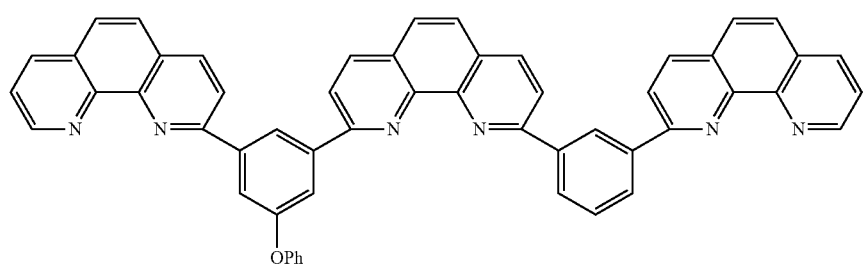
(E282)
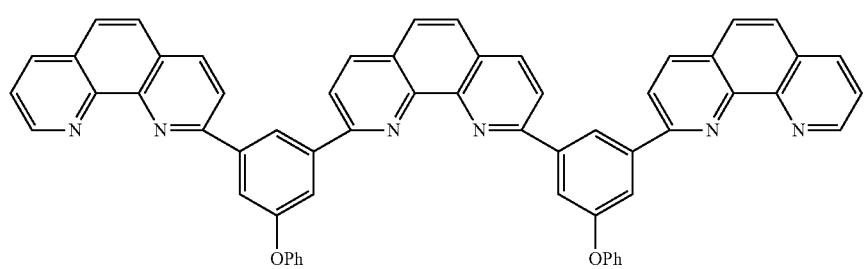
(E283)
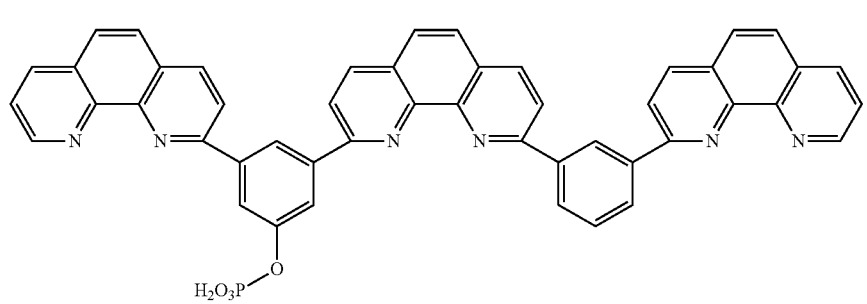
(E284)
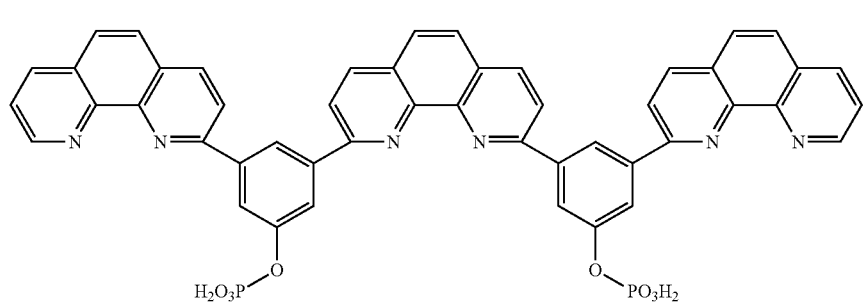

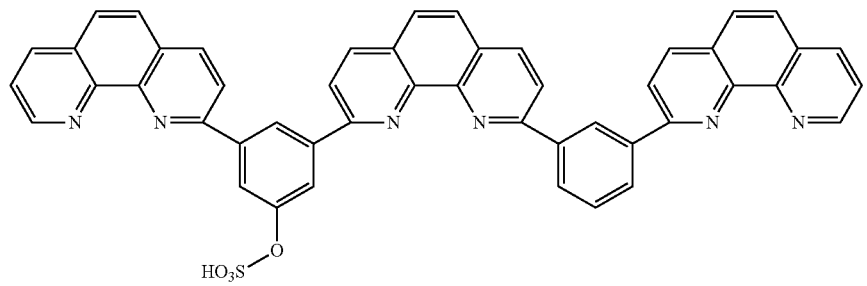
(E285)
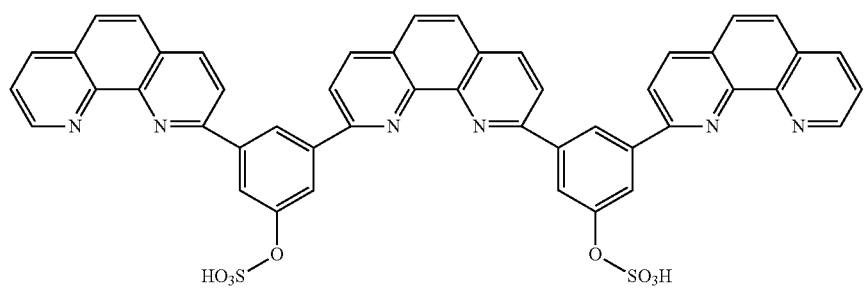
(E286)
[Chemical Formula 35]
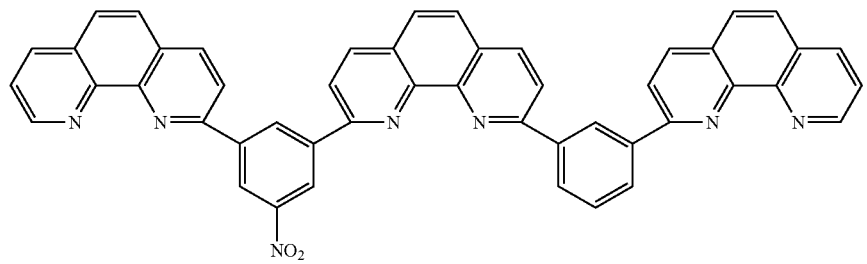
(E287)
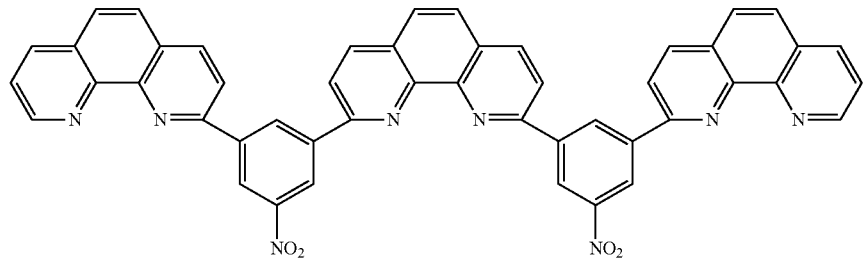
(E288)
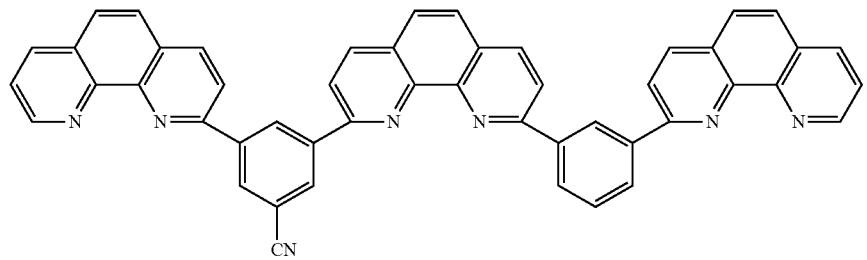
(E289)

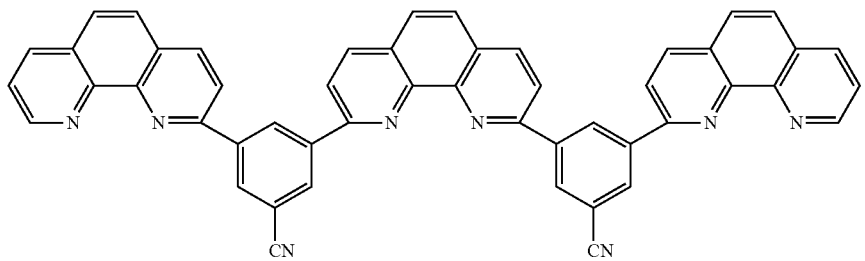
(E290)
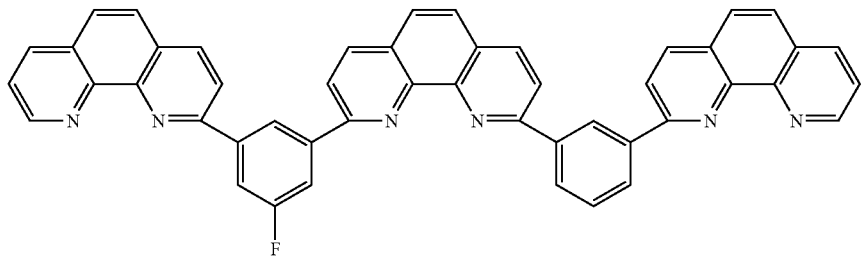
(E291)
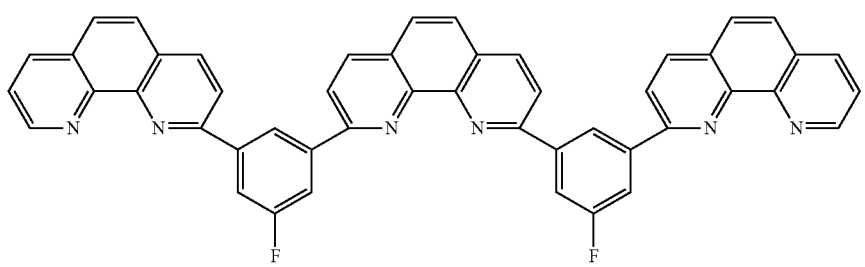
(E292)
[Chemical Formula 36]
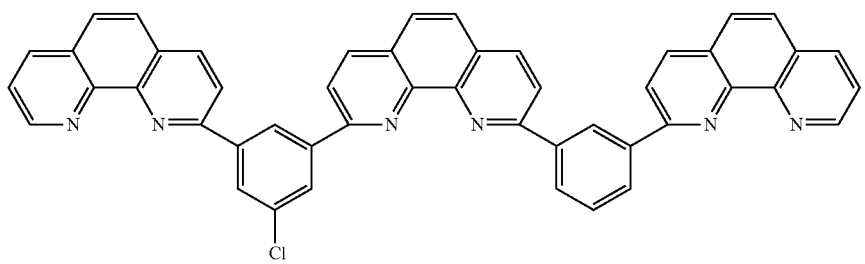
(E293)
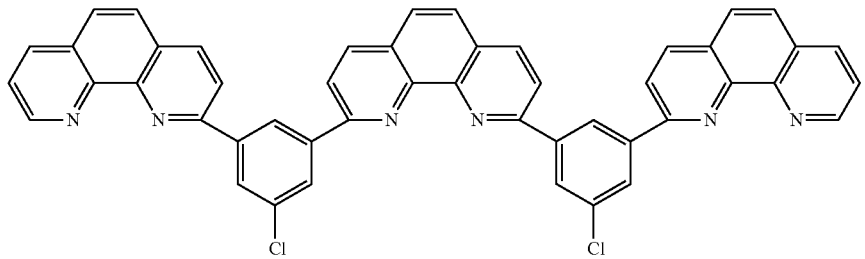
(E294)
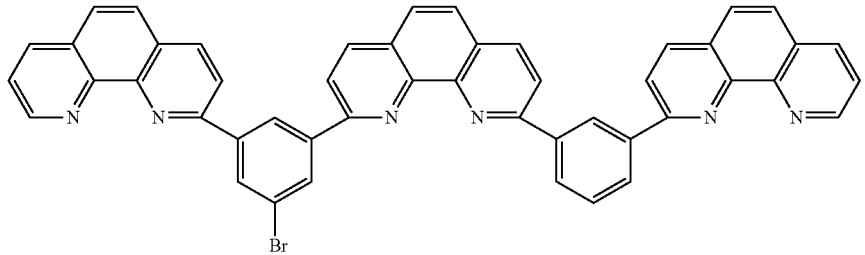
(E295)

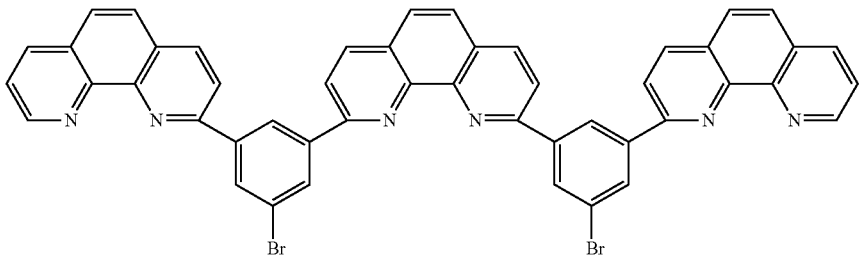

(E296)

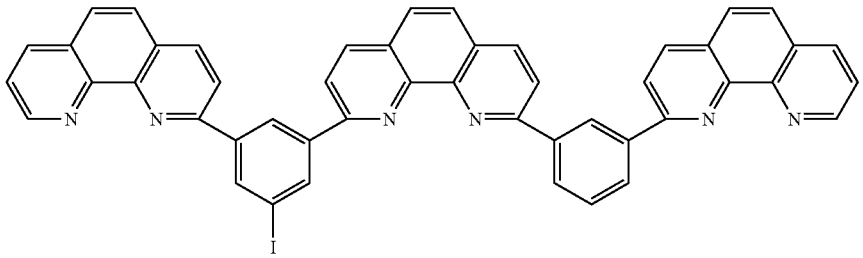

(E297)

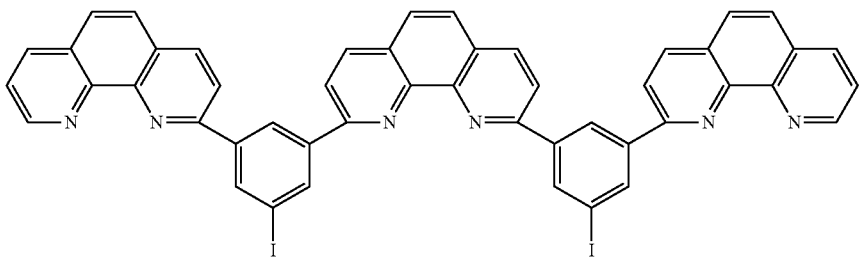

(E298)

All of these compounds exhibit an excellent effect in long-term durability, and among them, compounds represented by (E1) to (E13), (E18) to (E33), and (E42) to (E141) are preferred since they do not have excessive crystallinity and are excellent in processability, compounds represented by (E1), (E4), (E5), (E6), (E7), (E8), (E12), (E13), (E18), (E22), (E30), (E42), (E46), (E48), (E63), (E86), (E88), (E90), (E91), (E92) to (E95), (E104) to (E111), (E118) to (E123) and (E130) to (E141) are more preferred particularly because of their excellent effect of suppressing oxidation degradation, and compounds represented by (E1), (E4), (E12), (E90), (E119) and (E137) are particularly preferred since synthesis is simple and cost is reduced.

The nitrogen-containing additive (B) of the present invention preferably contains an alkyl group and/or an aryl group having 1 to 20 carbon atoms as substituents $R_1$, $R_2$ and/or a substituent of Ar in the general formulas (C1), (C2) from the viewpoint of solubility in water and an acid. When the nitrogen-containing additive (B) includes an alkyl group and an aryl group, even if the nitrogen-containing additive (B) causes a neutralization reaction with an acid produced during the operation of a fuel cell, it is hardly eluted out of a membrane, and therefore the effect can be maintained and excellent chemical stability and excellent durability can be achieved.

Further, in general, hydrogen peroxide and hydroxy radicals are compounds having high hydrophilicity and are more likely to concentrate in the vicinity of the ionic group contained in the polymer electrolyte to cause degradation of the electrolyte. Thus, as the nitrogen-containing additive (B) of the present invention, a compound having an interaction with the ionic group is also preferably used.

That is, the nitrogen-containing additive (B) preferably contains, as substituents $R_1$, $R_2$ and/or a substituent of Ar in the general formulas (C1), (C2), a carboxyl group, a phosphine oxide group, a phosphonic acid group, a phosphoester group, a sulfonic acid group, a sulfate ester group, a hydroxyl group, an amino group, a cyano group, or a nitro group, and more preferably contains a carboxyl group, a phosphonic acid group, a phosphoester group, a sulfonic acid group, a sulfate ester group, a hydroxyl group, or an amino group from the viewpoint of the intensity of an interaction with the ionic group, and particularly preferably contains a carboxyl group, a phosphonic acid group, a sulfonic acid group, a hydroxyl group, or an amino group from the viewpoint of stability of a compound itself under a strongly acidic atmosphere of a fuel cell.

The content of the additive (B) to be used in the present invention can be appropriately selected in consideration of a balance between the power generating property and the durability, and it is more preferably, but not limited to, 0.02% by weight or more and 35% by weight or less of the whole polymer electrolyte composition. The content is more preferably 0.1% by weight or more and 5% by weight or less, and most preferably 0.5% by weight or more and 3% by weight or less. When the content is less than 0.02% by weight, it is not preferred since durability is deficient in some cases. Further, when the content is more than 35% by weight, it is not preferred since proton conductivity is deficient in some cases.

The polymer electrolyte composition of the present invention preferably further contains at least one transition metal selected from among Ce, Mn, Ti, Zr, V, Cr, Mo, W, Ru, Co, Rh, Ir, Ni, Pd, Pt, Ag and Au. With respect to these transition metals, at least one selected from the group consisting of such a transition metal, ions of such a transition metal, salts containing ions of such a transition metal, complexes containing ions of such a transition metal, and oxides of such a transition metal can be used.

Among them, Ce, Mn, V, Mo, W, Ru, Co, Rh, Ir, Ni, Pd, Pt, Ag or Au is preferably used, Ce, Mn, Ru, Co, Rh, Ir, Ni, Pd, Pt, Ag or Au is more preferably used, Ce, Mn, Ru, Co, Rh, Ir, Ni, Pd, Pt, Ag or Au is moreover preferably used, and Ce, Mn, Ru, Rh, Ir, Ni, Pd, Pt or Au is most preferably used because of high functions as a radical scavenger and a peroxide-decomposition agent.

The content of the transition metal to be used in the present invention can be appropriately selected in consideration of a balance between the power generating property and the durability, and it is more preferably, but not limited to, 0.02% by weight or more and 35% by weight or less of the whole polymer electrolyte composition. The content is more preferably 0.1% by weight or more and 5% by weight or less, and most preferably 0.5% by weight or more and 3% by weight or less. When the content is less than 0.02% by weight, it is not preferred since durability is deficient in some cases. Further, when the content is more than 35% by weight, it is not preferred since proton conductivity is deficient in some cases.

Further, the content ratio between the nitrogen-containing additive (B) and the transition metal to be respectively used in the present invention can also be appropriately selected in consideration of a balance between the power generating property and durability, and a molar ratio of nitrogen to transition metal is more preferably, but not limited to, 0.1 or more and 100 or less. Further, the molar ratio is more preferably 1 or more and 20 or less, and most preferably 5 or more and 10 or less. When the molar ratio is less than 0.1, it is not preferred since proton conductivity and resistance to hot water are deficient in some cases. Further, when the molar ratio is more than 100, it is not preferred since the effect of improving durability is deteriorated in some cases.

Examples of salts containing trivalent cerium ions include cerium acetate, cerium chloride, cerium nitrate, cerium carbonate, and cerium sulfate. Examples of salts containing tetravalent cerium ions include cerium sulfate and tetraammonium cerium sulfate. Examples of salts containing divalent manganese ions include manganese acetate, manganese chloride, manganese nitrate, manganese carbonate and manganese sulfate. Examples of salts containing trivalent manganese include manganese acetate. Among them, cerium nitrate, manganese nitrate and manganese acetate are preferably used since they have a large effect of suppressing oxidation degradation.

Such transition metal ions may exist singly or may exist as a complex in which a metal ion is coordinated to an organic compound, a polymer or the like. Particularly, when the complex is a complex in which a transition metal ion is coordinated to the nitrogen-containing additive compound of the present invention, it is preferred since a polymer electrolyte composition having excellent resistance to elution is formed.

Examples of oxides of transition metal include cerium oxide, manganese oxide, ruthenium oxide, cobalt oxide, nickel oxide, chromium oxide, iridium oxide and lead oxide. Among them, cerium oxide and manganese oxide are preferably used since they have a large effect of suppressing oxidation degradation.

In accordance with the present invention, the above B component can be used singly; however, a plurality kinds of additives can be used in combination. In the present invention, a method of compounding the nitrogen-containing additive (B) in the ionic-group-containing polymer (A) is not particularly limited, and examples thereof include the following methods. Among them, a method (1) is more preferably used from the viewpoint of excellent mass-productiveness.

(1) A method in which the nitrogen-containing additive (B) is dissolved or dispersed in a solution or a dispersion of the ionic-group-containing polymer (A), and then the resulting liquid is formed into a membrane to prepare a polymer electrolyte membrane.

(2) A method in which a polymer electrolyte membrane made of the ionic-group-containing polymer (A) is brought into contact with a solution having the nitrogen-containing additive (B) dissolved therein.

A specific technique of bringing the polymer electrolyte membrane into contact with the solution in the above method (2) is not particularly limited, and examples thereof include dipping, spraying, die coating, gravure coating, bar coating, knife coating, and air knife.

Next, the ionic-group-containing polymer (A) to be used for the present invention will be described.

As the ionic-group-containing polymer (A) to be used for the present invention, either an ionic-group-containing perfluoro-type polymer or an ionic-group-containing hydrocarbon-type polymer may be used as long as it can achieve a power generating property and chemical stability simultaneously. The ionic-group-containing hydrocarbon-type polymer referred to in the present invention means a polymer having an ionic group other than a perfluoro-type polymer. As used herein, the perfluoro-type polymer refers to a polymer in which most of or all of hydrogen of alkyl groups and/or alkylene groups in the polymer are substituted with a fluorine atom. In the present specification, a polymer, in which 85% or more of hydrogen of alkyl groups and/or alkylene groups in the polymer are substituted with a fluorine atom, is defined as a perfluoro-type polymer. Typical examples of a perfluoro-type polymer having an ionic group of the present invention include commercialized products such as Nafion (registered trademark) (produced by E. I. du Pont de Nemours & Company), Flemion (registered trademark) (produced by Asahi Glass Co., Ltd.) and Aciplex (registered trademark) (produced by Asahi Kasei Corporation).

Since these perfluoro-type polymer having an ionic group is very expensive and has a problem of causing a large gas crossover, the ionic-group-containing polymer (A) to be used for the present invention is more preferably a hydrocarbon-type polymer having an aromatic ring in a main chain and having an ionic group from the viewpoint of mechanical strength, physical durability and chemical stability. Moreover, since the hydrocarbon-type polymer has higher compatibility with an organic compound not containing fluorine such as phenanthroline than the perfluoro-type polymer and hardly causes island-in-sea-like phase separation and bleeding out, excellent power generation performance and excellent durability can be exerted. Among them, those having sufficient mechanical strength and physical durability, which are used as an engineering plastic, are preferred.

The aromatic ring may include, in addition to the hydrocarbon-type aromatic ring, a hetero ring. Also, an aliphatic unit may partially constitute the polymer, together with the aromatic ring unit. The aromatic unit may have optional substituents, for example, a hydrocarbon-type group such as an alkyl group, an alkoxy group, an aromatic group and an allyloxy group, a halogen group, a nitro group, a cyano group, an amino group, a halogenated alkyl group, a carboxyl group, a phosphonic acid group, and a hydroxyl group.

Specific examples of the polymer having an aromatic ring in a main chain include polymers such as polysulfone, polyethersulfone, polyphenylene oxide, polyarylene ether-type polymer, polyphenylene sulfide, polyphenylene sulfide sulfone, polyparaphenylene, polyarylene-type polymer, polyaryleneketone, polyether ketone, polyarylene phosphinoxide, polyether phosphinoxide, polybenzoxazole, polybenzthiazole, polybenzimidazole, aromatic polyamide, polyimide, polyetherimide and polyimidesulfone. In addition, polysulfone, polyethersulfone and polyether ketone, referred to herein, are generic names of polymers having a sulfone bond, an ether bond and a ketone bond in the molecular chain and include, for example, polyether ketoneketone, polyetherether ketone, polyetherether ketoneketone, polyether ketone ether ketoneketone, and polyether ketone sulfone, but it is not intended to limit the polymer to a specific polymer structure.

Among these polymers, polymers such as polysulfone, polyethersulfone, polyphenylene oxide, polyarylene ether-type polymer, polyphenylene sulfide, polyphenylene sulfide sulfone, polyarylene ketone, polyether ketone, polyarylene phosphinoxide, and polyether phosphinoxide are more preferred in view of mechanical strength, physical durability, processability and resistance to hydrolysis.

Among them, an aromatic polyether-type polymer is moreover preferred in view of mechanical strength, physical durability and production cost. An aromatic polyether ketone (PEK)-type polymers are particularly preferred in that it exhibits crystallinity because of its good packing and extremely strong intermolecular cohesive force of the main chain structure, and has a property of being insoluble in a common solvent, and in point of tensile strength, tear strength and resistance to fatigue.

As used herein, the aromatic polyether ketone-type polymers are generic names of polymers having at least an ether bond and a ketone bond in the molecular chain, and they include polyether ketone, polyether ketoneketone, polyetherether ketone, polyetherether ketoneketone, polyether ketone ether ketoneketone, polyether ketone sulfone, polyether ketone phosphinoxide, and polyether ketone nitrile.

The ionic-group-containing polymer (A) to be used for the present invention is more preferably a block copolymer containing one or more segments (A1) containing an ionic group and one or more segments (A2) not containing an ionic group from the viewpoint of proton conductivity and a power generating property under slightly humidified conditions. A block copolymer containing one or more segments (A1) containing an ionic group, one or more segments (A2) not containing an ionic group, and one or more linker sites linking between the segments, is also a preferred specific example.

In the present invention, the segment is a partial structure of the block copolymer, and comprises one kind of a repeating unit or a combination of a plurality kinds of repeating units, and refers to those having a molecular weight of 2000 or more. The block copolymer to be used in the present invention contains the segment (A2) not containing an ionic group together with the segment (A1) containing an ionic group, and in the present invention, although the segment (A2) is described as "segment not containing an ionic group", it may contain a small amount of ionic groups within a range which does not affect adversely an effect of the present invention. Hereinafter, the phrase "not containing an ionic group" is used in the same sense in some cases.

Further, in the present invention, the linker is defined as a site linking between the segment (A1) containing an ionic group and the segment (A2) not containing an ionic group, and having a chemical structure different from that of the segment (A1) containing an ionic group and of the segment (A2) not containing an ionic group. Since this linker can link different segments while randomization, segment cutting and a side reaction due to an ether exchange reaction are suppressed, it is necessary for obtaining the block copolymer to be used in the present invention. When there is no linker, segment cutting such as randomization occurs in some cases, and therefore the effect of the present invention is not adequately obtained.

The block copolymer to be used in the present invention is such that two or more kinds of mutually incompatible segment chains, that is, a hydrophilic segment containing an ionic group, and a hydrophobic segment not containing an ionic group are linked through a linker site to form one polymer chain. In the block copolymer, due to short-range interaction generated from repulsion between chemically different segment chains, the segment chains are phase-separated into nano- or micro-domains of respective segment chains, and due to the effect of long-range interaction generated from mutual covalent bonds of segment chains, the domains are made to be arranged having a specific order. A high order structure created by aggregation of domains of respective segment chains is referred to as a nano or micro phase separation structure, and regarding ion conduction of a polymer electrolyte membrane, spatial arrangement of ion conductive segments in the membrane, that is, a nano or micro phase separation structure is important. Herein, the domain means a mass generated by aggregation of similar segments in one or a plurality of polymer chain(s).

As the ionic-group-containing polymer (A) to be used for the present invention, particularly, a block copolymer is moreover preferred containing one or more segments (A1) containing an ionic group, one or more segments (A2) not containing an ionic group, and one or more linker sites linking between the segments, in which the segment (A1) containing an ionic group contains a constituent unit represented by the following general formula (S1) and the segment (A2) not containing an ionic group contains a constituent unit represented by the following general formula (S2).

[Chemical Formula 37]

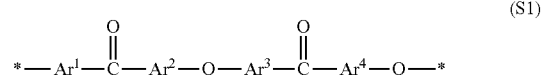

In the general formula (S1), $Ar^1$ to $Ar^4$ represent an optional divalent arylene group, $Ar^1$ and/or $Ar^e$ contains an ionic group, and $Ar^3$ and $Ar^4$ may contain an ionic group or need not contain an ionic group. $Ar^1$ to $Ar^4$ may be optionally substituted, or two or more kinds of arylene groups may be independently used for $Ar^1$ to $Ar^4$. * is a bonding site with a part represented by the general formula (S1) or other constituent units.

[Chemical Formula 38]

(S2)

In the general formula (S2), $Ar^5$ to $Ar^8$ represent an optional divalent arylene group, may be optionally substituted, but they do not contain an ionic group. For $Ar^5$ to $Ar^8$, two or more kinds of arylene groups may be independently used. * is a bonding site with a part represented by the general formula (S2) or other constituent units.

By appropriately selecting a chemical structure, segment chain length, molecular weight, ion exchange capacity and the like of the block copolymer to be used in the present invention, various properties such as processability, a domain size, crystallinity/non-crystallinity, mechanical strength, proton conductivity, and dimensional stability of a polymer electrode material can be controlled.

Herein, examples of the divalent arylene group which is preferred as $Ar^1$ to $Ar^8$ include hydrocarbon-type arylene groups such as a phenylene group, a naphthylene group, a biphenylene group, and a fluorenediyl group; and heteroarylene groups such as pyridinediyl, quinoxalinediyl, and thiophenediyl, but it is not limited to these groups. $Ar^1$ and/or $Ar^e$ contains an ionic group, $Ar^3$ and $Ar^4$ may contain an ionic group or need not contain an ionic group. Also, these groups may be substituted with a group other than the ionic group, but nonsubstituted groups are more preferred in point of proton conductivity, chemical stability and physical durability. Moreover preferred one is a phenylene group containing a phenylene group and an ionic group, and most preferred one is a p-phenylene group containing a p-phenylene group and an ionic group.

Next, a preferred specific example of the block copolymer to be used in the present invention will be described. The block copolymer to be used in the present invention exhibits high proton conductivity in broad humidity conditions as a polymer electrolyte material and a polymer electrolyte membrane by domain formation of the segment (A1) containing an ionic group.

An ionic group to be used for the block copolymer to be used in the present invention is preferably an atom group having a negative charge and preferably a group having proton exchange ability. As such a functional group, a sulfonic acid group, a sulfonimide group, a sulfuric acid group, a phosphonic acid group, a phosphoric acid group, and a carboxylic acid group are preferably used.

Such an ionic group includes a case of a salt state. Examples of the cation forming a salt include any metallic cations and $NR^{4+}$ (R is any organic group). With respect to metallic cation, its valence is not particularly limited, and any metallic cation can be used.

The polymer electrolyte material can contain two or more kinds of these ionic groups, and a combination of these ionic groups is appropriately determined depending on a structure of a polymer. Among them, it is more preferred to have at least a sulfonic acid group, a sulfonimide group, and a sulfuric acid group from the viewpoint of high proton conductivity, and it is most preferred to have at least a sulfonic acid group from the viewpoint of a raw material cost.

When the block copolymer to be used in the present invention has a sulfonic acid group, its ion exchange capacity is preferably 0.1 to 5 meq/g, more preferably 1.5 meq/g or more, and most preferably 2 meq/g or more from the viewpoint of a balance between proton conductivity and water resistance. The ion exchange capacity is more preferably 3.5 meq/g or less, and most preferably 3 meq/g or less. When the ion exchange capacity is lower than 0.1 meq/g, proton conductivity is deficient in some cases, and when it is higher than 5 meq/g, water resistance is deficient in some cases.

In the block copolymer to be used in the present invention, a molar composition ratio (A1/A2) of the segment (A1) containing an ionic group to the segment (A2) not containing an ionic group is more preferably 0.2 or more, moreover preferably 0.33 or more, and most preferably 0.5 or more. Further, the molar composition ratio is more preferably 5 or less, moreover preferably 3 or less, and most preferably 2 or less. When the molar composition ratio A1/A2 is less than 0.2 or more than 5, it is not preferred since the effect of the present invention is insufficient in some cases, and proton conductivity under slightly humidified conditions is deficient in some cases, or resistance to hot water or physical durability is deficient in some cases.

The ion exchange capacity of the segment (A1) containing an ionic group is preferably high from the viewpoint of proton conductivity under slightly humidified conditions, and the ion exchange capacity is more preferably 2.5 meq/g or more, moreover preferably 3 meq/g or more, and most preferably 3.5 meq/g or more. The ion exchange capacity is more preferably 6.5 meq/g or less, moreover preferably 5 meq/g or less, and most preferably 4.5 meq/g or less. When the ion exchange capacity of the segment (A1) containing an ionic group is lower than 2.5 meq/g, proton conductivity under slightly humidified conditions is deficient in some cases, and when it is higher than 6.5 meq/g, resistance to hot water or physical durability is deficient in some cases, and therefore these cases are not preferred.

The ion exchange capacity of the segment (A2) not containing an ionic group is preferably low from the viewpoint of resistance to hot water, mechanical strength, dimension stability and physical durability, and the ion exchange capacity is more preferably 1 meq/g or less, moreover preferably 0.5 meq/g or less, and most preferably 0.1 meq/g or less. When the ion exchange capacity of the segment (A2) not containing an ionic group is more than 1 meq/g, it is not preferred since resistance to hot water, mechanical strength, dimension stability and physical durability are deficient in some cases.

Herein, the ion exchange capacity is a molar amount of a sulfonic acid group introduced per a unit dry weight of the block copolymer, the polymer electrolyte material and the polymer electrolyte membrane, and a larger value of the ion exchange capacity indicates that a degree of sulfonation is higher. The ion exchange capacity can be measured by elementary analysis and a neutralization titration method. Although the ion exchange capacity can also be calculated from a ratio S/C using the elementary analysis, measurement is difficult in the case where a sulfur source other than a sulfonic acid group is contained. Accordingly, in the present invention, it is defined that the ion exchange capacity is a value determined by the neutralization titration method. The polymer electrolyte composition and the polymer electrolyte membrane of the present invention include an aspect of a complex comprising the block copolymer to be used in the present invention and other components as described later, and also in the case of the complex, the ion exchange capacity is determined based on a total amount of the complex.

A measurement example of neutralization titration is as follows. The measurements are carried out three or more times, and an average thereof is taken.
(1) An electrolyte membrane is subjected to proton substitution and adequately washed with pure water, and moisture content on a surface of the electrolyte membrane is wiped and then, the membrane is vacuum-dried at 100° C. for 12 hours or more, and a dry weight thereof is determined.
(2) To the electrolyte is added 50 mL of a 5% by mass aqueous sodium sulfate solution, and this is left at rest for 12 hours to perform ion exchange.
(3) Using a 0.01 mol/l aqueous sodium hydroxide solution, generated sulfuric acid is titrated. As an indicator, a commercially available 0.1 w/v % phenolphthalein solution for titration is added, and a point at which a solution turns faint red-violet is regarded as an end point.
(4) The ion exchange capacity is determined by the following equation:

Ion exchange capacity (meq/g)=[concentration of aqueous sodium hydroxide solution (mmol/ml)× dropwise addition amount (ml)]/dry weight of sample (g).

Examples of a method of introducing an ionic group in order to obtain the block copolymer to be used in the present invention include a method in which polymerization is performed using a monomer having an ionic group, and a method in which an ionic group is introduced by a polymer reaction. Regarding the method of introducing an ionic group, WO 2006/87995 and WO 2008/18487 can be used as references.

Next, a block copolymer to be used in the present invention will be specifically described.

As the segment (A2) not containing an ionic group, a constituent unit which is chemically stable and exhibits crystallinity because of strong intermolecular cohesive force, is more preferred, and thereby, a block copolymer which is excellent in mechanical strength, dimension stability and physical durability can be attained.

More preferred specific examples of the constituent unit represented by the general formula (S2) which is contained in the segment (A2) not containing an ionic group include a constituent unit represented by the following general formula (P1) in point of raw material availability. Among them, from the viewpoint of mechanical strength, dimension stability and physical durability by virtue of its crystallinity, a constituent unit represented by the following formula (S3) is moreover preferred. The content of the constituent unit represented by the general formula (S2) which is contained in the segment (A2) not containing an ionic group is preferably large, more preferably 20% by mole or more, moreover preferably 50% by mole or more, and most preferably 80% by mole or more. When the content is less than 20% by mole, it is not preferred since the effect of the present invention on mechanical strength, dimension stability and physical durability by virtue of crystallinity is deficient in some cases.

[Chemical Formula 39]

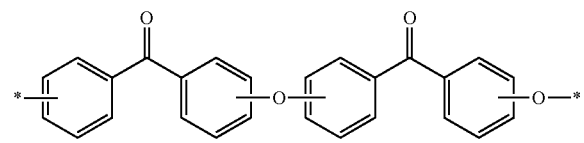

(P1)

-continued

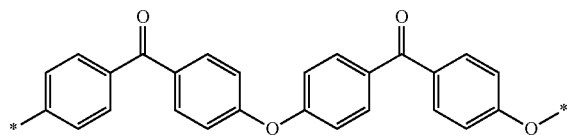

(S3)

Preferred examples of a constituent unit to be copolymerized other than the constituent unit represented by the general formula (S2), as the segment (A2) not containing an ionic group, include a constituent unit which has an aromatic polyether polymer containing a ketone group, that is, a constituent unit represented by the following general formula (Q1), and does not contain an ionic group:

[Chemical Formula 40]

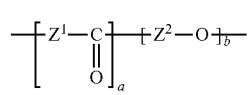

(Q1)

$Z^1$ and $Z^2$ in the general formula (Q1) represent a divalent organic group containing an aromatic ring and each of $Z^1$ and $Z^2$ may represent two or more kinds of groups but does not contain an ionic group; and a and b each independently represent a positive integer.

An organic group as $Z^1$ and $Z^2$ in the general formula (Q1) is more preferably a phenylene group for $Z^1$ and at least one selected from the following general formulas (X-1), (X-2), (X-4) and (X-5) for $Z^2$. Also, these groups may be substituted with a group other than the ionic group, but nonsubstituted groups are more preferred in point of imparting crystallinity. $Z^1$ and $Z^2$ are more preferably a phenylene group, and most preferably a p-phenylene group.

[Chemical Formula 41]

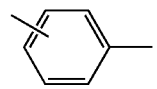

(X-1)

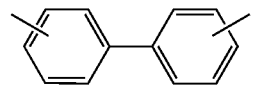

(X-2)

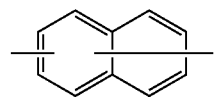

(X-4)

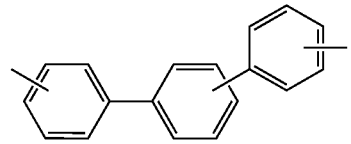

(X-5)

The groups represented by the general formula (X-1), (X-2), (X-4) or (X-5) may be optionally substituted with a group other than the ionic group.

Preferred specific examples of the constituent unit represented by the above general formula (Q1) include constituent units represented by the following general formulas (Q2) to (Q7), but it is not limited to these constituent units, and it can be appropriately selected in consideration of crystallinity or mechanical strength. Among them, from the viewpoint of crystallinity and production cost, as the constituent unit represented by the general formula (Q1), the following general formulas (Q2), (Q3), (Q6) and (Q7) are more preferred, and the general formulas (Q2) and (Q7) are most preferred:

[Chemical Formula 42]

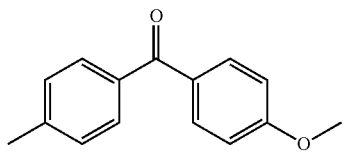
(Q2)

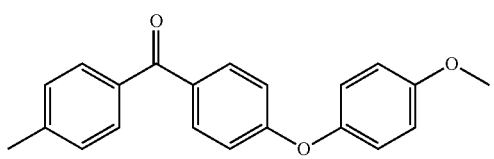
(Q3)

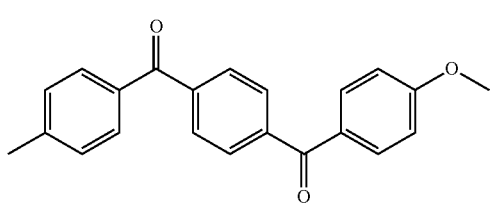
(Q4)

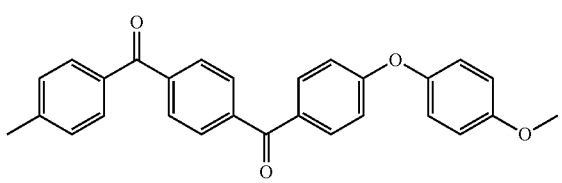
(Q5)

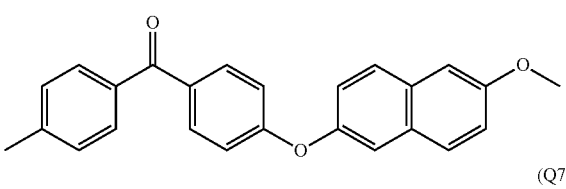
(Q6)

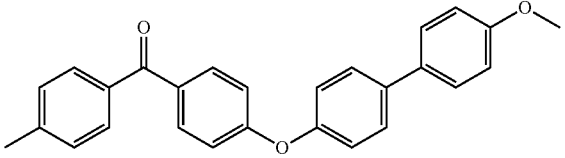
(Q7)

The general formulas (Q2) to (Q7) are all expressed in the form of a bond at the para-position, but they may include the form of a bond at another position such as an ortho-position or a meta-position as long as they have crystallinity. However, from the viewpoint of crystallinity, the para-position is more preferred.

As the segment (A1) containing an ionic group, a constituent unit which is chemically stable, has high acidity due to the electron withdrawing effect, and has a sulfonic acid group introduced thereinto at high density is more preferred, and a block copolymer having excellent proton conductivity under slightly humidified conditions can be obtained.

More preferred specific examples of the constituent unit represented by the general formula (S1) which is contained in the segment (A1) containing an ionic group include a constituent unit represented by the following general formula (P2) in point of raw material availability. Among them, from the viewpoint of raw material availability and a polymerizing property, a constituent unit represented by the following formula (P3) is moreover preferred, and a constituent unit represented by the following formula (S4) is most preferred. The content of the constituent unit represented by the general formula (S1) which is contained in the segment (A1) containing an ionic group is preferably large, more preferably 20% by mole or more, moreover preferably 50% by mole or more, and most preferably 80% by mole or more. When the content is less than 20% by mole, it is not preferred since the effect of the present invention on chemical stability and proton conductivity under slightly humidified conditions is deficient in some cases.

[Chemical Formula 43]

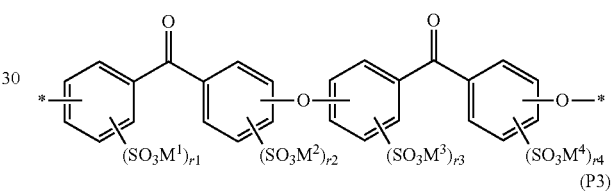
(P2)

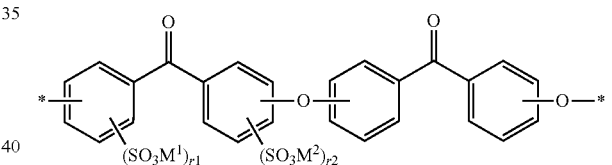
(P3)

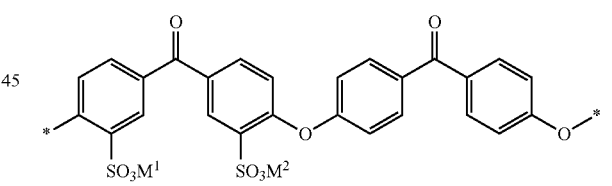
(S4)

In the formula (P2), $M^1$ to $M^4$ represent hydrogen, metal cation or ammonium cation, $M^1$ to $M^4$ may represent two or more kinds of groups, r1 to r4 independently represent 0 to 2, r1+r2 represent 1 to 8, and r1 to r4 may represent two or more kinds of numerical values.

Preferred examples of a constituent unit to be copolymerized other than the constituent unit represented by the general formula (S1), as the segment (A1) containing an ionic group, include an aromatic polyether polymer containing a ketone group which contains an ionic group.

A method of synthesizing a segment (A1) containing an ionic group to be used for the present invention is not particularly limited as long as it is a method in which a substantially sufficient molecular weight is obtained, and the segment (A1) can be obtained by utilizing, for example, an aromatic nucleophilic substitution reaction between an aromatic active dihalide compound and a divalent phenol compound, or an aromatic nucleophilic substitution reaction of a halogenated aromatic phenol compound. Regarding these reactions, WO 2006/87995 and WO 2008/18487 can be used as references.

As preferred examples of a constituent unit to be copolymerized other than the constituent unit represented by the general formula (S1), as the segment (A1) containing an ionic group, an aromatic polyether ketone-type copolymer comprising constituent units represented by the following general formulas (T1) and (T2), which contain constituent units represented by the above general formulas (p1) and (p2), is particularly preferred:

[Chemical Formula 44]

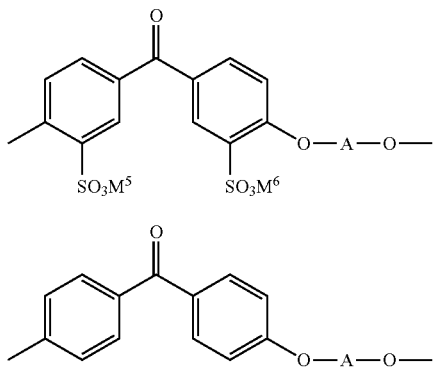

In the general formulas (T1) and (T2), A represents a divalent organic group containing an aromatic ring, $M^5$ and $M^6$ represent hydrogen, metal cation or ammonium cation, and A may represent two or more kinds of groups.

The ion exchange capacity can be controlled by changing a composition ratio between constituent units represented by the general formulas (T1) and (T2), and with respect to a total molar amount of T1 and T2, an amount of P1 to be introduced is preferably 75% by mole or more, more preferably 90% by mole or more, and most preferably 100% by mole. When the amount of P1 to be introduced is less than 75% by mole, it is not preferred since construction of a proton conducting bus is insufficient in some cases.

Herein, as a divalent organic group A in the general formulas (P1) and (P2), which contains an aromatic ring, various divalent phenol compounds capable of being used for polymerization of aromatic polyether-type polymer by aromatic nucleophilic substitution reaction, can be used, and they are not particularly limited. Further, these aromatic dihydroxy compounds having a sulfonic acid group introduced can also be used as a monomer.

Number average molecular weights (A1/A2) of the segment (A1) containing an ionic group and the segment (A2) not containing an ionic group relate to a domain size of a phase separation structure, and from the viewpoint of a balance between proton conductivity under low humidification and physical durability, the number average molecular weight is more preferably 5000 or more, moreover preferably 10000 or more, and most preferably 15000 or more. Further, it is more preferably 50000 or less, moreover preferably 40000 or less, and most preferably 30000 or less.

The polymer electrolyte composition of the present invention is particularly suitably used as a polymer electrolyte molded product. In the present invention, the polymer electrolyte molded product means a molded product containing the polymer electrolyte composition of the present invention. The polymer electrolyte molded product of the present invention can take a variety of forms depending on use application, such as plates, fibers, hollow yarns, particles, masses, micropores, coatings, and foams in addition to membranes (including films and film-like shapes). Since improvement in degree of free design of the polymer and improvement in various properties such as a mechanical property and solvent resistance can be achieved, the polymer electrolyte composition can be applied to wide applications. Particularly, the polymer electrolyte composition is suitable when the polymer electrolyte molded product is membranes.

When the polymer electrolyte composition of the present invention is used for a polymer electrolyte fuel cell, it is suitably used in a polymer electrolyte membrane, an electrode catalyst layer and the like. Among them, the polymer electrolyte composition is suitably used in the polymer electrolyte membrane. The reason for this is that when the polymer electrolyte composition is used for a polymer electrolyte fuel cell, usually, it is used as the polymer electrolyte membrane or the electrode catalyst layer binder in the state of a membrane. The polymer electrolyte composition of the present invention has high chemical stability, and therefore it can be particularly suitably used for an electrode catalyst layer binder, in the vicinity of which an electrochemical reaction occurs.

The polymer electrolyte molded product of the present invention can be applied to a variety of applications. For example, the molded product can be applied to medical applications such as extracorporeal circulation column and artificial skin, filtration applications, ion exchange resin applications such as chlorine resistant reverse osmosis membranes, applications of various structural materials, electrochemical applications, humidification membranes, antifogging membranes, antistatic membranes, membranes for solar cells, and gas barrier materials. Also, it is suitable as artificial muscle, and actuator materials. Among them, it can be more preferably utilized in various electrochemical applications. Examples of the electrochemical application include a fuel cell, a redox flow cell, a water electrolysis device, a chloroalkali electrolysis device and the like, and among them, a fuel cell is most preferred.

Then, a production method for obtaining the polymer electrolyte molded product of the present invention will be specifically described.

In conventional block copolymers including a segment (A1) containing an ionic group, a segment (A2) not containing an ionic group, and a linker site linking between the segments, not only the segment (A1) containing an ionic group, but also the segment (A2) not containing an ionic group is composed of an amorphous polymer having solubility due to the synthetic constraint that solubility in a solvent is required in polymerization or in forming a membrane. Since these amorphous segments not containing an ionic group are low in a cohesive force of a polymer molecular chain, they are deficient in toughness or cannot suppress swelling of the segment (A1) containing an ionic group when being formed into the form of membrane, and therefore sufficient mechanical strength and physical durability are not be achieved. Further, since forming by casting is usually employed because of a problem of a thermal decomposition temperature of the ionic group, a uniform and tough membrane cannot be obtained in a crystalline polymer having low solubility.

The polymer electrolyte molded product of the present invention is composed of a block copolymer having the segment (A2) containing the constituent unit represented by the general formula (S2) and not containing an ionic group. Since the segment (A2) not containing the ionic group is a segment exhibiting crystallinity, the polymer electrolyte molded product can be produced by molding a block copolymer precursor in which a protective group has been introduced at least into the segment (A2) not containing an ionic group, and then deprotecting at least a part of the protective group contained in the molded product. Regarding protecting-deprotecting, WO 2006/87995 and WO 2008/18487 can be used as references.

In the block copolymer, since the processability tends to be deteriorated rather than in a random copolymer due to crystallization of the polymer with a domain formed thereon, it is preferred that a protective group is introduced at least into the segment (A2) not containing an ionic group to improve processability, and it is also preferred that a protective group is introduced into the segment (A1) containing an ionic group when processability is deteriorated.

In oligomer synthesis by the aromatic nucleophilic substitution reaction which is performed in order to obtain the segment to be used in the present invention, a polymer can be obtained by reacting the monomer mixture in the presence of a basic compound. The polymerization can be performed in a temperature range of 0 to 350° C., and preferably at a temperature of 50 to 250° C. When the temperature is lower than 0° C., the reaction tends not to proceed adequately, and when the temperature is higher than 350° C., decomposition of the polymer tends to begin occurring. The reaction can also be performed in the absence of a solvent, but it is performed preferably in a solvent. Examples of the usable solvent include, but are not limited to, aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, hexamethylphosphonetriamide and the like, and a solvent which can be used as a stable solvent in the aromatic nucleophilic substitution reaction may be used. These organic solvents may be used alone, or as a mixture of two or more thereof.

Examples of the basic compound include sodium hydroxide, potassium hydroxide, sodium carbonate, potassium carbonate, sodium bicarbonate, potassium bicarbonate and the like, and a basic compound which can bring aromatic diols into an active phenoxide structure can be used without limitation thereto. In order to enhance nucleophilicity of phenoxide, a crown ether such as 18-crown-6 is suitably added. Sodium ions or potassium ions of a sulfonic acid group are coordinated with these crown ethers to improve solubility in an organic solvent in some cases, and these crown ethers can be preferably used.

In the aromatic nucleophilic substitution reaction, water is produced as a byproduct in some cases. In this case, it is also possible to allow toluene or the like to coexist in the reaction system regardless of polymerization solvents to remove water as an azeotrope to outside of the system. In a method of removing water to outside of the system, a water-absorbing agent such as molecular sieve can also be used.

An azeotropic agent used for removing reaction water or water which has been introduced during the reaction is generally any inactive compound which does not substantially hinder polymerization, is distilled together with water, and is boiled at temperatures of about 25° C. to about 250° C. A normal azeotropic agent includes benzene, toluene, xylene, chlorobenzene, methylene chloride, dichlorobenzene, trichlorobenzene, cyclohexanone and the like. Naturally, it is advantageous to select an azeotropic agent having a boiling point lower than that of the bipolar solvent used.

The azeotropic agent is usually used, but when a high reaction temperature, for example, a temperature of 200° C. or higher is used, particularly, when an inert gas is continuously sprayed on the reaction mixture, it is not necessarily required. Generally, it is desirable to perform the reaction under the inert atmosphere in the state where no oxygen is present.

When the aromatic nucleophilic substitution reaction is performed in a solvent, it is preferred to charge the monomer so that a concentration of the resulting polymer is 5 to 50 wt %. When the concentration is lower than 5 wt %, a degree of polymerization tends to hardly increase. On the other hand, when the concentration is higher than 50 wt %, since viscosity of the reaction system becomes too high, post treatment of a reaction product tends to become difficult to perform.

After completion of the polymerization reaction, the solvent is removed from the reaction solution by evaporation, and the residue is washed as necessary, and thereby a desired polymer is obtained. Also, the polymer can be obtained by adding the reaction solution to a solvent in which solubility of a polymer is low, and solubility of an inorganic salt made as a byproduct is high, thereby removing the inorganic salt, precipitating the polymer as a solid, and collecting the precipitate by filtration. The recovered polymer is optionally washed with water, an alcohol or other solvents, and dried. When a desired molecular weight is obtained, a halide or phenoxide terminal group can be optionally reacted by introducing a phenoxide or halide terminal blocking agent which forms a stable terminal group.

A molecular weight of the ionic-group-containing polymer to be used in the present invention thus obtained is 1000 to 5000000 and preferably 10000 to 500000 in terms of a weight average molecular weight on the polystyrene equivalent basis. When the molecular weight is less than 1000, any of mechanical strength, physical durability and solvent resistance is insufficient in some cases so that cracks are produced in a formed membrane, for example. On the other hand, when the molecular weight is more than 5000000, there are problems that the solubility is insufficient, solution viscosity is high and processability is low.

In addition, a chemical structure of the ionic-group-containing polymer to be used in the present invention can be confirmed by S=O absorption at 1030 to 1045 $cm^{-1}$, and 1160 to 1190 $cm^{-1}$, C—O—C absorption at 1130 to 1250 $cm^{-1}$, C=O absorption at 1640 to 1660 $cm^{-1}$ or the like by infrared absorption spectrum, and a composition ratio thereof can be known by neutralization titration of a sulfonic acid group, or elementary analysis. Further, a structure thereof can be confirmed by nuclear magnetic resonance spectrum ($^1$H-NMR), for example, from peaks of an aromatic proton at 6.8 to 8.0 ppm. A position of attachment of a sulfonic acid group and arrangement of sulfonic acid groups can be confirmed by solution $^{13}$C-NMR or solid $^{13}$C-NMR.

In the block copolymer to be used in the present invention, a continuous phase separation structure can be observed with transmission electron microscope observation. By controlling a phase separation structure of the block copolymer, that is, aggregation state of the segment (A1) containing an ionic group and the segment (A2) not containing an ionic group, and a shape thereof, excellent proton conductivity can be realized even under slightly humidified conditions. It is possible to analyze the phase separation structure with a transmission electron microscope (TEM), an atomic force microscope (AFM) or the like.

In the polymer electrolyte composition of the present invention, a nitrogen-containing antioxidant can be intensively arranged in a hydrophilic domain formed by the segment having an ionic group or a hydrophobic domain formed by the segment not having an ionic group by appropriately selecting its polarity (hydrophilicity or hydrophobicity). Hydroxy radicals and hydrogen peroxide usually have high hydrophilicity and are thought to be present in the hydrophilic domain formed by the segment having an ionic group and cut the segment. Accordingly, a hydrophilic antioxidant is effective at stabilizing the segment having anionic group. On the other hand, the hydrophobic domain formed by the segment not having an ionic group is a component responsible for mechanical strength, and therefore it is thought to have the effect of improving physical durability by arranging a hydrophobic antioxidant. These are suitably used in combination as required.

The block copolymer to be used in the present invention is preferably a block copolymer in which a phase separation structure is observed when observed with TEM at a magnification of 50000 times, and an average interlayer distance or an average interparticle distance measured by image processing is 8 nm or more and 100 nm or less. Particularly, an average interlayer distance or an average interparticle distance is more preferably 10 nm or more and 50 nm or less, and most preferably 15 nm or more and 30 nm or less. When the phase separation structure is not observed with a transmission electron microscope, or the average interlayer distance or the average interparticle distance is less than 8 nm, since continuity of an ion channel is deficient, and conductivity is deficient in some cases, this is not preferable. Further, when the interlayer distance is more than 5000 nm, mechanical strength and dimensional stability become deficient in some cases, and this is not preferable.

The block copolymer to be used in the present invention is characterized in that it has crystallinity while having the phase separation structure, and the crystallinity is recognized by differential scanning calorimetry (DSC) or wide angle X-ray diffraction. That is, the block copolymer to be used has a crystallization heat amount measured by differential scanning calorimetry of 0.1 J/g or more, or a crystallinity measured by wide angle X-ray diffraction of 0.5% or more.

In the present invention, "a polymer has crystallinity" means that the polymer can be crystallized on heating temperature, has a crystallizable property, or has already been crystallized. Also, the amorphous polymer means a polymer which is not a crystalline polymer, in which crystallization does not substantially proceed. Accordingly, even a crystalline polymer can be in an amorphous state as a polymer state when crystallization does not adequately proceed.

The method of forming the polymer electrolyte composition of the present invention into a polymer electrolyte membrane is not particularly limited, and a method of forming a membrane from a solution state or a method of forming a membrane from a molten state can be used in a stage of having a protective group such as ketal. In the former, for example, a method is exemplified in which the polymer electrolyte material is dissolved in a solvent such as N-methyl-2-pyrrolidone and the resulting solution is applied onto a glass plate by casting, and then the solvent is removed to form a membrane.

As the solvent to be used to form a membrane, any can be used as long as a polymer electrolyte composition can be dissolved in the solvent and then the solvent can be removed, and an aprotic polar solvent such as N,N-dimethylacetamide, N,N-dimethylformamide, N-methyl-2-pyrrolidone, dimethyl sulfoxide, sulfolane, 1,3-dimethyl-2-imidazolidinone, or hexamethylphosphonetriamide; an ester-based solvent such as γ-butyrolactone or butyl acetate; a carbonate-based solvent such as ethylene carbonate or propylene carbonate; an alkylene glycol monoalkyl ether such as ethylene glycol monomethyl ether, ethylene glycol monoethyl ether, propylene glycol monomethyl ether, or propylene glycol monoethyl ether; an alcohol-based solvent such as isopropanol; or water and a mixture thereof is preferably used, and an aprotic polar solvent is preferred because of its highest solubility. Further, it is also preferred to add a crown ether such as 18-crown-6 in order to enhance the solubility of the segment (A1) containing an ionic group.

Further, in the present invention, when the block copolymer is used, selection of the solvent is important for a phase separation structure, and a method of mixing an aprotic polar solvent and a less polar solvent to use is preferred.

It is preferred to subject a polymer solution prepared so as to have a required solid concentration to filtration under pressured or not to remove unknown substances contained in the polymer electrolyte solution, in order to obtain a tough membrane. A filter medium used herein is not particularly limited and is preferably a glass filter or a metal filter. A minimum pore size of the filter, through which the polymer solution passes in the filtration, is preferably 1 μm or less. If the polymer is not subjected to filtration, it is not preferred since it allows impurities to mix in to cause break of a membrane or inadequate durability.

Then, in the resulting polymer electrolyte membrane, it is preferred to heat treat at least a part of the ionic group in a state of metal salt. When the polymer electrolyte material to be used is a polymer which is polymerized in a state of metal salt in polymerization, it is preferably formed into a membrane and heat treated as it is. Metals in metal salts may be those capable of forming salts with a sulfonic acid, but from the viewpoint of its price and environmental burden, it is preferably Li, Na, K, Rb, Cs, Mg, Ca, Sr, Ba, Ti, V, Mn, Fe, Co, Ni, Cu, Zn, Zr, Mo, and W, and among these metals, Li, Na, K, Ca, Sr, and Ba are more preferred, and Li, Na, and K are moreover preferred.

The temperature of the heat treatment is preferably from 80 to 350° C., more preferably from 100 to 200° C., and particularly preferably from 120 to 150° C. The time for heat treatment is preferably from 10 seconds to 12 hours, more preferably from 30 seconds to 6 hours, and particularly preferably from 1 minute to 1 hour. When the temperature of the heat treatment is too low, mechanical strength and physical durability may be insufficient. On the other hand, when the temperature of the heat treatment is too high, chemical decomposition of a membrane material may proceed. When the time of the heat treatment is less than 10 seconds, an effect of heat treatment is deficient. On the other hand, when the time of the heat treatment is more than 12 hours, a membrane material tends to deteriorate. The polymer electrolyte membrane obtained by the heat treatment can be subjected to proton substitution by immersing it in an acid aqueous solution as required. Forming by this method enables the polymer electrolyte membrane of the present invention to achieve proton conductivity and physical durability simultaneously in a good balance.

As a method for converting the polymer electrolyte composition used in the present invention to a membrane, there is a method in which a membrane composed of the polymer electrolyte composition is prepared by the above technique, and then at least a part of a ketone site protected with ketal is deprotected to form a ketone site. In accordance with this method, it becomes possible to form a membrane from a solution of a block copolymer with low solubility comprising a block not containing an ionic group, and it is possible to achieve proton conductivity, mechanical strength and physical durability simultaneously.

With respect to a membrane thickness of the polymer electrolyte membrane of the present invention, a membrane having a thickness of 1 to 2000 μm is suitably used. For the purpose of obtaining the mechanical strength and the physical durability of a membrane enduring practical use, the thickness is more preferably more than 1 μm, and for the purpose of decreasing membrane resistance, namely, improving of power generation performance, the thickness is preferably less than 2000 μm. The thickness is more preferably from 3 to 50 μm, and particularly preferably from 10 to 30 μm. The thickness can be controlled by the concentration of the solution or the thickness of the coat on a substrate.

Moreover, additives used in a usual polymer compound, for example, crystallization nucleating agents, plasticizers, stabilizers, antioxidants and releasing agents can be added to the polymer electrolyte membrane obtained according to the present invention to such an extent that the object of the present invention is not impaired.

Further, for the purpose of improving mechanical strength, thermal stability and processability, the polymer electrolyte membrane obtained according to the present invention may contain various polymers, elastomers, fillers, fine particles and various additives to such an extent that various properties described above are not adversely affected. Moreover, the membrane may be reinforced with a microporous membrane, a nonwoven fabric or a mesh.

The method for assembling a polymer electrolyte membrane with an electrode (membrane electrode assembly) when the polymer electrolyte membrane is used for a fuel cell is not particularly limited, and publicly known methods (for example, chemical plating method described in Electrochemistry, 1985, 53, p. 269, and thermal press-bonding method by a gas diffusion electrode, described in Electrochemical Science and Technology, edited by J. Electrochem. Soc., 1988, 135, 9, p. 2209) are applicable thereto.

In the case of assembling by using a hot press, the temperature and the pressure are appropriately selected according to the thickness of the electrolyte membrane, the moisture content, the catalyst layer or the electrode substrate. Moreover, in the present invention, assembling can be carried out by press even when the electrolyte membrane is dried or the membrane is water-absorbed. Specific examples of the press method include roll press in which the pressure and the clearance are defined, and flat-plate press in which the pressure is defined, and the press is preferably carried out at a temperature within a range of 0 to 250° C. from the viewpoint of industrial productivity and inhibition of thermal decomposition of the polymer material having an ionic group. It is preferred that the pressure is as low as possible from the viewpoint of protection of the electrolyte membrane and the electrode, and in the case of the flat-plate press, the pressure is preferably 10 MPa or less, and it is one of preferred choices from the viewpoint of prevention of short-circuit of anode and cathode to laminate an electrode and an electrolyte membrane to form a fuel cell without assembling by a hot press process. In the case of this method, when power generation is repeated as the fuel cell, deterioration of the electrolyte membrane, which is considered to be caused by the short-circuited portion, tends to be inhibited and durability as a fuel cell is improved.

Furthermore, applications of a polymer electrolyte fuel cell using the polymer electrolyte composition and the polymer electrolyte membrane of the present invention, but not particularly limited, are preferably electric power supply for mobile objects. Particularly, it is preferably used as electric power supply for portable devices such as cellular phone, personal computer, PDA, television set, radio, music player, game machine, headset and DVD player, various robots such as industrial humanoid robot and animal type robot, household appliances such as cordless cleaners, toys, and mobile objects, for example, vehicles such as electric bicycle, motorcycle, automobile, bus and trucks, marine vessels and railroads; substitutions of conventional primary and secondary cells, such as stationary type power generator; or hybrid power sources in which this polymer electrolyte fuel cell is used in combination with conventional primary and secondary cells.

EXAMPLES

Hereinafter, the present invention will be described in more detail by way of examples, but the present invention is not limited to the following examples. Measuring conditions of the respective physical properties are as follows.

(1) Ion-Exchange Capacity

The ion exchange capacity was measured by a neutralization titration method. The measurements were carried out three times, and an average thereof was taken.

(i) An electrolyte membrane was subjected to proton substitution and adequately washed with pure water, and moisture content on a surface of the electrolyte membrane was wiped and then, the membrane was vacuum-dried at 100° C. for 12 hours or more, and a dry weight thereof was determined.

(ii) To the electrolyte was added 50 mL of a 5% by mass aqueous sodium sulfate solution, and this was left at rest for 12 hours to perform ion exchange.

(iii) Using a 0.01 mol/l aqueous sodium hydroxide solution, generated sulfuric acid was titrated. As an indicator, a commercially available 0.1 w/v % phenolphthalein solution for titration was added, and a point at which a solution turned faint red-violet was regarded as an end point.

(iv) The ion exchange capacity was determined by the following equation:

$$\text{Ion exchange capacity (meq/g)} = [\text{concentration of aqueous sodium hydroxide solution (mmol/ml)} \times \text{dropwise addition amount (ml)}]/\text{dry weight of sample (g)}.$$

(2) Proton Conductivity

A membrane-like sample was immersed in pure water at 25° C. for 24 hours, and then was held in a thermo-hygrostat at 80° C. and a relative humidity of 25 to 95% at each step for 30 minutes, and proton productivity was measured by a potentiostatic AC impedance method.

As a measuring apparatus, an electrochemical measuring system manufactured by Solartron Metrology Ltd. (Solartron 1287 Electrochemical Interface and Solartron 1255B Frequency Response Analyzer) was used, and a potentiostatic impedance measurement was carried out by a two-terminal method to determine proton conductivity. An AC amplitude was set at 50 mV. As a sample, a membrane of 10 mm in width and 50 mm in length was used. A measuring jig was made of a phenolic resin and a measuring section was opened. Platinum plates (two plates of 100 μm in thickness) were used as electrodes. The electrodes were located at a distance of 10 mm on topside and reverse side of a sample membrane so as to be parallel to each other and orthogonal to a longitudinal direction of the sample membrane.

(3) Number Average Molecular Weight, Weight Average Molecular Weight

A number average molecular weight and a weight average molecular weight of a polymer were measured by GPC. Using HLC-8022GPC manufactured by TOSOH CORPORATION as an integrated apparatus of an ultraviolet detector and a differential refractometer, and two columns of TSK gel SuperHM-H (internal diameter 6.0 mm, length 15 cm) manufactured by TOSOH CORPORATION as GPC columns, measurement was performed at a sample concentration of 0.1 wt %, a flow rate of 0.2 mL/minute and a temperature of 40° C. in a N-methyl-2-pyrrolidone solvent (N-methyl-2-pyrrolidone solvent containing 10 mmol/L lithium bromide), to obtain a number average molecular weight and a weight average molecular weight on the standard polystyrene equivalent basis.

(4) Membrane Thickness

Using Model ID-C112 manufactured by Mitutoyo Corporation set to Granite Comparator Stand BSG-20 manufactured by Mitutoyo Corporation, measurement was performed.

(5) Measuring Method of Purity

Quantitative analysis was carried out in the following conditions with a gas chromatography (GC).
Column: DB-5 (manufactured by J&W Scientific, Inc.) L=30 m, Φ=0.53 mm, D=1.50 μm
Carrier: Helium (linear velocity=35.0 cm/second) Analysis condition
Inj. temp. 300° C.
Detect. temp. 320° C.
Oven 50° C. for 1 min
Rate 10° C./min
Final 300° C. for 15 min
SP ratio 50:1

(6) Solubility of Nitrogen-Containing Additive

The solubility of a nitrogen-containing additive was evaluated by measuring a residual amount after immersion in pure water at 60° C. or 10% by mass sulfuric acid at 60° C. After 100 mg of the nitrogen-containing additive and 1 L of a solvent were mixed, the resulting mixture was stirred at a rotational speed of 200 rpm at 60° C. for 1 hour using a mixing machine to dissolve the nitrogen-containing additive. The resulting residue of dissolution was separated by filtration, washed with 2 mL of water three times, and vacuum-dried at 80° C. for 24 hours, and a mass of the residue of dissolution was measured and a difference was calculated between the measured value and an initial additive amount of 100 mg to determine the solubility of the nitrogen-containing additive.

(7) Nuclear Magnetic Resonance Spectrum (NMR)

Under the following measuring conditions, measurement of 1H-NMR was performed, and structural confirmation, and quantification of a molar composition ratio of the segment (A1) containing an ionic group to the segment (A2) not containing an ionic group were performed. The molar composition ratio was calculated from values of the integral of peaks found at 8.2 ppm (derived from disulfonate-4,4'-difluorobenzophenone) and at 6.5 to 8.0 ppm (derived from wholly aromatic proton excluding disulfonate-4,4'-difluorobenzophenone).

Apparatus: EX-270 manufactured by JEOL Ltd.
Resonance frequency: 270 MHz (1H-NMR)
Measurement temperature: Room temperature
Dissolving solvent: DMSO-d6
Internal standard substance: TMS (0 ppm)
Integration time: 16 times (8) Chemical Stability (A) Molecular Weight Retention An electrolyte membrane soluble in N-methyl pyrrolidone (NMP) was deteriorated by the following method, and its chemical stability was evaluated by comparing molecular weights before and after the deterioration test.

A gas diffusion electrode for a fuel cell "ELAT (registered trademark) LT120ENSI" 5 g/m2 Pt manufactured by BASF Japan Ltd., commercially available electrode, was cut into a size of 5 cm square to prepare a pair of the cut electrodes, and these two electrodes were overlaid on each other with an electrolyte membrane sandwiched therebetween, which were opposed to each other to act as a fuel electrode and an oxidation electrode, respectively. The electrodes were hot pressed at 150° C. at a pressure of 5 MPa for 3 minutes to obtain a membrane electrode assembly for evaluation.

The membrane electrode assembly was set on JARI standard cell "Ex-1" (electrode area 25 cm2) manufactured by EIWA Corp., and hydrogen (70 mL/min, back pressure 0.1 MPaG) and air (174 mL/min, back pressure 0.05 MPaG), under the low humidity conditions, were introduced into a cell while maintaining a cell temperature at 80° C., and deterioration acceleration test in an open circuit was carried out. After the fuel cell was operated for 200 hours under these conditions, the membrane electrode assembly was taken out and put into a mixed solution of ethanol and water, and a catalyst layer was removed by applying ultrasonic treatment. A molecular weight of a remaining polymer electrolyte membrane was measured and evaluated as a molecular weight retention. Measurement of the number average molecular weight and the weight average molecular weight were carried out as described above.

(B) Open Circuit Retention Time

An electrolyte membrane insoluble in NMP was deteriorated by the following method, and its chemical stability was evaluated by comparing a retention time of an open circuit voltage.

A membrane electrode assembly was prepared by the same method as in the above description and set to a cell for evaluation. Subsequently, a deterioration acceleration test in an open circuit was carried out under the same conditions as in the above description. A time that elapses before the open circuit voltage is reduced to 0.7 V or less was referred to as an open circuit retention time and evaluated.

(C) Voltage Retention

When an open circuit voltage of 0.7 V or more could be maintained after 3000 hours even in performing the evaluation of the above (B) open circuit retention time, the evaluation was discontinued at 3000 hours, and chemical durability was evaluated by a voltage retention derived from an initial voltage and a voltage at 3000 hours.

Synthesis Example 1

Synthesis of 2,2-bis(4-hydroxyphenyl)-1,3-dioxolane (K-DHBP) represented by the following general formula (G1)

[Chemical Formula 45]

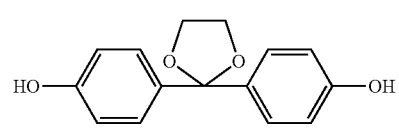

(G1)

Into a 500 ml flask equipped with a stirrer, a thermometer and a distillate tube, 49.5 g of 4,4'-dihydroxybenzophenone, 134 g of ethylene glycol, 96.9 g of trimethyl orthoformate and 0.50 g of p-toluenesulfonic acid monohydrate were charged to be dissolved. Thereafter, the resulting solution was kept at a temperature of 78 to 82° C. and stirred for 2 hours. Furthermore, an internal temperature was gradually raised to 120° C. and heating was continued until distillation of methyl formate, methanol and trimethyl orthoformate completely ceases. This reaction solution was cooled to room temperature and then diluted with ethyl acetate, and an organic layer was washed with 100 ml of a 5% aqueous solution of potassium carbonate and separated, and a solvent was distilled off. To a residue, 80 ml of dichloromethane was added to precipitate a crystal and the resulting mixture was separated by filtration and dried to obtain 52.0 g of 2,2-bis(4-hydroxyphenyl)-1,3-dioxolane. This crystal was analyzed by gas chromatography to yield 99.8% of 2,2-bis(4-hydroxyphenyl)-1,3-dioxolane and 0.2% of 4,4'-dihydroxybenzophenone.

Synthesis Example 2

Synthesis of Disodium 3,3'-disulfonate-4,4'-difluorobenzophenone represented by the following general formula (G2)

[Chemical Formula 46]

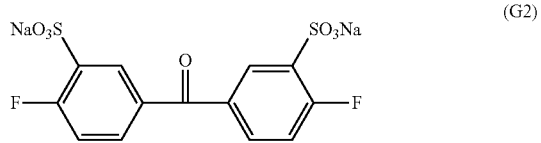

(G2)

109.1 g of 4,4'-difluorobenzophenone (Aldrich reagent) was reacted at 100° C. for 10 hours in 150 ml of a fuming sulfuric acid (50% SO3) (reagent produced by Wako Pure Chemical Industries, Ltd.). Thereafter, the reactant was charged into a large amount of water little by little, and the resulting mixture was neutralized with NaOH, and to this, 200 g of common salt was added to precipitate a synthetic product. The obtained precipitate was separated by filtration and then recrystallized from an aqueous ethanol solution to obtain disodium 3,3'-disulfonate-4,4'-difluorobenzophenone represented by the above general formula (G2). Purity was 99.3%. The structure was confirmed by 1H-NMR. Impurities were quantitatively analyzed by capillary electrophoresis (organic matter) and ion chromatography (inorganic matter).

Synthesis Example 3

(Synthesis of Oligomer a1' Represented by the Following General Formula (G3) and not Containing an Ionic Group)

Into a 1000 mL three-necked flask equipped with a stirrer, a nitrogen introducing tube and a Dean-Stark trap, 16.59 g (Aldrich reagent, 120 mmol) of potassium carbonate, 25.8 g (100 mmol) of K-DHBP obtained in the above Synthesis Example 1, and 20.3 g (Aldrich reagent, 93 mmol) of 4,4'-difluorobenzophenone were charged, and after the atmosphere in the flask was replaced by nitrogen, the resulting mixture was dehydrated at 160° C. in 300 mL of N-methyl pyrrolidone (NMP) and 100 mL of toluene, and the dehydrated content was heated to remove toluene and polymerization was carried out at 180° C. for 1 hour. The reaction solution was purified by reprecipitating with a large amount of methanol to obtain an oligomer a1 (terminal hydroxyl group) not containing an ionic group. The oligomer a1 had a number average molecular weight of 10000.

Into a 500 mL three-necked flask equipped with a stirrer, a nitrogen introducing tube and a Dean-Stark trap, 1.1 g (Aldrich reagent, 8 mmol) of potassium carbonate, and 20.0 g (2 mmol) of the oligomer a1 (terminal hydroxyl group) not containing an ionic group were charged, and after the atmosphere in the flask was replaced by nitrogen, the resulting mixture was dehydrated at 100° C. in 100 mL of N-methyl pyrrolidone (NMP) and 30 mL of cyclohexane, and the dehydrated content was heated to remove cyclohexane, and to this, 4.0 g (Aldrich reagent, 12 mmol) of decafluorobiphenyl was added to perform a reaction at 105° C. for 1 hour. The reaction product was purified by reprecipitating with a large amount of isopropyl alcohol to obtain an oligomer a1' (terminal fluoro group) represented by the following formula (G3) and not containing an ionic group. The oligomer a1' had a number average molecular weight of 11000, and the number average molecular weight of the oligomer a1' not containing an ionic group was 10400 which was determined by subtracting a linker site (molecular weight 630).

[Chemical Formula 47]

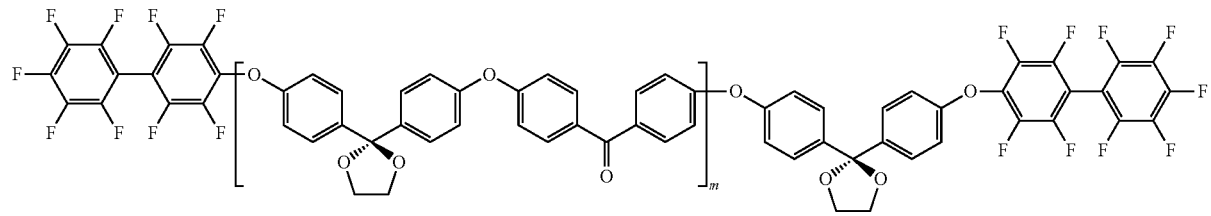

(G3)

(Synthesis of an Oligomer a2 Represented by the Following General Formula (G4) and Containing an Ionic Group)

Into a 1000 mL three-necked flask equipped with a stirrer, a nitrogen introducing tube and a Dean-Stark trap, 27.6 g (Aldrich reagent, 200 mmol) of potassium carbonate, 12.9 g (50 mmol) of K-DHBP obtained in the above Synthesis Example 1, 9.3 g (Aldrich reagent, 50 mmol) of 4,4'-biphenol, 39.3 g (93 mmol) of disodium 3,3'-disulfonate-4, 4'-difluorobenzophenone obtained in the above Synthesis Example 2, and 17.9 g (reagent produced by Wako Pure Chemical Industries, Ltd., 82 mmol) of 18-crown-6 were charged, and after the atmosphere in the flask was replaced by nitrogen, the resulting mixture was dehydrated at 170° C. in 300 ml of N-methyl pyrrolidone (NMP) and 100 mL of toluene, and the dehydrated content was heated to remove toluene and polymerization was carried out at 180° C. for 1 hour. The reaction product was purified by reprecipitating with a large amount of isopropyl alcohol to obtain an oligomer a2 (terminal hydroxyl group) represented by the following formula (G4) and containing an ionic group. The oligomer a2 had a number average molecular weight of 16000.

[Chemical Formula 48]

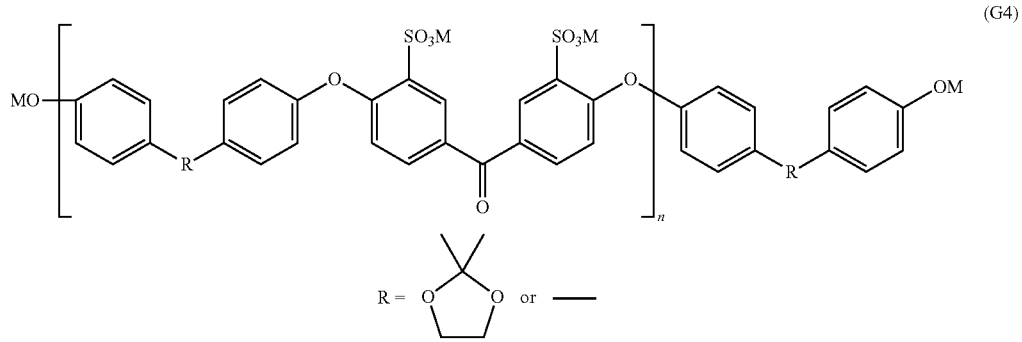

(G4)

In the above formula G(4), M represents Na or K.

(Synthesis of Block Copolymer b1 Containing an Oligomer a2 as a Segment (A1) Containing an Ionic Group, an Oligomer A1 as a Segment (A2) not Containing an Ionic Group, and Octafluorobiphenylene as a Linker Site)

Into a 500 mL three-necked flask equipped with a stirrer, a nitrogen introducing tube and a Dean-Stark trap, 0.56 g (Aldrich reagent, 4 mmol) of potassium carbonate, and 16 g (1 mmol) of the oligomer a2 (terminal hydroxyl group) containing an ionic group were charged, and after the atmosphere in the flask was replaced by nitrogen, the resulting mixture was dehydrated at 100° C. in 100 ml of N-methyl pyrrolidone (NMP) and 30 ml of cyclohexane, and the dehydrated content was heated to remove cyclohexane, and to this, 11 g (1 mmol) of the oligomer a1' (terminal fluoro group) not containing an ionic group was added to perform a reaction at 105° C. for 24 hours. The reaction product was purified by reprecipitating with a large amount of isopropyl alcohol to obtain a block copolymer b1. The block copolymer b1 had a weight average molecular weight of 340000.

The block polymer b1 contained a constituent unit represented by the above general formula (S1) in an amount of 50% by mole as the segment (A1) containing an ionic group, and a constituent unit represented by the above general formula (S2) in an amount of 100% by mole as the segment (A2) not containing an ionic group.

The ion exchange capacity determined by neutralization titration at the time when the block copolymer b1 itself was used as a polymer electrolyte membrane was 1.8 meq/g, a molar composition ratio A1/A2) determined from 1H-NMR was 56 mol/44 mol=1.27, and a residue of the ketal group was not found.

Synthesis Example 4

(Synthesis of Polyethersulfone (PES)-Type Block Copolymer Precursor b2' Composed of Segment Represented by Following Formula (G6) and Segment Represented by Following Formula (G7))

Anhydrous nickel chloride (1.62 g) and dimethyl sulfoxide (15 ml) were mixed and adjusted to 70° C. To this, 2,2'-bipyridyl (2.15 g) was added, and the resulting mixture was stirred at 70° C. for 10 minutes to prepare a nickel-containing solution.

To this, 2,5-dichlorobenzenesulfonic acid (2,2-dimethylpropyl) (1.49 g) and SUMIKAEXCEL PES 5200P (produced by Sumitomo Chemical Co., Ltd., Mn=40000, Mw=94000) (0.50 g) represented by the following formula (G5) were dissolved in dimethyl sulfoxide (5 ml), and to the resulting solution, zinc powder (1.23 g) was added and the resulting mixture was adjusted to 70° C. Into this, the above nickel-containing solution was poured and a polymerization reaction was performed at 70° C. for 4 hours. The resulting reaction mixture was added to 60 ml of methanol, and to this, 60 ml of 6 mol/l hydrochloric acid was added and the resulting mixture was stirred for 1 hour. A precipitated solid was separated by filtration and dried to obtain polyarylene (1.62 g) containing, in yield of 99%, an ashen segment represented by the following formula (G6) and the following formula (G7). The polyarylene had a weight average molecular weight of 200000.

[Chemical Formula 49]

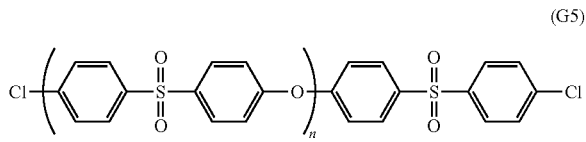
(G5)

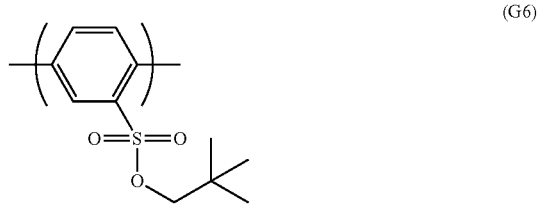
(G6)

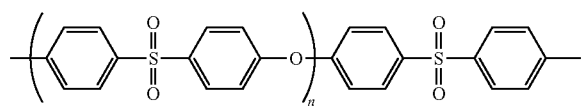
(G7)

Synthesis Example 5

(Synthesis of PES-Type Block Copolymer b2 Composed of Segment Represented by Following Formula (G7) and Segment Represented by Following Formula (G8))

The block copolymer precursor b2' (0.23 g) obtained in Synthesis Example 4 was added to a mixed solution of lithium bromide monohydrate (0.16 g) and N-methyl-2-pyrrolidone (8 ml), and the resulting mixture was reacted at 120° C. for 24 hours. The resulting reaction mixture was poured into 80 ml of 6 mol/l hydrochloric acid and the resulting mixture was stirred for 1 hour. A precipitated solid was separated by filtration. The separated solid was dried to obtain an ashen block copolymer b2 composed of the segment represented by the formula (G7) and the segment represented by the following formula (G8). The resulting polyarylene had a weight average molecular weight of 180000.

The ion exchange capacity determined by neutralization titration at the time when the block copolymer b2 itself was used as a polymer electrolyte membrane was 2.0 meq/g.

[Chemical Formula 50]

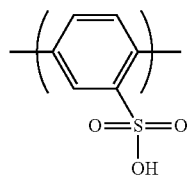

(G8)

Synthesis Example 6

(Synthesis of Hydrophobic Oligomer a3 Represented by Following Formula (G9))

[Chemical Formula 51]

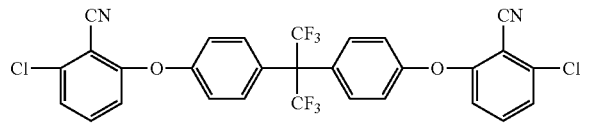

(G9)

In a 1000 mL three-necked flask equipped with a stirrer, a thermometer, a cooling tube, a Dean-Stark tube and a 3-way cock for nitrogen introduction, 2,6-dichlorobenzonitrile (49.4 g (0.29 mol)), 2,2-bis(4-hydroxyphenyl)-1,1,1,3,3,3-hexafluoropropane (88.4 g (0.26 mol)), and potassium carobonate (47.3 g (0.34 mol)), which have been weighed out, were put.

After the atmosphere in the flask was replaced by nitrogen, 346 ml of sulfolane and 173 ml of toluene were added, and the resulting mixture was stirred. The flask was immersed in an oil bath and the resulting mixture was refluxed while being heated at 150° C. When the mixture was reacted while removing water produced by a reaction together with toluene to the outside of a system through the Dean-Stark tube by azeotropic distillation, production of water was little found in about 3 hours. After most of toluene was removed while raising a reaction temperature gradually, the reaction was continued at 200° C. for 3 hours. Then, 12.3 g (0.072 mol) of 2,6-dichlorobenzonitrile was added, and a reaction was further performed for 5 hours.

The resulting reaction solution was cooled in the air and diluted with 100 mL of toluene. A precipitate of an inorganic compound made as a byproduct was filtered and removed, and a filtrate was charged into 2 L of methanol. A precipitated product was separated by filtration, recovered, and dried, and then the product was dissolved in 250 ml of tetrahydrofuran. The resulting solution was reprecipitated in 2 L of methanol to obtain 107 g of a desired oligomer a3. The oligomer a3 had a number average molecular weight of 7400.

Synthesis Example 7

(Synthesis of Hydrophilic Monomer a4 Represented by Following Formula (G10))

[Chemical Formula 52]

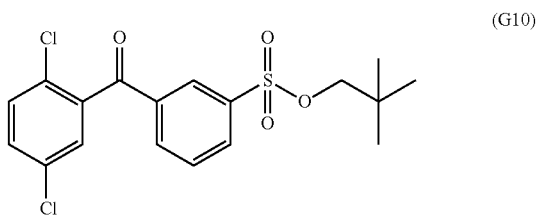

(G10)

To a 3 L three-necked flask equipped with a stirrer and a cooling tube, chlorosulfonic acid (233.0 g (2 mol)) was added, and subsequently 2,5-dichlorobenzophenone (100.4 g (400 mmol)) was added, and the resulting mixture was reacted for 8 hours in an oil bath at 100° C. After a predetermine time, a reaction solution was gradually poured on crushed ice (1000 g) and extracted with ethyl acetate. An organic layer was washed with a salt solution and dried with magnesium sulfate, and then ethyl acetate was distilled off to obtain a light-yellow crude crystal of 3-(2,5-dichlorobenzoyl)benzene sulfonyl chloride. The crude crystal was not purified and used in a process step as-is.

2,2-dimethyl-1-propanol (neopentyl alcohol) (38.8 g (440 mmol)) was added to pyridine (300 ml) and the resulting mixture was cooled to about 10° C. To this, the obtained crude crystal was gradually added over about 30 minutes. After the whole amount of the crude crystal was added, the resulting mixture was further stirred for 30 minutes to react them. After the reaction, a reaction solution was poured in 1000 ml of hydrochloric solution, and a precipitated solid was recovered. The recovered solid was dissolved in ethyl acetate and washed with an aqueous solution of sodium hydrogen carbonate and a salt solution and dried with magnesium sulfate, and then ethyl acetate was distilled off to obtain a crude crystal. The crude crystal was recrystallized with methanol to obtain a white crystal of 3-(2,5-dichlorobenzoyl)benzene sulfonic acid neopentyl a4 represented by the following structural formula.

Synthesis Example 8

(Synthesis of Polyarylene-Type Block Copolymer b3 Represented by Following Formula (G11))

[Chemical Formula 53]

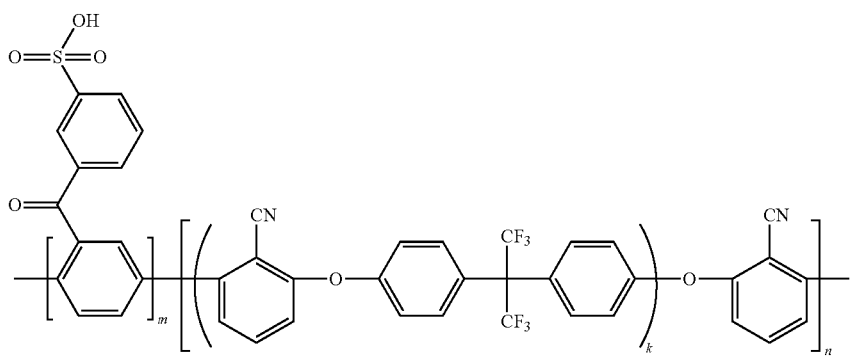

In a 1000 mL three-necked flask equipped with a stirrer, a thermometer and a nitrogen introducing tube, dry N,N-dimethylacetamide (DMAc) (166 ml) was added to a mixture of the hydrophobic oligomer (13.4 g (1.8 mmol)) synthesized in Synthesis Example 6, 3-(2,5-dichlorobenzoyl)benzene sulfonic acid neopentyl (37.6 g (93.7 mmol)) synthesized in Synthesis Example 7, bis(triphenylphosphine)nickel dichloride 2.62 g (4.0 mmol), triphenylphosphine (10.5 g (40.1 mmol)), sodium iodide (0.45 g (3.0 mmol)) and zinc (15.7 g (240.5 mmol)) under a nitrogen atmosphere.

A reaction system was heated while stirring (ultimately heated to 82° C.) and reacted for 3 hours. An increase in viscosity in the system was observed during the reaction. A polymerization reaction solution was diluted with 175 ml of DMAc, stirred for 30 minutes and flittered by using Celite as a filter aid. To this filtrate, lithium bromide (24.4 g (281 mmol)) was added one-third by one-third three times at 1-hour intervals in a 1000 mL three-necked flask equipped with a stirrer, and the resulting mixture was reacted at 120° C. for 5 hours in a nitrogen atmosphere. After the reaction, a reactant was cooled to room temperature, and added to acetone (4 L) to be solidified. The solidified product was collected by filtration, dried with air, pulverized with a mixer, and washed with 1500 ml of 1N sulfuric acid while being stirred. After filtration, a product was washed with ion-exchange water until a pH of a washing solution becomes 5 or more, and dried at 80° C. overnight to obtain a desired block copolymer b3 (38.0 g). The block copolymer had a weight average molecular weight of 170000.

The ion exchange capacity determined by neutralization titration at the time when the block copolymer b3 itself was used as a polymer electrolyte membrane was 2.5 meq/g.

Example 1

(Synthesis of ADT-1)

8-amino-7-quinolinecarbaldehyde (101 g) was reacted with 1,3-diacetylbenzene (45 g) (produced by Tokyo Chemical Industry Co., Ltd.) and 85% potassium hydroxide (100 g) under reflux for 10 hours in 1800 ml of ethanol and treated by a normal method to obtain ADT-1 (100 g). The solubility of ADT-1 in pure water at 60° C. was less than 0.1 mg/L, and the solubility in 10% by mass sulfuric acid at 60° C. was 5.0 mg/L. A molecular weight of ADT-1 was 434.49.

[Chemical Formula 54]

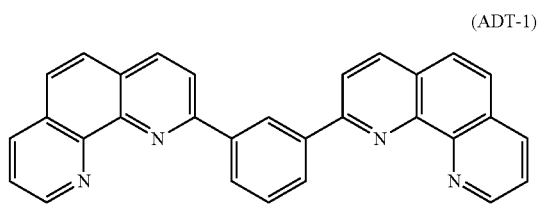

(Preparation of ADT-1-Added Membrane)

The block copolymer b1 (20 g) obtained in Synthesis Example 3 was dissolved in NMP (80 g). To the resulting solution, 100 mg of ADT-1 was added, and the resulting mixture was stirred at 20000 rpm for 3 minutes with a stirrer to obtain a transparent solution having a polymer concentration of 20% by mass. The resulting solution was pressure-filtered by using a glass fiber filter, applied onto a glass substrate by casting, dried at 100° C. for 4 hours, and heat treated at 150° C. for 10 minutes in a nitrogen atmosphere to obtain a polyketal ketone membrane (thickness: 15 μm). The solubility of a polymer was extremely high. The membrane was immersed in a 10% by mass aqueous sulfuric acid solution at 95° C. for 24 hours to perform proton substitution and a deprotection reaction, and then the resulting reaction product was adequately washed by being immersed in a largely excessive amount of pure water for 24 hours to obtain a polymer electrolyte membrane f1.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 2

An electrolyte membrane f2 was produced in the same manner as in Example 1 except for changing the additive amount of ADT-1 to 6 g.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 3

An electrolyte membrane f3 was produced in the same manner as in Example 1 except for changing the additive amount of ADT-1 to 4 mg.

Since the resulting membrane was insoluble in NMP and its molecular weight retention could not be measured, its open circuit retention time was measured as a durability test. The ion exchange capacity and the proton conductivity were separately measured, and these results are shown in Table 1.

Example 4

(Synthesis of ADT-2)

ADT-1 (40.8 g) synthesized in Example 1 was reacted with 0.94 M cyclohexane/diethyl ether solution (200 ml) of phenyllithium in 750 ml of toluene under ice cooling for 2.5 hours and treated by a normal method. The resulting product was reacted with nitrobenzene (118 g) at 110° C. for 3 hours and treated by a normal method to obtain ADT-2 (22.8 g) represented by the following formula. The solubility of ADT-2 in pure water at 60° C. was less than 0.1 mg/L, and the solubility in 10% by mass sulfuric acid at 60° C. was 3.4 mg/L. A molecular weight of ADT-2 was 586.68.

[Chemical Formula 55]

(ADT-2)

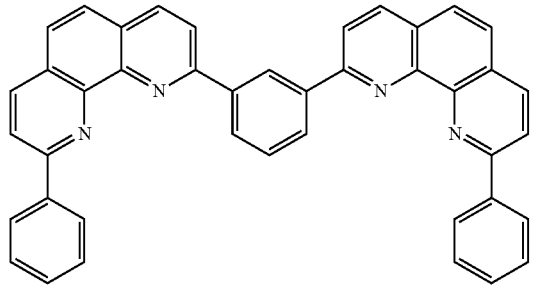

(Preparation of ADT-2-Added Membrane)

An electrolyte membrane f4 was produced in the same manner as in Example 1 except for using ADT-2.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 5

(Synthesis of ADT-3)

ADT-3 was synthesized in the same manner as in Example 1 except for using 1,4-diacetylbenzene in place of 1,3-diacetylbenzene. The solubility of ADT-3 in pure water at 60° C. was less than 0.1 mg/L, and the solubility in 10% by mass sulfuric acid at 60° C. was 4.2 mg/L. A molecular weight of ADT-3 was 434.49.

[Chemical Formula 56]

(ADT-3)

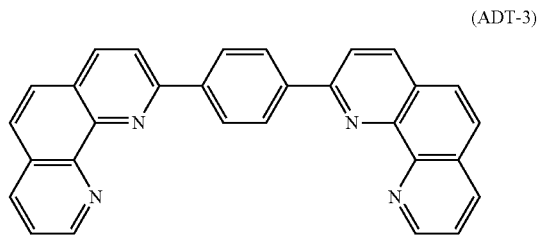

(Preparation of ADT-3-Added Membrane)

An electrolyte membrane f4 was produced in the same manner as in Example 1 except for using ADT-2.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 6

(Synthesis of ADT-4)

1-bromonaphthalene (11.9 g) (produced by Tokyo Chemical Industry Co., Ltd.) was reacted with lithium (1.6 g) at room temperature for 3 hours in 58 ml of diethyl ether, and the resulting perse solution was added dropwise to a suspension (100 ml) having ADT-3 (5.0 g) dispersed in toluene at room temperature. The resulting mixture was reacted at room temperature for 3 days and treated by a normal method. The resulting product was reacted with 100 g of manganese dioxide at room temperature for 3 hours in 400 ml of dichloromethane and treated by a normal method to obtain ADT-4 (1.14 g) represented by the following formula. The solubility of ADT-4 in pure water at 60° C. was less than 0.1 mg/L, and the solubility in 10% by mass sulfuric acid at 60° C. was 1.9 mg/L. A molecular weight of ADT-4 was 686.80.

[Chemical Formula 57]

(ADT-4)

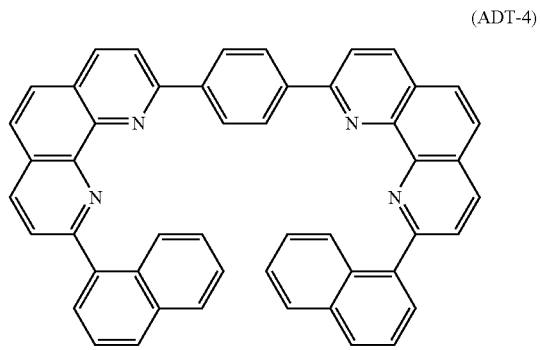

(Preparation of ADT-4-Added Membrane)

An electrolyte membrane f6 was produced in the same manner as in Example 1 except for using ADT-4.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 7

(Synthesis of ADT-5)

2,7-dihydroxynaphthalene (54.0 g) (produced by Tokyo Chemical Industry Co., Ltd.) was dissolved in dichloromethane (680 ml) and pyridine (136 ml), and trifluoromethanesulfonic anhydride (228 g) (produced by Tokyo Chemical Industry Co., Ltd.) was added dropwise at 0° C. The resulting mixture was reacted at 5° C. for 2 hours and then at room temperature for 1 day, and a reactant was treated by a normal method to obtain 2,7-bis(trifluoromethanesulfonyloxy) naphthalene (143 g). This 2,7-bis(trifluoromethanesulfonyloxy) naphthalene (143 g) was mixed with n-butyl vinyl ether (216 ml) (produced by Tokyo Chemical Industry Co., Ltd.), triethylamine (113 ml), 1,3-bis(diphenylphosphino)propane (2.78 g) (produced by Tokyo Chemical Industry Co., Ltd.), paladium acetate (0.76 g) (produced by Wako Pure Chemical Industries, Ltd.), and dimethylformamide (680 ml), and reacted at 70 to 85° C. for 2 days. The reaction product was treated by a normal method to obtain 2,7-diacetylnaphthalene (40 g). This 2,7-diacetylnaphthalene (4.62 g) was reacted with 8-amino-7-quinolinecarbaldehyde (7.87 g) and potassium hydroxide (7.9 g) in 220 ml of ethanol at 60° C. and treated by a normal method to obtain ADT-5 (4.44 g) represented by the following formula. The solubility of ADT-5 in pure water at 60° C. was less than 0.1 mg/L, and the solubility in 10% by mass sulfuric acid at 60° C. was 4.0 mg/L. A molecular weight of ADT-5 was 484.55.

[Chemical Formula 58]

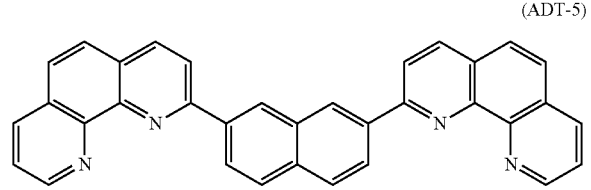

(ADT-5)

(Preparation of ADT-5-Added Membrane)

An electrolyte membrane f7 was produced in the same manner as in Example 1 except for using ADT-5.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 8

(Synthesis of ADT-6)

ADT-5 (5.48 g) synthesized by the method in Example 7 was reacted with 2.0 M cyclohexane/ether solution (22.6 ml) of phenyllithium in 200 ml of toluene at room temperature for 2 days and treated by a normal method. The resulting product was reacted with 100 g of manganese dioxide at room temperature for 2.5 hours in 400 ml of dichloromethane and treated by a normal method to obtain ADT-5 (0.93 g) represented by the following formula. The solubility of ADT-6 in pure water at 60° C. was less than 0.1 mg/L, and the solubility in 10% by mass sulfuric acid at 60° C. was 2.6 mg/L. A molecular weight of ADT-6 was 636.74.

[Chemical Formula 59]

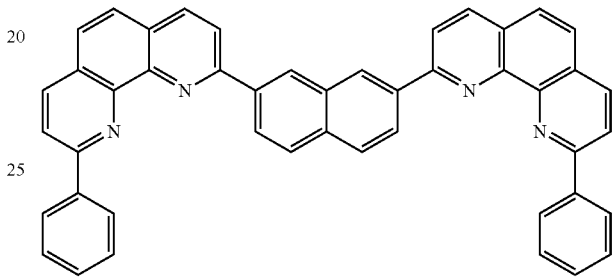

(ADT-6)

(Preparation of ADT-6-Added Membrane)

An electrolyte membrane f8 was produced in the same manner as in Example 1 except for using ADT-6.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 9

(Synthesis of ADT-7)

ADT-7 (4.60 g) represented by the following formula was obtained in the same manner as in Example 7 except for using 1,5-dihydroxynaphthalene (produced by Tokyo Chemical Industry Co., Ltd.) in place of 2,7-dihydroxynaphthalene. The solubility of ADT-7 in pure water at 60° C. was less than 0.1 mg/L, and the solubility in 10% by mass sulfuric acid at 60° C. was 4.5 mg/L. A molecular weight of ADT-7 was 484.55.

[Chemical Formula 60]

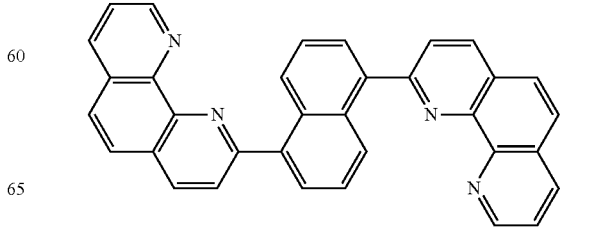

(ADT-7)

(Preparation of ADT-7-Added Membrane)

An electrolyte membrane f9 was produced in the same manner as in Example 1 except for using ADT-7.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 10

(Synthesis of ADT-8)

1,2-dibromobenzene (4.03 g) (produced by Tokyo Chemical Industry Co., Ltd.), 4-acetylphenylboronic acid (7.0 g) (produced by Aldrich Chemical Co.), potassium carobonate (11.8 g), tetrakis(triphenylphosphine)paladium (0.987 g) (produced by Tokyo Chemical Industry Co., Ltd.), water (35 ml), and 1,4-dioxane (85 ml) were mixed and reacted at 100° C. for 1 day. The reaction product was treated by a normal method to obtain 1,2-di(4-acetylphenyl)benzene (3.8 g). This 1,2-di(4-acetylphenyl)benzene (3.7 g) was reacted with 8-amino-7-quinolinecarbaldehyde (4.26 g) and potassium hydroxide (3.89 g) in 120 ml of ethanol at 60° C. and treated by a normal method to obtain ADT-8 (6.52 g) represented by the following formula. The solubility of ADT-8 in pure water at 60° C. was less than 0.1 mg/L, and the solubility in 10% by mass sulfuric acid at 60° C. was 3.3 mg/L. A molecular weight of ADT-8 was 586.68.

[Chemical Formula 61]

(ADT-8)

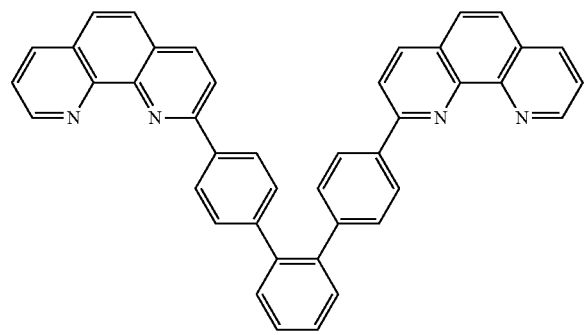

(Preparation of ADT-8-Added Membrane)

An electrolyte membrane f10 was produced in the same manner as in Example 1 except for using ADT-8.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 11

(Synthesis of ADT-9)

ADT-9 (8.4 g) represented by the following formula was obtained in the same manner as in Example 10 except for using 1,3-dibromobenzene (produced by Tokyo Chemical Industry Co., Ltd.) in place of 1,2-dibromobenzene. The solubility of ADT-9 in pure water at 60° C. was less than 0.1 mg/L, and the solubility in 10% by mass sulfuric acid at 60° C. was 3.0 mg/L. A molecular weight of ADT-9 was 586.68.

[Chemical Formula 62]

(ADT-9)

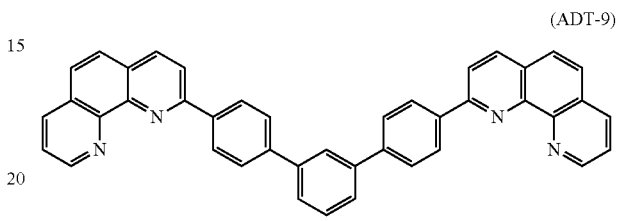

(Preparation of ADT-9-Added Membrane)

An electrolyte membrane f11 was produced in the same manner as in Example 1 except for using ADT-9.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 12

(Synthesis of ADT-10)

ADT-9 (4.94 g) represented by the following formula was obtained in the same manner as in Example 10 except for using 3-acetylphenylboronic acid (produced by Aldrich Chemical Co.) in place of 4-acetylphenylboronic acid. The solubility of ADT-10 in pure water at 60° C. was less than 0.1 mg/L, and the solubility in 10% by mass sulfuric acid at 60° C. was 3.6 mg/L. A molecular weight of ADT-10 was 586.68.

[Chemical Formula 63]

(ADT-10)

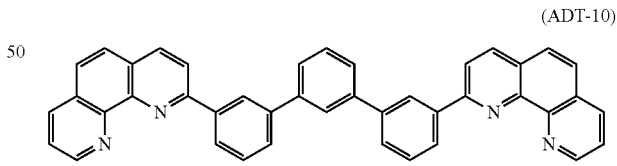

(Preparation of ADT-10-Added Membrane)

An electrolyte membrane f12 was produced in the same manner as in Example 1 except for using ADT-10.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 13

(Synthesis of ADT-11)

1-bromo-4-t-butylbenzene (5.88 g) (produced by Tokyo Chemical Industry Co., Ltd.) was reacted with lithium (0.76 g) under reflux for 5 hours in 50 ml of diethyl ether, and the resulting gray solution was added dropwise to a suspension (150 ml) having ADT-1 (4.0 g) dispersed in toluene under ice cooling. The resulting mixture was reacted under ice cooling for 1 hour and treated by a normal method. The resulting product was reacted with 66 g of manganese dioxide at room temperature for 30 minutes in 150 ml of dichloromethane and treated by a normal method to obtain ADT-11 (3.65 g) represented by the following formula. The solubility of ADT-11 in pure water at 60° C. was less than 0.1 mg/L, and the solubility in 10% by mass sulfuric acid at 60° C. was 2.9 mg/L. A molecular weight of ADT-11 was 698.90.

[Chemical Formula 64]

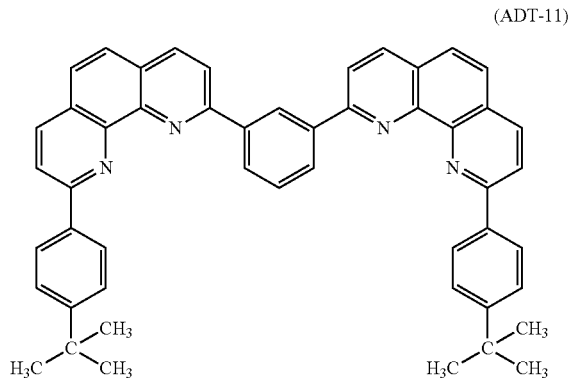

(ADT-11)

(Preparation of ADT-11-Added Membrane)

An electrolyte membrane f13 was produced in the same manner as in Example 1 except for using ADT-11.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 14

(Synthesis of ADT-12)

5-bromo-m-xylene (6.18 g) (produced by Tokyo Chemical Industry Co., Ltd.) was reacted with lithium (0.92 g) under reflux for 5 hours in 50 ml of diethyl ether, and the resulting gray solution was added dropwise to a suspension (100 ml) having ADT-1 (3.63 g) dispersed in toluene under ice cooling. The resulting mixture was reacted at room temperature for 2 hours and treated by a normal method. The resulting product was reacted with 63 g of manganese dioxide at room temperature for 2 hours in 200 ml of dichloromethane and treated by a normal method to obtain ADT-12 (1.4 g) represented by the following formula. The solubility of ADT-12 in pure water at 60° C. was less than 0.1 mg/L, and the solubility in 10% by mass sulfuric acid at 60° C. was 3.1 mg/L. A molecular weight of ADT-12 was 642.79.

[Chemical Formula 65]

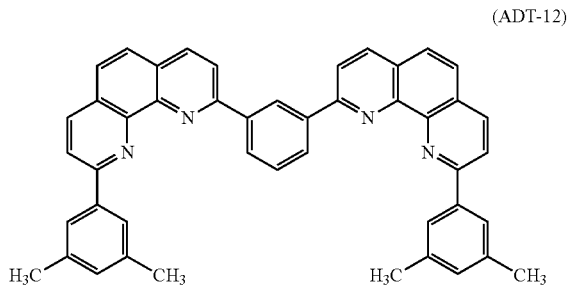

(ADT-12)

(Preparation of ADT-12-Added Membrane)

An electrolyte membrane f14 was produced in the same manner as in Example 1 except for using ADT-12.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 15

(Synthesis of ADT-13)

4-bromotoluene (6.84 g) (produced by Tokyo Chemical Industry Co., Ltd.) was reacted with lithium (1.1 g) under reflux for 5 hours in 60 ml of diethyl ether, and the resulting gray solution was added dropwise to a suspension (100 ml) having ADT-1 (4.34 g) dispersed in toluene under ice cooling. The resulting mixture was reacted under ice cooling for 2 hours and treated by a normal method. The resulting product was reacted with 75 g of manganese dioxide at room temperature for 2 hours in 200 ml of dichloromethane and treated by a normal method to obtain ADT-13 (2.1 g) represented by the following formula. The solubility of ADT-13 in pure water at 60° C. was less than 0.1 mg/L, and the solubility in 10% by mass sulfuric acid at 60° C. was 3.2 mg/L. A molecular weight of ADT-13 was 614.74.

[Chemical Formula 66]

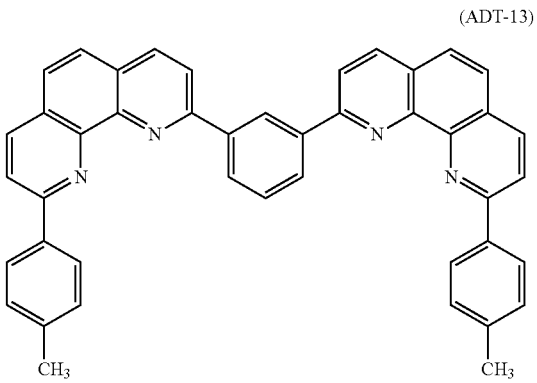

(ADT-13)

(Preparation of ADT-13-Added Membrane)

An electrolyte membrane f15 was produced in the same manner as in Example 1 except for using ADT-13.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 16

(Synthesis of ADT-14)

1-bromonaphthalene (3.57 g) (produced by Tokyo Chemical Industry Co., Ltd.) was reacted with lithium (0.48 g) at room temperature for 3 hours in 50 ml of diethyl ether, and the resulting perse solution was added dropwise to a suspension (100 ml) having ADT-1 (2.5 g) dispersed in toluene under ice cooling. The resulting mixture was reacted at room temperature for 2 hours and treated by a normal method. The resulting product was reacted with 50 g of manganese dioxide at room temperature for 15 minutes in 500 ml of dichloromethane and treated by a normal method to obtain ADT-13 (0.4 g) represented by the following formula. The solubility of ADT-14 in pure water at 60° C. was less than 0.1 mg/L, and the solubility in 10% by mass sulfuric acid at 60° C. was 2.8 mg/L. A molecular weight of ADT-14 was 686.80.

[Chemical Formula 67]

(ADT-14)

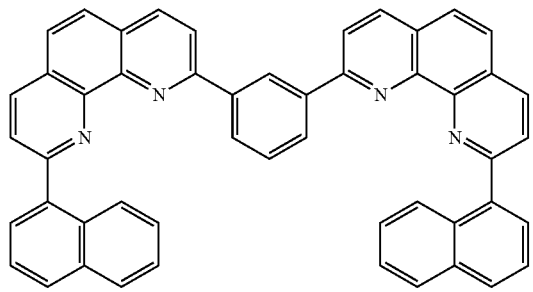

(Preparation of ADT-14-Added Membrane)

An electrolyte membrane f16 was produced in the same manner as in Example 1 except for using ADT-14.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 17

(Synthesis of ADT-15)

ADT-3 (2.5 g) was reacted with 2.0 M cyclohexane/ether solution (11.5 ml) of phenyllithium in 100 ml of toluene under ice cooling for 1 hour and then at room temperature for 4 hours and treated by a normal method. The resulting product was reacted with 50 g of manganese dioxide at room temperature for 5 minutes in 400 ml of dichloromethane and treated by a normal method to obtain ADT-14 (0.80 g) represented by the following formula. The solubility of ADT-15 in pure water at 60° C. was less than 0.1 mg/L, and the solubility in 10% by mass sulfuric acid at 60° C. was 2.5 mg/L. A molecular weight of ADT-15 was 586.68.

[Chemical Formula 68]

(ADT-15)

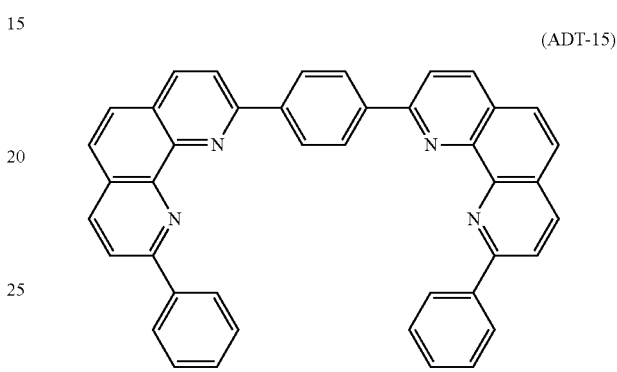

(Preparation of ADT-15-Added Membrane)

An electrolyte membrane f17 was produced in the same manner as in Example 1 except for using ADT-15.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 18

(Synthesis of ADT-16)

1-bromo-4-t-butylbenzene (3.68 g) (produced by Tokyo Chemical Industry Co., Ltd.) was reacted with lithium (0.48 g) under reflux for 5 hours in 50 ml of diethyl ether, and the resulting gray solution was added dropwise to a suspension (150 ml) having ADT-3 (2.5 g) dispersed in toluene under ice cooling. The resulting mixture was reacted under ice cooling for 3 hours and treated by a normal method. The resulting product was reacted with 55 g of manganese dioxide at room temperature for 15 minutes in 400 ml of dichloromethane and treated by a normal method to obtain ADT-16 (1.66 g) represented by the following formula. The solubility of ADT-16 in pure water at 60° C. was less than 0.1 mg/L, and the solubility in 10% by mass sulfuric acid at 60° C. was 2.8 mg/L. A molecular weight of ADT-16 was 698.90.

[Chemical Formula 69]

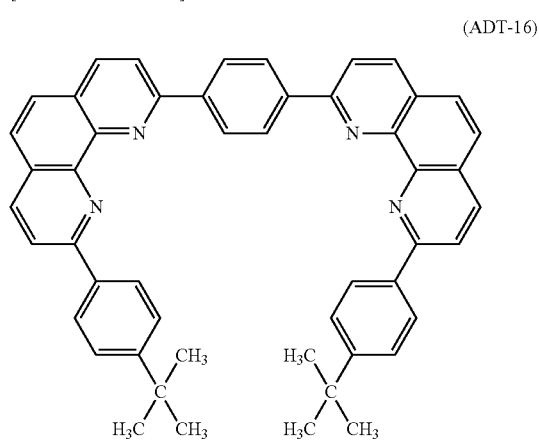
(ADT-16)

(Preparation of ADT-16-Added Membrane)

An electrolyte membrane f18 was produced in the same manner as in Example 1 except for using ADT-16.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 19

(Synthesis of ADT-17)

ADT-17 was synthesized in the same manner as in Example 1 except for using 66 g of 3,3'-diacetylbiphenyl in place of 45 g of 1,3-diacetylbenzene. The amount of the synthesized ADT-17 was 120 g. The solubility of ADT-17 in pure water at 60° C. was less than 0.1 mg/L, and the solubility in 10% by mass sulfuric acid at 60° C. was 4.6 mg/L. A molecular weight of ADT-17 was 538.64.

[Chemical Formula 70]

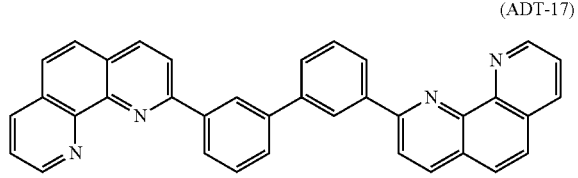
(ADT-17)

(Preparation of ADT-17-Added Membrane)

An electrolyte membrane f19 was produced in the same manner as in Example 1 except for using ADT-17.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 20

(Synthesis of ADT-18)

ADT-18 was synthesized in the same manner as in Example 1 except for using 57 g of 1,3,5-triacetylbenzene in place of 45 g of 1,3-diacetylbenzene. The amount of the synthesized ADT-18 was 51 g. The solubility of ADT-18 in pure water at 60° C. was less than 0.1 mg/L, and the solubility in 10% by mass sulfuric acid at 60° C. was 1.3 mg/L. A molecular weight of ADT-18 was 612.68.

[Chemical Formula 71]

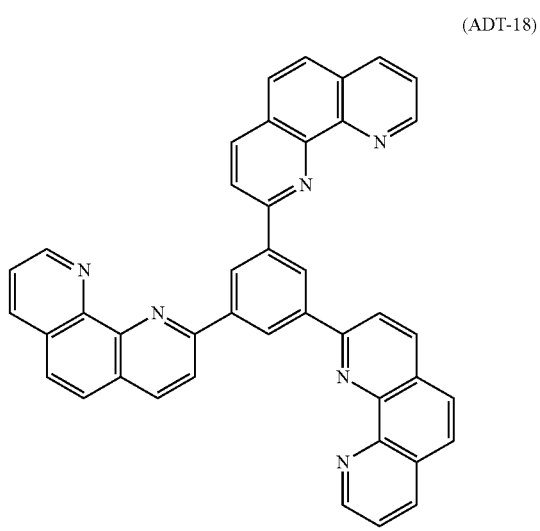
(ADT-18)

(Preparation of ADT-18-Added Membrane)

An electrolyte membrane f20 was produced in the same manner as in Example 1 except for using ADT-18.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 21

(Synthesis of ADT-19)

Triphenylmethanol (100 g) (produced by Tokyo Chemical Industry Co., Ltd.) was reacted with aniline hydrochloride (100 g) (produced by Wako Pure Chemical Industries, Ltd.) in 250 ml of acetic acid under reflux for 8 hours, and then the resulting reactant was treated by a normal method. The treated product was dispersed in 1 L of ethanol, and to this, concentrated sulfuric acid (110 ml) was added, and the resulting mixture was cooled to −5° C. with salt-containing ice, and isoamyl nitrite was added dropwise, and the resulting mixture was stirred at −5° C. for 1 hour. To this, 30% phosphoric acid (320 ml) was added dropwise while cooling the mixture, and an internal temperature was gradually raised to 30° C. A temperature of the mixture was raised to 80° C. while removing excessive reaction heat by cooling with iced water and refluxed for 30 minutes. After the reaction was further continued under reflux for 2 hours, the reactant was treated by a normal method to obtain tetraphenylmethane (82.5 g). In a nitrogen atmosphere, aluminum chloride (23.3 g) and tetraphenylmethane (11.6 g) were mixed in 250 ml of dichloromethane, and then acyl chloride (12.4 ml) was added dropwise. The resulting mixture was stirred at 25° C. for 2 hours and at 60° C. for 2 hours, and then treated by a normal method. The resulting product (1.51 g) and 8-amino-7-quinolinecarbaldehyde (2.34 g) were dissolved in 130 ml of dioxane, and to this, ethanol (5 ml) and potassium hydroxide (2.6 g) were added. The resulting mixture was stirred under reflux for 30 hours and treated by a normal method to obtain ADT-19 (0.479 g). The solubility of ADT-19 in pure water at 60° C. and the solubility in 10% by mass sulfuric acid at 60° C. were both less than 0.1 mg/L. A molecular weight of ADT-19 was 1033.18.

[Chemical Formula 72]

(ADT-19)

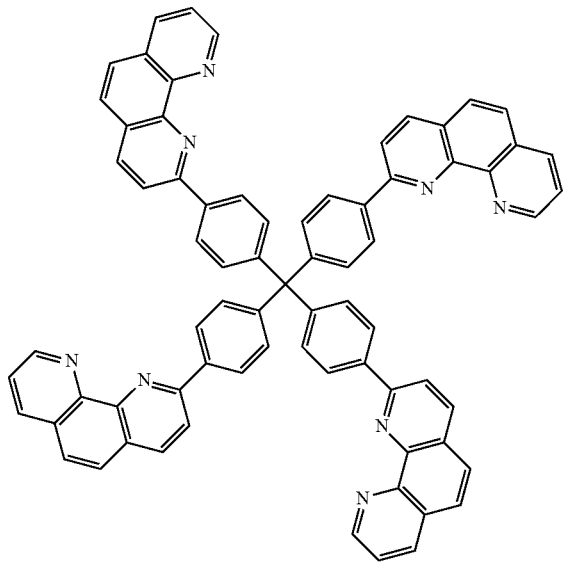

(Preparation of ADT-19-Added Membrane)

An electrolyte membrane f21 was produced in the same manner as in Example 1 except for using ADT-19.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 22

An electrolyte membrane f22 was produced in the same manner as in Example 1 except for adding 200 mg of 1,2-bis(diphenylphosphino)ethane together with ADT-1.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 23

An electrolyte membrane f23 was produced in the same manner as in Example 1 except for using NRE211CS in place of the block copolymer b1.

Since the resulting membrane was insoluble in NMP and its molecular weight retention could not be measured, its open circuit retention time was measured as a durability test. The ion exchange capacity and the proton conductivity were separately measured, and these results are shown in Table 1.

Example 24

An electrolyte membrane f24 was produced in the same manner as in Example 1 except for using the PES-based block copolymer b2 obtained in Synthesis Example 5 in place of the block copolymer b1.

Since the resulting membrane was soluble in NMP, its molecular weight retention was measured as a durability test. A weight average molecular weight was measured. The ion exchange capacity and the proton conductivity were separately measured, and these results are shown in Table 1.

Example 25

An electrolyte membrane f25 was produced in the same manner as in Example 1 except for using the polyarylene-type block copolymer b3 obtained in Synthesis Example 8 in place of the block copolymer b3.

Since the resulting membrane was soluble in NMP, its molecular weight retention was measured as a durability test. A weight average molecular weight was measured. The ion exchange capacity and the proton conductivity were separately measured, and these results are shown in Table 1.

Example 26

(Synthesis of ADT-20)

ADT-2 (5.867 g) synthesized in Example 4 and potassium nitrate (2.123 g) were reacted in 150 ml of 98% by mass sulfuric acid at 140° C. for 8 hours, and then the reactant was treated by a normal method to obtain a precursor compound. The obtained product (6.090 g) and palladium-supported carbon (0.24 g) (palladium content 10%) were dispersed in 150 ml of ethanol. The resulting mixture was reacted at room temperature for 72 hours in a hydrogen atmosphere and treated by a normal method to obtain ADT-20 (4.995 g) represented by the following formula. The solubility of ADT-20 in pure water at 60° C. was less than 0.1 mg/L, and the solubility in 10% by mass sulfuric acid at 60° C. was 7.5 mg/L. A molecular weight of ADT-20 was 616.71.

[Chemical Formula 73]

(ADT-20)

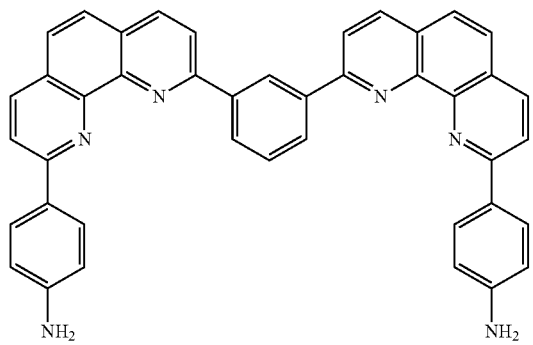

(Preparation of ADT-20-Added Membrane)

An electrolyte membrane f26 was produced in the same manner as in Example 1 except for using ADT-20.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 27

(Synthesis of ADT-21)

ADT-2 (5.867 g) synthesized in Example 4 and 30% by weight fuming sulfuric acid (5.604 g) were reacted in 150 ml of 98% by mass sulfuric acid at room temperature for 24 hours, and then the reactant was treated by a normal method to obtain ADT-22 (6.423 g) represented by the following formula. The solubility of ADT-21 in pure water at 60° C. was less than 0.1 mg/L, and the solubility in 10% by mass sulfuric acid at 60° C. was 6.3 mg/L. A molecular weight of ADT-21 was 746.81.

[Chemical Formula 74]

(ADT-21)

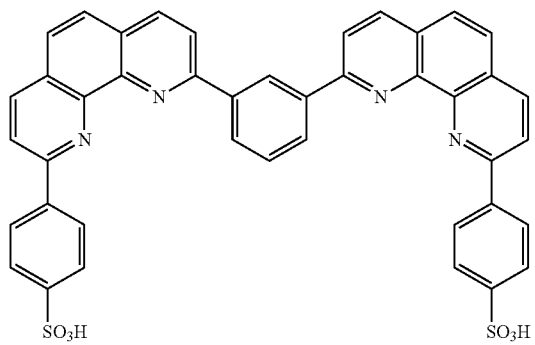

(Preparation of ADT-21-Added Membrane)

An electrolyte membrane f26 was produced in the same manner as in Example 1 except for using ADT-21.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 28

(Preparation of ADT-2+CeNO$_3$-Added Membrane)

CeNO$_3$.6H$_2$O (0.18 g) (reagent produced by Aldrich Chemical Co., 0.43 mmol) was dissolved in pure water to prepare 30 L of a 6.2 μmol/l solution of CeNO$_3$. In the solution, the ADT-2-added membrane f4 (20 g) prepared in Example 4 was immersed for 72 hours to take in CeNO$_3$ to prepare a polymer electrolyte membrane f28.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Example 29

(Preparation of ADT-2+(Pt Fine Particle)—Added Membrane)

An electrolyte membrane f29 was produced in the same manner as in Example 4 except for using Pt fine particles (produced by Nippon Sheet Glass Co., Ltd.) together with ADT-2.

Since the resulting membrane was insoluble in NMP and its molecular weight retention could not be measured, its open circuit retention time was measured as a durability test, but since the evaluation of the open circuit retention time was not completed within 3000 hours, chemical durability of the electrolyte membrane was evaluated as a voltage retention. The ion exchange capacity and the proton conductivity were separately measured, and these results are shown in Table 1.

Comparative Example

An electrolyte membrane f1' was produced in the same manner as in Example 1 except for not using ADT-1.

Since the resulting membrane was insoluble in NMP and its molecular weight retention could not be measured, its open circuit retention time was measured as a durability test. The ion exchange capacity and the proton conductivity were separately measured, and these results are shown in Table 1.

Comparative Example 2

The block copolymer b1 (20 g) obtained in Synthesis Example 3 was dissolved in N-methyl-2-pyrrolidone (NMP) (80 g). The resulting solution was pressure-filtered by using a glass fiber filter, applied onto a glass substrate by casting, dried at 100° C. for 4 hours, and heat treated at 150° C. for 10 minutes in a nitrogen atmosphere to obtain a polyketal ketone membrane (thickness: 25 μm). The solubility of a polymer was extremely high. The membrane was immersed in a 10% by mass aqueous sulfuric acid solution at 95° C. for 24 hours to perform proton substitution and a deprotection reaction, and then the resulting reaction product was washed by being immersed in a largely excessive amount of pure water for 24 hours, and left at rest and dried at 25° C. for 12 hours to produce a polyether ketone membrane f2" not containing a hydrophilic additive.

Then, 1,10-phenanthroline (0.30 g) (reagent produced by Aldrich Chemical Co., 1.7 mmol) was dissolved in pure water to prepare 30 L of a 55 µmol/l solution of 1,10-phenanthroline. In the solution, the above polyether ketone membrane (20 g) was immersed for 72 hours to take in 1,10-phenanthroline to prepare a polymer electrolyte membrane f2'. The solubility of 1,10-phenanthroline added this time in pure water at 60° C. and the solubility in 10% by mass sulfuric acid at 60° C. were both 100 mg/L or more. A molecular weight of 1,10-phenanthroline was 180.21.

Since the resulting membrane was insoluble in NMP and its molecular weight retention could not be measured, its open circuit retention time was measured as a durability test. The ion exchange capacity and the proton conductivity were separately measured, and these results are shown in Table 1.

Comparative Example 3

An electrolyte membrane f3' was produced in the same manner as in Comparative Example 2 except for using 5-amino-1,10-phenanthroline in place of 1,10-phenanthroline. The solubility of 5-amino-1,10-phenanthroline added this time in pure water at 60° C. and the solubility in 10% by mass sulfuric acid at 60° C. were both 100 mg/L or more. A molecular weight of 5-amino-1,10-phenanthroline was 195.22.

Since the resulting membrane was insoluble in NMP and its molecular weight retention could not be measured, its open circuit retention time was measured as a durability test. The ion exchange capacity and the proton conductivity were separately measured, and these results are shown in Table 1.

Comparative Example 4

An electrolyte membrane f4' was produced in the same manner as in Comparative Example 2 except for using cerium (III) nitrate hexahydrate (produced by Aldrich Chemical Co.) in place of 1,10-phenanthroline. The solubility of cerium (III) nitrate hexahydrate added this time in pure water at 60° C. and the solubility in 10% by mass sulfuric acid at 60° C. were both 100 mg/L or more.

Since the resulting membrane was insoluble in NMP and its molecular weight retention could not be measured, its open circuit retention time was measured as a durability test. The ion exchange capacity and the proton conductivity were separately measured, and these results are shown in Table 1.

Comparative Example 5

An electrolyte membrane f6' was produced in the same manner as in Comparative Example 1 except for using NRE211CS in place of the block copolymer b1.

Since the resulting membrane was insoluble in NMP and its molecular weight retention could not be measured, its open circuit retention time was measured as a durability test. The ion exchange capacity and the proton conductivity were separately measured, and these results are shown in Table 1.

Comparative Example 6

An electrolyte membrane f7' was produced in the same manner as in Comparative Example 1 except for using the block copolymer b2 in place of the block copolymer b1.

Since the resulting membrane was soluble in NMP, its molecular weight retention was measured as a durability test. A weight average molecular weight was measured. The ion exchange capacity and the proton conductivity were separately measured, and these results are shown in Table 1.

Comparative Example 7

An electrolyte membrane f8' was produced in the same manner as in Comparative Example 1 except for using the block copolymer b3 in place of the block copolymer b1.

Since the resulting membrane was soluble in NMP, its molecular weight retention was measured as a durability test. A weight average molecular weight was measured. The ion exchange capacity and the proton conductivity were separately measured, and these results are shown in Table 1.

TABLE 1

| | IEC (meq/g) | $H^+$ Conductivity (mS/cm) | Open Circuit Retention Time (hour) | Voltage Retention (%) | Molecular Weight Retention (%) |
|---|---|---|---|---|---|
| Example 1 | 1.77 | 2.5 | 3000~ | 89 | — |
| Example 2 | 1.10 | 1.2 | 3000~ | 99 | — |
| Example 3 | 1.8 | 2.8 | 2320 | — | — |
| Example 4 | 1.78 | 2.6 | 3000~ | 93 | — |
| Example 5 | 1.77 | 2.5 | 3000~ | 91 | — |
| Example 6 | 1.78 | 2.6 | 3000~ | 96 | — |
| Example 7 | 1.77 | 2.5 | 3000~ | 92 | — |
| Example 8 | 1.78 | 2.5 | 3000~ | 95 | — |
| Example 9 | 1.77 | 2.5 | 3000~ | 90 | — |
| Example 10 | 1.78 | 2.6 | 3000~ | 93 | — |
| Example 11 | 1.78 | 2.6 | 3000~ | 94 | — |
| Example 12 | 1.78 | 2.6 | 3000~ | 92 | — |
| Example 13 | 1.78 | 2.7 | 3000~ | 94 | — |
| Example 14 | 1.78 | 2.6 | 3000~ | 93 | — |
| Example 15 | 1.78 | 2.6 | 3000~ | 93 | — |
| Example 16 | 1.78 | 2.6 | 3000~ | 95 | — |
| Example 17 | 1.78 | 2.6 | 3000~ | 95 | — |
| Example 18 | 1.78 | 2.6 | 3000~ | 96 | — |
| Example 19 | 1.77 | 2.5 | 3000~ | 90 | — |
| Example 20 | 1.78 | 2.6 | 3000~ | 97 | — |
| Example 21 | 1.79 | 2.8 | 3000~ | 99 | — |
| Example 22 | 1.75 | 2.5 | 3000~ | 97 | — |
| Example 23 | 0.90 | 2.3 | 240 | — | — |
| Example 24 | 1.95 | 2.0 | — | — | 91 |
| Example 25 | 2.41 | 2.2 | — | — | 94 |
| Example 26 | 1.78 | 2.7 | 3000~ | 97 | — |
| Example 27 | 1.81 | 2.8 | 3000~ | 95 | — |
| Example 28 | 1.74 | 2.2 | 3000~ | 96 | — |
| Example 29 | 1.76 | 2.5 | 3000~ | 98 | — |
| Comparative Example 1 | 1.8 | 2.8 | 1500 | — | — |
| Comparative Example 2 | 1.76 | 2.5 | 1930 | — | — |
| Comparative Example 3 | 1.77 | 2.6 | 2410 | — | — |
| Comparative Example 4 | 1.75 | 2.3 | 1890 | — | — |
| Comparative Example 5 | 0.92 | 2.5 | 100 | — | — |
| Comparative Example 6 | 2.0 | 2.3 | — | — | 61 |
| Comparative Example 7 | 2.5 | 2.6 | — | — | 64 |

Table 1 shows that open circuit retention times of Examples 1 to 22, 26 and 27, Comparative Examples 2 to 4, in which the nitrogen-containing additives are added to the polymer electrolyte compositions, are longer than that of Comparative Example 1 in which the same polymer was used. Among them, Examples 1 to 22, which used the additive whose solubility in water at 60° C. and 10% by mass sulfuric acid at 60° C. is extremely low, exhibited extremely excellent chemical durability exceeding 3000 hours. Since these phenanthroline polymers have a relatively large molecular weight and extremely low solubility in water and an acid, they are hardly eluted during the operation of a fuel cell, and therefore they can impart more excellent durability to an electrolyte membrane than that of a phenanthroline monomer or a metal ion having high solubility in water and an acid. Further, in the respective comparisons between Example 23 and Comparative Example 5, between Example 24 and Comparative Example 6, and between Example 25 and Comparative Example 7, the polymer electrolyte composition having the additive added had more excellent open circuit retention time or molecular weight retention. Moreover, each of Examples 28 and 29, in which the nitrogen-containing additive was used in combination with transition metal such as cerium or platinum serving as a radical scavenger or a hydrogen peroxide-decomposition catalyst, exhibited a higher open circuit voltage retention than that of Comparative Example 1 using the same polymer or Example 4 using the same nitrogen-containing additive. As described above, the nitrogen-containing additive of the present invention can impart excellent durability against hydrogen peroxide or peroxide radicals produced by power generation of the fuel cell to the polymer electrolyte membrane.

INDUSTRIAL APPLICABILITY

The polymer electrolyte composition and the polymer electrolyte membrane of the present invention can be applied to various electrochemical systems (for example, a fuel cell, a water electrolytic system, a chloro-alkali electrolytic system, etc.). Among these systems, the polymer electrolyte composition and the polymer electrolyte membrane are suitable for a fuel cell, and are suitable particularly for a fuel cell using hydrogen as a fuel.

The application of the polymer electrolyte fuel cell of the present invention is not particularly limited, and the polymer electrolyte fuel cell is preferably used as electric power supply for portable devices such as cellular phone, personal computer, PDA, video camera and digital camera, household appliances such as cordless cleaner, toys, and mobile objects, for example, vehicles such as electric bicycle, motorcycle, automobile, bus and trucks, marine vessels and railroads; substitutions of conventional primary and secondary cells, such as stationary type power generator; or hybrid power sources in which this polymer electrolyte fuel cell is used in combination with conventional primary and secondary cells.

The invention claimed is:

1. A polymer electrolyte composition comprising at least an ionic-group-containing polymer (A) and a nitrogen-containing additive (B), wherein the nitrogen-containing additive (B) comprises a constituent unit at least (C1) or a constituent unit (C2):

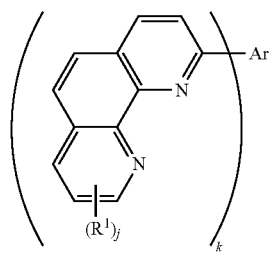

(C1)

in which Ar represents an arylene group, and $R^1$ represents at least one group selected from among a halogen, an alkyl group having 1 to 20 carbon atoms, an alkoxy group having 1 to 20 carbon atoms, an aryl group having 6 to 20 carbon atoms, an aryloxy group having 6 to 20 carbon atoms, a carboxyl group, a carboxylate ester group, a phosphino group, a phosphine oxide group, a phosphonic acid group, a phosphoester group, a sulfonic acid group, a sulfate ester group, a hydroxyl group, an amino group, a cyano group and a nitro group, j represents an integer of 0 to 7, k represents an integer of 2 or more, and all R's may be the same or different from one another,

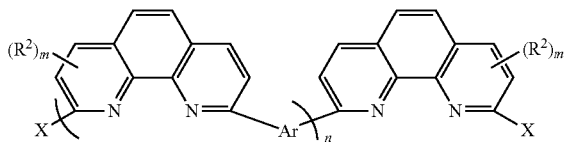

(C2)

in which Ar represents an arylene group, and $R^2$ represents at least one group selected from among a halogen, an alkyl group having 1 to 20 carbon atoms, an alkoxy group having 1 to 20 carbon atoms, an aryl group having 6 to 20 carbon atoms, an aryloxy group having 6 to 20 carbon atoms, a carboxyl group, a carboxylate ester group, a phosphino group, a phosphine oxide group, a phosphonic acid group, a phosphoester group, a sulfonic acid group, a sulfate ester group, a hydroxyl group, an amino group, a cyano group and a nitro group, X represents at least one group selected from among a hydrogen atom, a halogen, an alkyl group having 1 to 20 carbon atoms, an alkoxy group having 1 to 20 carbon atoms, an aryl group having 6 to 20 carbon atoms, an aryloxy group having 6 to 20 carbon atoms, a carboxyl group, a carboxylate ester group, a phosphino group, a phosphine oxide group, a phosphonic acid group, a phosphoester group, a sulfonic acid group, a sulfate ester group, a hydroxyl group, an amino group, a cyano group and a nitro group, m represents an integer of 0 to 6, n represents an integer of 2 to 4, and all $R^2$s and Xs may be the same or different from one another.

2. The polymer electrolyte composition according to claim 1, wherein the solubility of the nitrogen-containing additive (B) in water at 60° C. and 10% by mass sulfuric acid at 60° C. is 20 mg/L or less.

3. The polymer electrolyte composition according to claim 1, wherein a molecular weight of the nitrogen-containing additive (B) is 400 or more.

4. The polymer electrolyte composition according to claim 1, wherein the content of the nitrogen-containing additive (B) is 0.02% by weight or more and 35% by weight or less of the whole polymer electrolyte composition.

5. The polymer electrolyte composition according to claim 1, wherein the polymer electrolyte composition further contains at least one transition metal selected from among Ce, Mn, Ti, Zr, V, Cr, Mo, W, Ru, Co, Rh, Ir, Ni, Pd, Pt, Ag and Au.

6. The polymer electrolyte composition according to claim 1, wherein the ionic-group-containing polymer (A) comprises a hydrocarbon-type polymer having an aromatic ring in a main chain.

7. The polymer electrolyte composition according to claim 1, wherein the ionic-group-containing polymer (A) comprises a block copolymer containing one or more segments (A1) containing an ionic group and one or more segments (A2) not containing an ionic group.

8. The polymer electrolyte composition according to claim 7, wherein the segment (A1) containing an ionic group and/or the segment (A2) not containing an ionic group comprises an aromatic polyether ketone-type polymer.

9. The polymer electrolyte composition according to claim 7, wherein the segment (A1) containing an ionic group contains a constituent unit (S1) and the segment (A2) not containing an ionic group contains a constituent unit (S2):

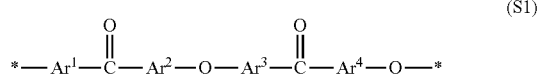

(S1)

in which $Ar^1$ to $Ar^4$ represent an optional divalent arylene group, $Ar^1$ and/or $Ar^2$ contains an ionic group, $Ar^3$ and $Ar^4$ may contain an ionic group or need not contain an ionic group, $Ar^1$ to $Ar^4$ may be optionally substituted, or two or more kinds of arylene groups may be independently used for $A^1$ to $Ar^4$, and * is a bonding site with a part represented by (S1) or other constituent units,

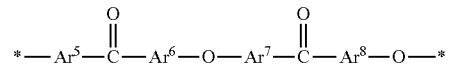

(S2)

in which $Ar^5$ to $Ar^8$ represent an optional divalent arylene group and may be optionally substituted, but they do not contain an ionic group, two or more kinds of arylene groups may be independently used for $Ar^5$ to $Ar^8$, and * is a bonding site with a part represented by (S2) or other constituent units.

10. The polymer electrolyte composition according to claim 1, wherein the ionic group is a sulfonic acid group.

11. A polymer electrolyte membrane, wherein the polymer electrolyte membrane uses the polymer electrolyte composition according to claim 1.

12. A membrane electrode assembly, wherein the membrane electrode assembly uses the polymer electrolyte composition according to claim 1.

13. A polymer electrolyte fuel cell, wherein the polymer electrolyte fuel cell uses the polymer electrolyte composition according to claim 1.

* * * * *